(12) United States Patent
Masuyama et al.

(10) Patent No.: US 10,046,231 B2
(45) Date of Patent: Aug. 14, 2018

(54) GAME SYSTEM AND GAME INFORMATION STORAGE MEDIUM USED FOR SAME

(71) Applicant: Nintendo Co., Ltd., Kyoto (JP)

(72) Inventors: Iwao Masuyama, Kyoto (JP); Toshiaki Suzuki, Kyoto (JP); Akira Tahara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 31 days.

(21) Appl. No.: 14/022,280

(22) Filed: Sep. 10, 2013

(65) Prior Publication Data

US 2014/0011588 A1    Jan. 9, 2014

Related U.S. Application Data

(60) Continuation of application No. 11/729,810, filed on Mar. 30, 2007, now Pat. No. 8,562,402, which is a
(Continued)

(30) Foreign Application Priority Data

Oct. 4, 1999   (JP) .................................. 11-282592
Jun. 9, 2000   (JP) ............................... 2000-174573

(51) Int. Cl.
*A63F 13/211* (2014.01)
*A63F 13/92* (2014.01)
*A63F 13/428* (2014.01)

(52) U.S. Cl.
CPC .......... *A63F 13/211* (2014.09); *A63F 13/428* (2014.09); *A63F 13/92* (2014.09);
(Continued)

(58) Field of Classification Search
CPC .................................. G06F 1/16; A63H 17/00
(Continued)

(56) References Cited

U.S. PATENT DOCUMENTS

| 4,043,076 A | 8/1977 | Potrzuski et al. |
| 4,318,245 A | 3/1982 | Stowell et al. |

(Continued)

FOREIGN PATENT DOCUMENTS

| GB | 2 317 086 | 3/1998 |
| GB | 2 331 686 | 5/1999 |

(Continued)

OTHER PUBLICATIONS

"Low Cost ±2 g/±10 g Dual Axis iMEMS® Accelerometers with Digital Output", Analog Devices, Inc. 1999, pp. 1-11.
(Continued)

*Primary Examiner* — Dmitry Suhol
*Assistant Examiner* — Ankit Doshi
(74) *Attorney, Agent, or Firm* — Nixon & Vanderhye, P.C.

(57) ABSTRACT

A game system includes a housing to be held by a player. The housing incorporates an XY-axis acceleration sensor to detect an acceleration in a X-axis direction and a Y-axis direction and a Z-axis contact switch to detect an acceleration in a Z-axis direction. The sensor and switch detect at least one of an amount (e.g., tilt amount, movement amount, impact amount or the like) and a direction (e.g., tilt direction, movement direction, impact direction or the like) of a change applied to the housing. A simulation program provides simulation such that a state of a game space is changed related to at least one of the amount and direction of the change applied to the housing.

8 Claims, 54 Drawing Sheets

Related U.S. Application Data division of application No. 10/638,309, filed on Aug. 12, 2003, now Pat. No. 7,223,173, which is a division of application No. 09/677,577, filed on Oct. 3, 2000, now Pat. No. 7,601,066.

(52) U.S. Cl.
CPC . *A63F 2300/105* (2013.01); *A63F 2300/1006* (2013.01); *A63F 2300/204* (2013.01); *A63F 2300/205* (2013.01); *A63F 2300/405* (2013.01); *A63F 2300/6045* (2013.01); *A63F 2300/69* (2013.01)

(58) Field of Classification Search
USPC .................................................... 463/37, 42
See application file for complete search history.

(56) References Cited

U.S. PATENT DOCUMENTS

| | | | |
|---|---|---|---|
| 4,337,402 A | 6/1982 | Nowakowski | |
| 4,337,948 A | 7/1982 | Breslow et al. | |
| 4,425,488 A | 1/1984 | Moskin et al. | |
| 4,450,325 A | 5/1984 | Luque | |
| 4,503,299 A | 3/1985 | Henrard et al. | |
| 4,540,176 A | 9/1985 | Baer | |
| 4,769,629 A | 9/1988 | Tigwell | |
| 4,787,051 A | 11/1988 | Olson | |
| 4,839,838 A | 6/1989 | Labiche et al. | |
| 4,895,376 A | 1/1990 | Chiang Shiung-Fei | |
| 4,957,291 A | 9/1990 | Miffitt et al. | |
| 4,969,647 A | 11/1990 | Mical et al. | |
| 4,980,519 A | 12/1990 | Mathews | |
| 5,059,958 A | 10/1991 | Jacobs et al. | |
| 5,068,645 A | 11/1991 | Drumm | |
| 5,128,671 A | 7/1992 | Thomas, Jr. | |
| 5,181,181 A | 1/1993 | Glynn | |
| 5,184,830 A | 2/1993 | Okada et al. | |
| 5,258,785 A | 11/1993 | Dawkins, Jr. | |
| 5,296,871 A | 3/1994 | Paley | |
| 5,329,276 A | 7/1994 | Hirabayashi | |
| 5,339,095 A | 8/1994 | Redford | |
| 5,363,120 A | 11/1994 | Drumm | |
| 5,453,758 A | 9/1995 | Sato | |
| 5,517,579 A | 5/1996 | Baron et al. | |
| 5,526,022 A | 6/1996 | Donahue et al. | |
| 5,574,479 A | 11/1996 | Odell | |
| 5,598,187 A | 1/1997 | Ide et al. | |
| 5,602,566 A | 2/1997 | Motosyuku et al. | |
| 5,605,505 A | 2/1997 | Han | |
| 5,611,731 A | 3/1997 | Bouton et al. | |
| 5,615,132 A | 3/1997 | Horton et al. | |
| 5,618,045 A * | 4/1997 | Kagan | A63F 13/12 463/40 |
| 5,624,117 A | 4/1997 | Ohkubo et al. | |
| 5,661,632 A | 8/1997 | Register | |
| 5,666,138 A | 9/1997 | Culver | |
| 5,685,722 A | 11/1997 | Taba | |
| 5,701,131 A | 12/1997 | Kuga | |
| 5,703,623 A | 12/1997 | Hall et al. | |
| 5,734,371 A | 3/1998 | Kaplan | |
| 5,734,373 A | 3/1998 | Rosenberg et al. | |
| 5,738,583 A * | 4/1998 | Comas | A63F 13/12 463/40 |
| 5,739,811 A | 4/1998 | Rosenberg et al. | |
| 5,746,602 A | 5/1998 | Kikinis | |
| 5,751,273 A | 5/1998 | Cohen | |
| 5,752,880 A | 5/1998 | Gabai et al. | |
| 5,757,360 A | 5/1998 | Nitta et al. | |
| 5,795,227 A | 8/1998 | Raviv et al. | |
| 5,819,206 A | 10/1998 | Horton et al. | |
| 5,835,077 A | 11/1998 | Dao et al. | |
| 5,854,622 A | 12/1998 | Brannon | |
| 5,867,795 A | 2/1999 | Novis et al. | |
| 5,875,257 A | 2/1999 | Marrin et al. | |
| 5,898,421 A | 4/1999 | Quinn | |
| 5,902,968 A | 5/1999 | Sato et al. | |
| 5,903,257 A | 5/1999 | Nishiumi et al. | |
| 5,923,317 A | 7/1999 | Sayler et al. | |
| 5,926,438 A | 7/1999 | Saito | |
| 5,928,347 A | 7/1999 | Jones | |
| 5,947,868 A | 9/1999 | Dugan | |
| 5,953,677 A * | 9/1999 | Sato | H04W 52/0241 340/7.34 |
| 5,955,713 A | 9/1999 | Titus et al. | |
| 5,982,352 A | 11/1999 | Pryor | |
| 5,991,085 A | 11/1999 | Rallison et al. | |
| 5,999,168 A | 12/1999 | Rosenberg et al. | |
| 6,020,876 A | 2/2000 | Rosenberg et al. | |
| 6,035,216 A * | 3/2000 | Cheng | H04B 1/3816 235/475 |
| 6,076,734 A | 6/2000 | Dougherty et al. | |
| 6,080,063 A | 6/2000 | Khosla | |
| 6,145,046 A * | 11/2000 | Jones | 710/301 |
| 6,160,540 A * | 12/2000 | Fishkin | A63F 13/00 345/156 |
| 6,183,365 B1 | 2/2001 | Tonomura et al. | |
| 6,200,219 B1 | 3/2001 | Rudell et al. | |
| 6,201,554 B1 | 3/2001 | Lands | |
| 6,287,200 B1 * | 9/2001 | Sharma | A63F 13/12 463/39 |
| 6,327,570 B1 | 12/2001 | Stevens | |
| 6,342,010 B1 | 1/2002 | Slifer | |
| 6,375,572 B1 | 4/2002 | Masuyama et al. | |
| 6,392,613 B1 | 5/2002 | Goto | |
| 6,466,198 B1 | 10/2002 | Feinstein | |
| 6,473,070 B2 | 10/2002 | Mishra et al. | |
| 6,496,979 B1 * | 12/2002 | Chen et al. | 717/178 |
| 6,527,638 B1 * | 3/2003 | Walker | G07F 17/32 463/25 |
| 6,545,661 B1 | 4/2003 | Goschy et al. | |
| 6,556,185 B2 | 4/2003 | Rekimoto | |
| 6,626,728 B2 | 9/2003 | Holt | |
| 6,641,482 B2 | 11/2003 | Masuyama et al. | |
| 6,684,062 B1 | 1/2004 | Gosior et al. | |
| 7,145,551 B1 | 12/2006 | Bathiche et al. | |
| 2002/0107591 A1 * | 8/2002 | Gabai et al. | 700/94 |
| 2014/0370988 A1 | 12/2014 | Shimamura et al. | |

FOREIGN PATENT DOCUMENTS

| | | |
|---|---|---|
| JP | 60-7128 | 1/1985 |
| JP | 7-24141 | 1/1995 |
| JP | 9-225137 A | 9/1997 |
| JP | 10-21000 | 1/1998 |

OTHER PUBLICATIONS

U.S. Appl. No. 14/476,860, filed Sep. 4, 2014 in the name of Simamura et al.

Final Rejection Office Action issued in U.S. Appl. No. 13/232,385 dated May 21, 2015.

\* cited by examiner

FIG. 13
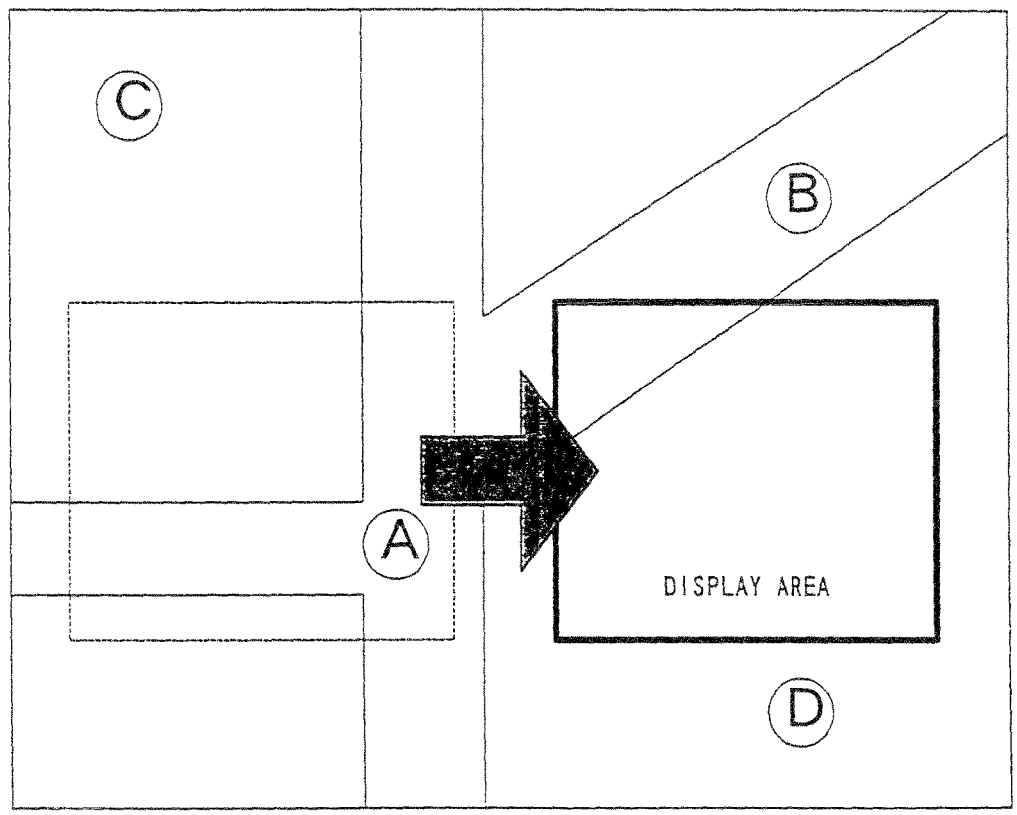
VIRTUAL MAP
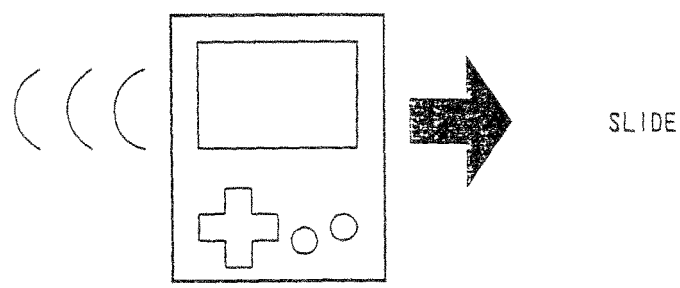
SLIDE

FIG. 20

GAME MAP SELECT PROCESSING TABLE

|  | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTOUT VALUE X(INx) | CHANGE AMOUNT OF CAMERA X COORDINATE (Cx) | ×2 | — | — | — | — |
| SENSOR OUTPUT VALUE Y(INy) | CHANGE AMOUNT OF CAMERA Y COORDINATE (Cy) | ×2 | — | — | — | — |
| Z-AXIS CONTACT SW OUTPUT VALUE (INz) | MAP DECISION | — | — | — | — | — |
| IMPACT INPUT FLAG (FS) | — | — | — | — | — | — |

FIG. 21

PLAYER CHARACTER MOVING TABLE (IN-AIR)

|  | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTOUT VALUE X(INx) | — | — | — | — | — | — |
| SENSOR OUTPUT VALUE Y(INy) | — | — | — | — | — | — |
| Z-AXIS CONTACT SW OUTPUT VALUE (INz) | CHANGE AMOUNT OF Z MOVING ACCELERATION (dAz) | ×1 | — | — | — | — |
| IMPACT INPUT FLAG (FS) | — | — | — | — | — | — |

FIG. 22

PLAYER CHARACTER MOVING TABLE (ON-FLOOR)

|  | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTOUT VALUE X (INx) | CHANGE AMOUNT OF X MOVING ACCELERATION (dAx) | ×2 | \|Inx\|>20 | 40 | — | — |
| SENSOR OUTPUT VALUE Y (INy) | CHANGE AMOUNT OF Y MOVING ACCELERATION (dAy) | ×2 | \|Iny\|>20 | 40 | — | — |
| Z-AXIS CONTACT SW OUTPUT VALUE (INz) | CHANGE AMOUNT OF Z MOVING ACCELERATION (dAz) | ×1 | — | — | — | — |
| IMPACT INPUT FLAG (FS) | CHANGE AMOUNT OF XY MOVING ACCELERATION (dAx, dAy) | ×3 | — | — | — | — |

FIG. 23

PLAYER CHARACTER MOVING TABLE (ON-ICE)

|  | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTOUT VALUE X (INx) | CHANGE AMOUNT OF X MOVING ACCELERATION (dAx) | ×3 | \|Inx\|>20 | 60 | — | — |
| SENSOR OUTPUT VALUE Y (INy) | CHANGE AMOUNT OF Y MOVING ACCELERATION (dAy) | ×3 | \|Iny\|>20 | 60 | — | — |
| Z-AXIS CONTACT SW OUTPUT VALUE (INz) | CHANGE AMOUNT OF Z MOVING ACCELERATION (dAz) | ×1 | — | — | — | — |
| IMPACT INPUT FLAG (FS) | CHANGE AMOUNT OF Z MOVING ACCELERATION (dAz) | ×5 | — | — | — | — |

FIG. 24

PLAYER CHARACTER MOVING TABLE (UNDERWATER)

|  | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTPUT VALUE X (INx) | CHANGE AMOUNT OF X MOVING ACCELERATION (dAx) | ×1/2 | Inx>20 | 60 | — | — |
| SENSOR OUTPUT VALUE Y (INy) | CHANGE AMOUNT OF Y MOVING ACCELERATION (dAy) | ×1/2 | Iny>20 | 60 | — | — |
| Z-AXIS CONTACT SW OUTPUT VALUE (INz) | CHANGE AMOUNT OF Z MOVING ACCELERATION (dAz) | ×1 | — | — | — | — |
| IMPACT INPUT FLAG (FS) | — | — | — | — | — | — |

FIG. 25

NPC MOVING TABLE (FOR TORTOISE NORMAL POSITION)

|  | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTPUT VALUE X (INx) | CHANGE AMOUNT OF X MOVING ACCELERATION (dAx) | ×1/2 | Inx<10 | 0 | Inx>20 | 10 |
| SENSOR OUTPUT VALUE Y (INy) | CHANGE AMOUNT OF Y MOVING ACCELERATION (dAy) | ×1/2 | Iny<10 | 0 | Iny>20 | 10 |
| Z-AXIS CONTACT SW OUTPUT VALUE (INz) | POSITION INVERSION | — | — | — | — | — |
| IMPACT INPUT FLAG (FS) | — | — | — | — | — | — |

FIG. 26

NPC MOVING TABLE (FOR TORTOISE UPSIDE-DOWN POSITION)

|  | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTPUT VALUE X (INx) | CHANGE AMOUNT OF X MOVING ACCELERATION (dAx) | ×2 | \|nx\|>20 | 40 | — | |
| SENSOR OUTPUT VALUE Y (INy) | CHANGE AMOUNT OF Y MOVING ACCELERATION (dAy) | ×1 | \|ny\|>20 | 40 | — | — |
| Z-AXIS CONTACT SW OUTPUT VALUE (INz) | POSITION INVERSION | — | — | — | — | |
| IMPACT INPUT FLAG (FS) | — | — | — | — | — | — |

FIG. 43
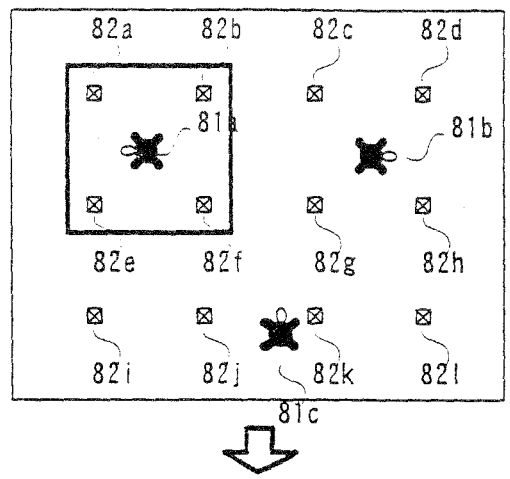
(a)
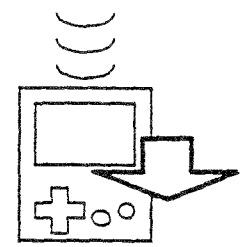
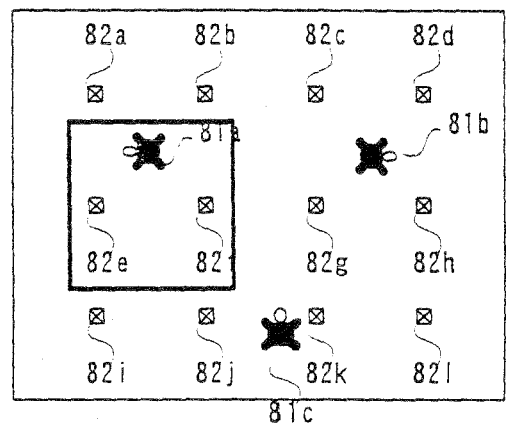
(b)
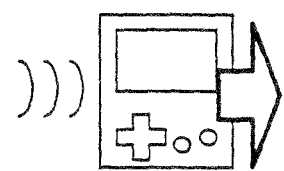
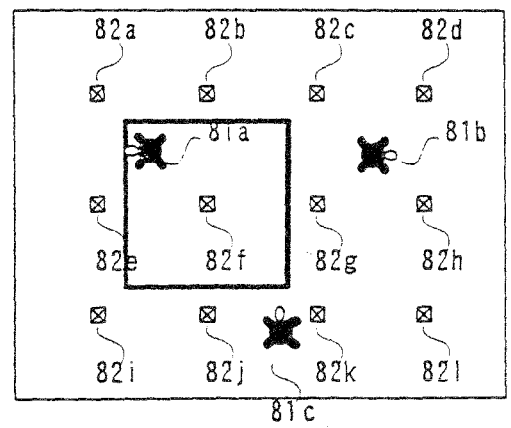
(c)

FIG. 68
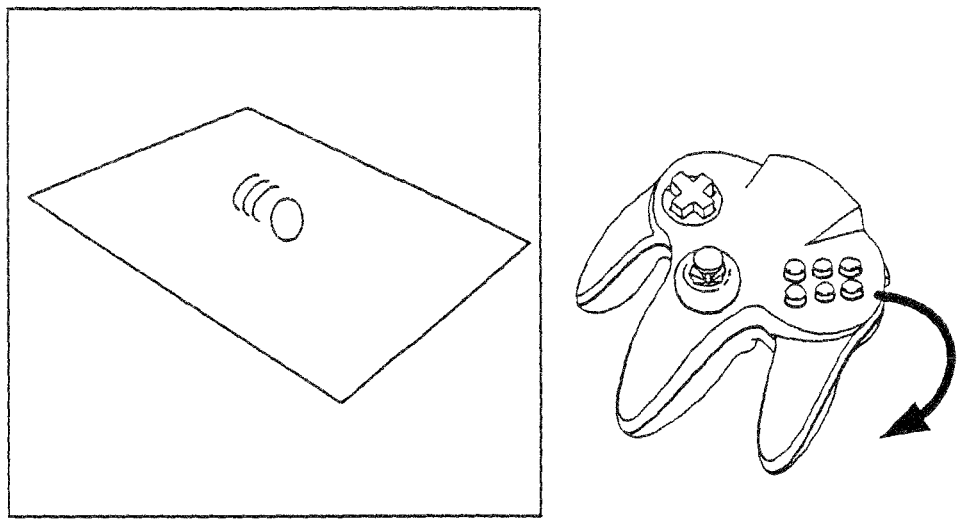
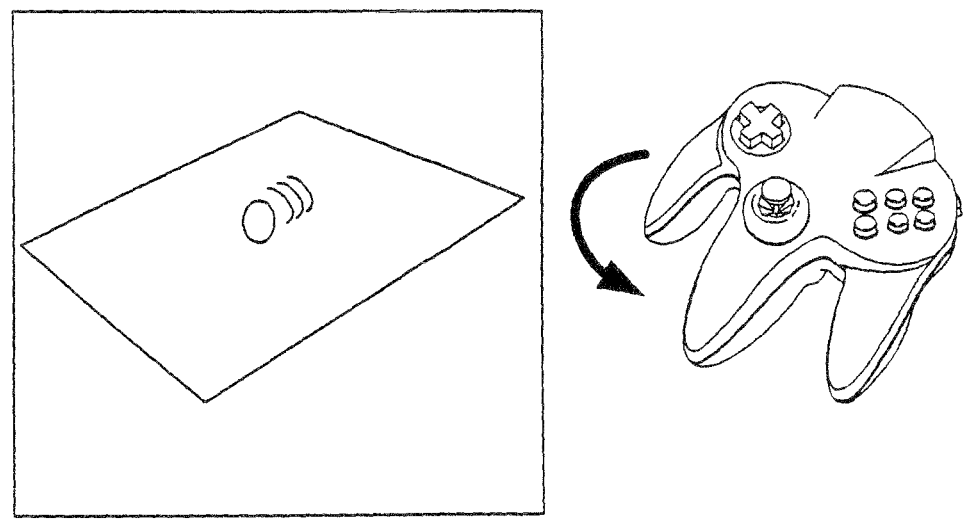

GAME SYSTEM AND GAME INFORMATION STORAGE MEDIUM USED FOR SAME

CROSS-REFERENCE TO RELATED APPLICATIONS

This application is a is a continuation of U.S. application Ser. No. 11/729,810, filed Mar. 30, 2007, now allowed, which is a divisional of U.S. application Ser. No. 10/638, 309, filed Aug. 12, 2003, now U.S. Pat. No. 7,223,173, which is a divisional of U.S. application Ser. No. 09/677, 577, filed Oct. 3, 2000, now U.S. Pat. No. 7,601,066, which claims priority to Japanese Application Nos. 11-282592, filed Oct. 4, 1999 and 2000-174573, filed Jun. 9, 2000, the entire contents of each of which are hereby incorporated by reference in this application.

BACKGROUND

Exemplary, non-limiting embodiments of the present invention relate to a game system and game information storage medium used for same. More particularly, exemplary, non-limiting embodiments of the present invention relate to a game system and game information storage medium used for same, which detects a change amount and direction of a tilt, movement or impact applied to a housing of a portable game apparatus or to a controller of a video game apparatus.

In operating the conventional portable game apparatus, a player manipulates the operation switch, such as a direction instructing key (joystick) or buttons while holding the video game machine's controller (controller housing) or portable game apparatus' housing by both hands. For example, if the player presses a direction instructing key at any one of up, down, left and right pressing points, a moving (player-controlled) character is moved in the pressed direction of up, down, left or right. If the action button is operated, the moving character is changed in its state of display, e.g. the moving character performs an action, such as jumping, as defined on the action button.

Also, in the conventional game apparatus or game software (game information storage medium), the player can operate the operation switch in order to change the motion of a moving (player-controlled) character acting as a player's other self on the screen. Consequently, it has been difficult for the player to change the game space (or background scene) freely through his or her manipulation.

In the conventional game operation method, the player has been required to remember the way to operate a game according to the suggestion given in the game-software instruction manuals. Furthermore, the use of a general-purpose operation switch has made it difficult to realize a change of the game space (or game scene) in a manner matching the player's feeling of manipulating the operation-switch, resulting in a mismatch between the player's feel of operation and the screen-display state. Under such situations, the player possibly encounters difficulty in concentrating on playing the game before mastering the way to manipulate the game, thus losing his or her interest.

Meanwhile, with the conventional game apparatus or game software, the game space (or background scene) could not have been changed by the player's operation, thus limiting the game space variation and hence amusement result therefrom.

SUMMARY

Therefore, it is one aspect of the present exemplary embodiments to provide a game system and game information storage medium used for same which can change the state of a game space according to the operation by a player.

Another aspect of present exemplary embodiments is to provide a game system and game information storage medium used for same which can change the state of a game space through simple operation so that a player can concentrate on game play with enhanced enthusiasm without the necessity of skill on operation way.

Still another aspect of present exemplary embodiments is to provide a game system and game information storage medium used for same which can realize the change of a game scene matching an operation feeling through by matching the player's operation and the game-space change.

Yet aspect of present exemplary embodiments is to provide a game system and game information storage medium used for same which can change the state of a game space through the interaction with a plurality of portable game apparatuses to allow a plurality of players to cooperate or compete, thereby providing a variety of game-space change states, enhanced interest of game and virtual reality amusement.

A first exemplary embodiment of the present invention is a game system having, in a related fashion, a game apparatus having game program storage means storing a game program and processing means for executing the game program, and display means to display an image based on a result of processing by the processing means. The game system includes a housing to be held by a player and change-state detecting means. The change-state detecting means is related to the housing so that it detects at least one of an amount (e.g. tilt amount, movement amount, impact amount or the like) and a direction (e.g. tilt direction, movement direction, impact direction or the like) of a change applied to the housing. The game program storage means stores game space data, a display control program and a simulation program.

The game space data includes image data to display a space for game play. A display control program causes the display means to display a game space based on the game space data. A simulation program simulates based on an output of the change-state detecting means such that a state of the game space is changed related to at least one of a change amount and a change direction applied to the housing.

Here, game space means a world of a game that the game is possible to play. The game space is different by game kind or genre, and is presented to a player through a display screen. For example, for an action or roll-playing game having a moving (player-controlled) character to move therein, game space may be a background, a maze or other maps. For a battle game, it may be a ring (in addition to this, the game space includes the space of the audience seats and the space above of ring). For a race game, it may be a space of a course for running the race and a periphery of the course. For a shooting game, a background scene such as a cosmic space for a background of a character (however, characters are not required, and a game space in which no character exists is contemplated). In a game using a tool, game space may be a scene to associate the use of a tool.

Simulation refers to game control for analogously representing a change caused in the actual space in a form of a game-space state change. The change caused in the actual space is based on at least one of an amount and a direction of a tilt, movement or impact applied to the housing. Game control includes the case of simulating a state change of the game space itself and the case of simulating an indirect effect upon another object caused by a change in state of the game space. The former is a case that simulation is made such that, when an impact is given to the housing, a land in the game space is transformed on an assumption that energy has been supplied to the game space. The latter is a case that simulation is made such that, when the housing is tilted, a ball existing on a maze plate rolls on an assumption that the maze plate as an example of the game space is tilted. Where simulating a state change of a game space, it is possible to consider varying a parameter such as a temperature rise in the game space, in addition to causing a change of display including land transformation.

A second exemplary embodiment of the present invention is a game information storage medium storing a game program and being detachably loaded in a game system. The game system is structured by operating means having a related display means and including a housing to be held by a player, change-state detecting means related to the housing for detecting at least one of an amount and a direction of a change applied to the housing, and processing means to display on the display means an image obtained by processing a program. The game information storage medium stores game space data, a display control program and a simulation program.

The game space data includes image data to display a space for game play. A display control program causes the display means to display a game space based on the game space data. A simulation program provides simulation based on an output of the change-state detecting means such that a state of the game space is changed related to at least one of an amount and a direction of a change applied to the housing.

A third exemplary embodiment of the present invention is a game information storage medium storing a game program and being detachably loaded in a portable game apparatus. The portable game apparatus includes a housing integrally having display means to be held by a player, and processing means to display on the display means an image obtained by processing a program. A change-state detecting means is provided which is related to one of the portable game apparatus and the game information storage medium for detecting at least one of an amount and a direction of a change applied to one of a housing of the portable game apparatus and the game information storage medium.

The game information storage medium stores game space data, a display control program and a simulation program. The game space data includes image data to display a space for game play. A display control program causes the display means to display a game space based on the game space data. A simulation program provides simulation based on an output of the change-state detecting means such that a state of the game space is changed related to at least one of an amount and a direction of a change applied to the housing.

A fourth exemplary embodiment of the present invention is a game system structured at least by two game apparatuses that interact with each other. The two game apparatuses each have game program storage means to store a program, processing means to execute a game program, and a housing to be held by a player, and in a related fashion display means to display an image based on a result of processing by the processing means. At least one of the two game apparatuses is related to its respective housing and has change-state detecting means to detect at least one of an amount and a direction of a change applied to the housing. The game system further has data transmitting means connected to the two game apparatuses for transmitting mutually-related data to the game apparatus on the opposite side.

The respective game program storage means of the two game apparatuses store game space data and display control programs. The game space data includes image data to display a space for game play. The display control program causes the display means to display a game space based on the game space data. The game program storage means of at least the other of the two game apparatuses further includes a simulation program to provide simulation based on an output of the change-state detecting means of the one game apparatus transmitted through the data transmitting means such that a state of the game space of the other of the game apparatuses is changed related to at least one of an amount and a direction of a change applied to the housing of one of the game apparatuses.

According to this aspect of present exemplary embodiments, it is possible to obtain a game system and game information storage medium used for same that can change a state of a game space.

Also, according to an aspect of present exemplary embodiments, a game system and game information storage medium used for same is to be obtained which can change the state of a game space through simple operation so that a player can concentrate on game play with enhanced enthusiasm without the necessity of skill on operation ways.

Also, according to an aspect of present exemplary embodiments, a game system and game information storage medium used for same is to be obtained which can realize the change of a game scene matched to an operation feeling through matching the player's operation and the game-space change.

Further, according to an aspect of present exemplary embodiments, a game system and game information storage medium used for same is to be obtained which can change the state of a game space through the interaction with a plurality of portable game apparatuses to allow a plurality of players to cooperate or compete, thereby providing a variety of game-space change states, an enhanced interest in the game and virtual reality amusement.

The above described features, aspects and advantages of the present exemplary embodiments will become more apparent from the following detailed description when taken in conjunction with the accompanying drawings.

BRIEF DESCRIPTION OF THE DRAWINGS

FIG. 13 is an illustrative view showing a way to utilize a slide input;

FIG. 20 is an acceleration-sensor output conversion table of the first embodiment;

FIG. 21 is an acceleration-sensor output conversion table of the first embodiment;

FIG. 22 is an acceleration-sensor output conversion table of the first embodiment;

FIG. 23 is an acceleration-sensor output conversion table of the first embodiment;

FIG. 24 is an acceleration-sensor output conversion table of the first embodiment;

FIG. 25 is an acceleration-sensor output conversion table of the first embodiment;

FIG. 26 is an acceleration-sensor output conversion table of the first embodiment;

FIGS. 43(a), 43(b) and 43(c) are an example of a game scene (range-of-sight moving process) of the second embodiment;

FIG. 68 is an example of a scene of a present embodiment which is applied to a controller of a home-use game apparatus.

DESCRIPTION OF EXEMPLARY, NON-LIMITING EMBODIMENTS (First Embodiment)

Figure 1:
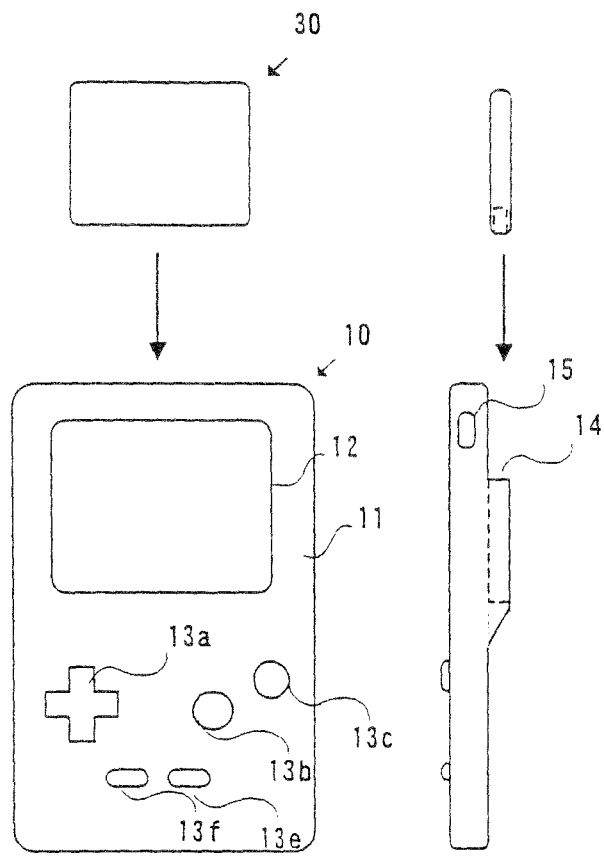
FIG. 1 is an external view of a portable game apparatus of one present exemplary embodiment.

With reference to FIG. 1 to FIG. 40, explanations will be made regarding a portable game apparatus according to a first present embodiment. FIG. 1 is an outside view showing a portable game apparatus. The portable game apparatus includes a game machine main body 10 and a game cartridge (hereinafter referred merely to as "cartridge") 30 to be unloadably loaded on the game machine main body 10. The cartridge 30, when loaded on the game machine main body 10, is put in electrical connection to the game machine main body. The game machine main body 10 is provided with a housing 11. The housing 11 includes therein a board having circuits configured as shown in FIG. 3, hereinafter described. The housing 11 has, on one main surface, a LCD panel 12 and operation keys 13a-13e and, on the other surface, a hole (cartridge insertion hole) 14 formed to receive a cartridge 30. A connector 15 is provided on a side surface, to allow connection with a communication cable for communication, as required, with other portable game apparatuses.

Figure 2:
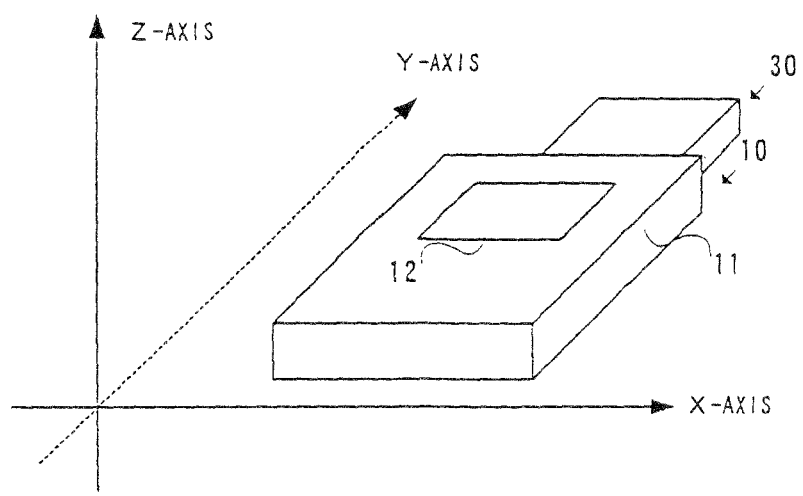
FIG. 2 is a view showing a definition of XYZ axes.
Figure 3:
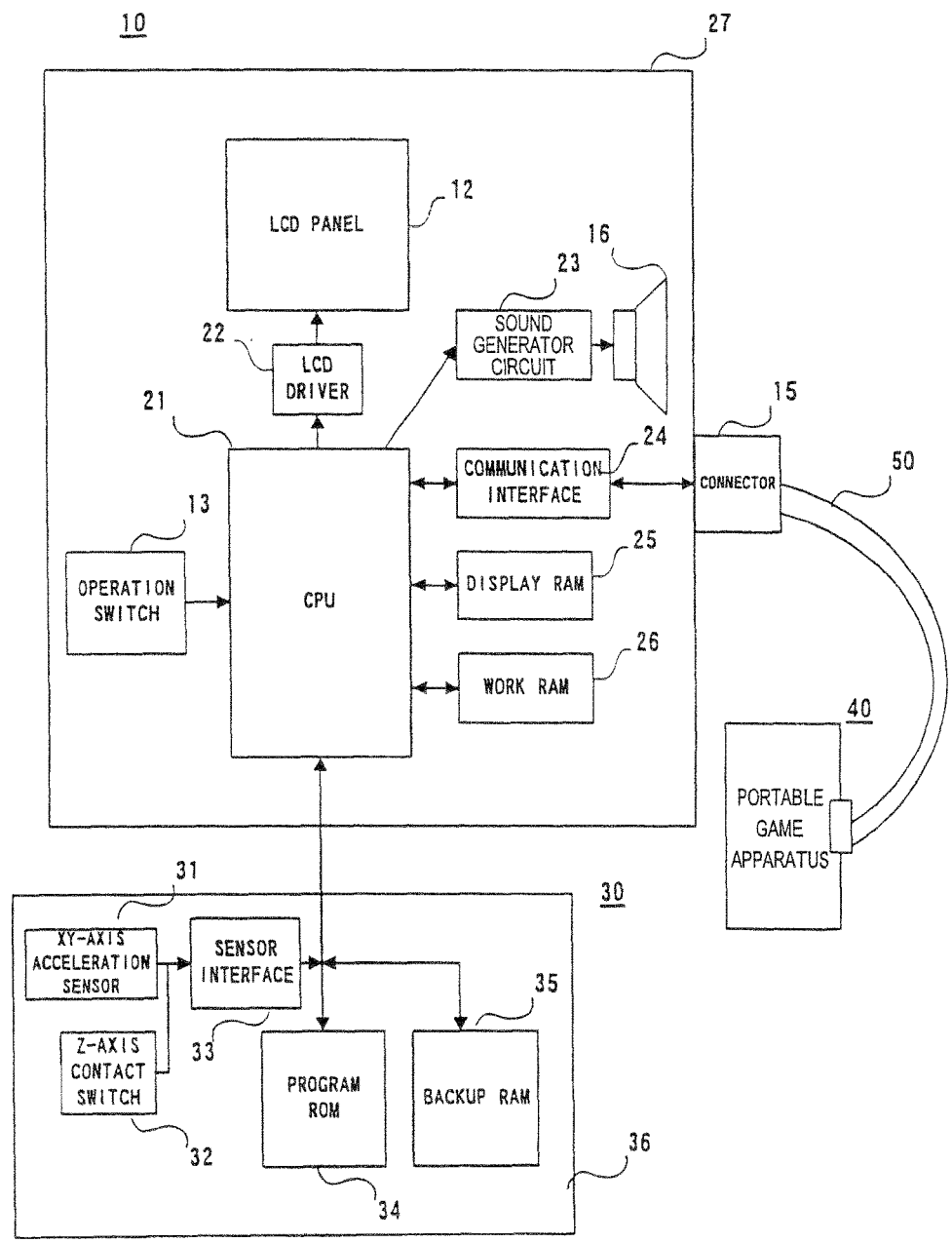
FIG. 3 is a block diagram of the portable game apparatus.

FIG. 2 is an illustrative view showing a relationship between the portable game apparatus and XYZ axes thereon. As illustrated, the portable game apparatus is positioned with the LCD 12 directed up and the operation switches also positioned toward this direction, an X-axis is taken in a horizontal direction of the portable game apparatus (a positive direction taken rightward), an Y-axis is in a vertical direction (a positive direction taken depthwise), and a Z-axis is in a thickness direction (a positive direction taken upward).

FIG. 3 is a block diagram of the portable game apparatus. The game machine main body 10 incorporates a board 27 therein. The board 27 is mounted with a CPU 21. The CPU 21 is connected with a LCD driver 22, an operation key 13, a sound generator circuit 23, a communication interface 24, a display RAM 25 and a work RAM 26. The sound generator circuit 23 is connected with a speaker 16. The communication interface 24 is to be connected to another portable game apparatus 40 through a connector 15 and communication cable 50. Note that, although the communication method with the other portable game apparatus 40 was shown by a method using the communication cable 50, it may use radio communication, handy phone or the like.

The cartridge 30 incorporates a board 36. The board 36 is mounted with a program ROM 34 storing a game program and game data, hereinafter described with reference to FIG. 16, and a backup RAM 35 storing game data, hereinafter described with reference to FIG. 19. In addition to the ROM 34 and the RAM 35, the cartridge 30 includes, as one example of detecting means for detecting tilt, movement and impact to the portable game apparatus main body, an XY-axis acceleration sensor 31 to detect accelerations in X-axis and Y-axis directions and a Z-axis contact switch 32 to detect an acceleration in a Z-axis direction. Also, the cartridge 30 includes a sensor interface 33 as an interface to the acceleration detecting means. Where using a triaxial acceleration sensor capable of detecting accelerations in all the X-axis, Y-axis and Z-axis directions, the Z-axis contact switch 32 will be unnecessary. Incidentally, the biaxial acceleration sensor (XY-axis acceleration sensor) is more inexpensive than the triaxial sensor. Because this embodiment does not require a high degree accuracy of acceleration detection in the Z-axis direction, a Z-axis contact switch 32 is employed that is simple in structure and inexpensive. Also, where high accuracy is not required in the XY-axis direction, detecting means having a similar structure to the Z-axis contact switch may be used for detecting an acceleration in the XY-axis direction.

The program ROM 34 stores a game program to be executed by a CPU 21. The work RAM 26 stores temporary data required to execute the game program. The backup RAM 35 stores game data to be kept stored even where a power to the portable game apparatus is turned off. The display data obtained through executing the game program by the CPU 21 is stored in the display RAM 25, which can be displayed on the LCD 12 through a LCD driver 22. Similarly, the sound data obtained through executing the game program by the CPU 21 is delivered to the sound generator circuit 23 so that sound is generated and output through the speaker 16. Operation switches 13 are provided to operate the game. However, the operation key 13 is an auxiliary being as far as the present embodiment is concerned. The player is allowed to operate the play of the game play principally by tilting or moving or giving impact to the portable game apparatus. The tilt, movement and impact to the portable game apparatus during game operation are to be detected by the XY-axis acceleration sensor 31 and Z-axis contact switch 12. The CPU 21 can execute the game program by utilizing the output values of the acceleration detecting means.

For a game using a plurality of portable game apparatuses, the data obtained through executing a game program by the CPU 21 is delivered to the communication interface 24 and then sent to another portable game apparatus 40 via the connector 15 and communication cable 50. Meanwhile, the game data of the other portable game apparatus 40 comes to the CPU 21 through the communication cable 50, connector 15 and communication interface 24.

Figure 4:
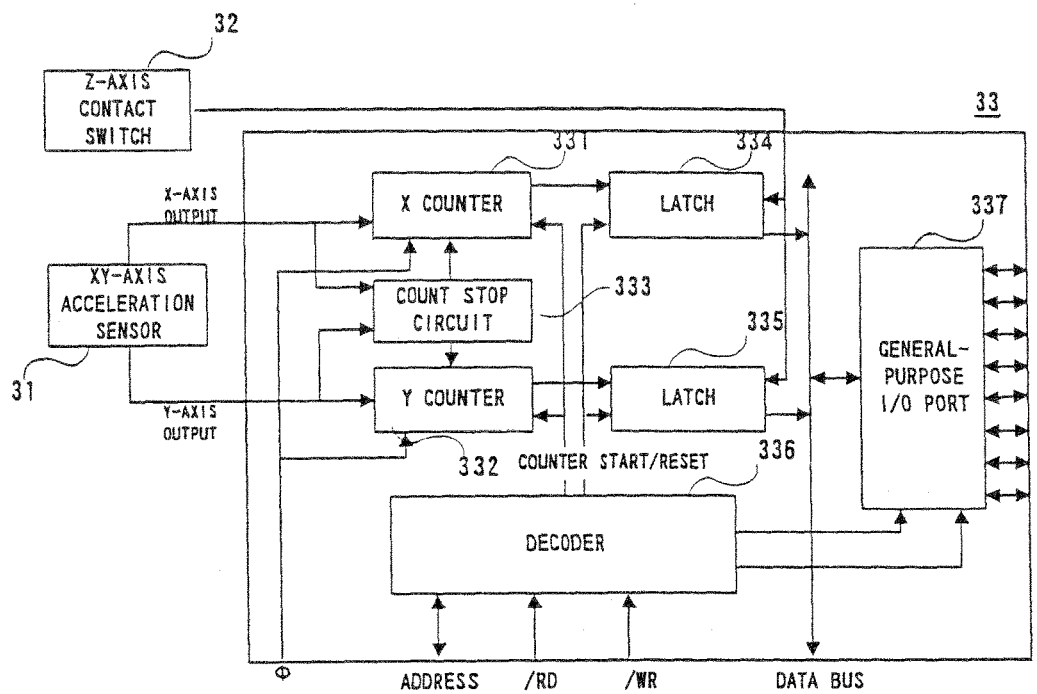
FIG. 4 is a block diagram of a sensor interface.

FIG. 4 is a detailed block diagram of the sensor interface 33. The sensor interface 33 includes an X counter 331, a Y counter 332, a count stop circuit 33, latches 334 and 335, a decoder 336 and a general-purpose I/O port 337. The X counter 331 counts pulses of a clock signal $\Phi$ based on an XY-axis output of the acceleration sensor 31. The Y counter 332 counts pulses of the clock signal $\Phi$ based on a Y-axis output. The count stop circuit 333 sends a count stop signal to the X counter 331 in response to a fall in an X-axis output of the XY-axis acceleration sensor 31, and a count stop signal to the Y counter 332 in response to a fall in the Y-axis output. The latches 334 and 335 hold respective values of the X counter 331 and the Y counter 332. The decoder 336 transmits a start/reset signal to the X counter 331, Y counter 332, latches 334 and 335. The general-purpose I/O port 337 is used to connect with an extension unit. The latches 334 and 335 also hold an output value of the Z-axis contact switch 32 ("0" or "1"). Specifically, a highest order bit of the latch 334, 335 is assigned to an output value of the Z-axis contact switch 32, while the remaining lower order bits are assigned to the values of the X counter 331 and Y counter 332. The extension units connectable to the general-purpose I/O port 337 include a vibration unit which vibrates in relation to a game program providing a game with a feeling of realism.

Figure 5:
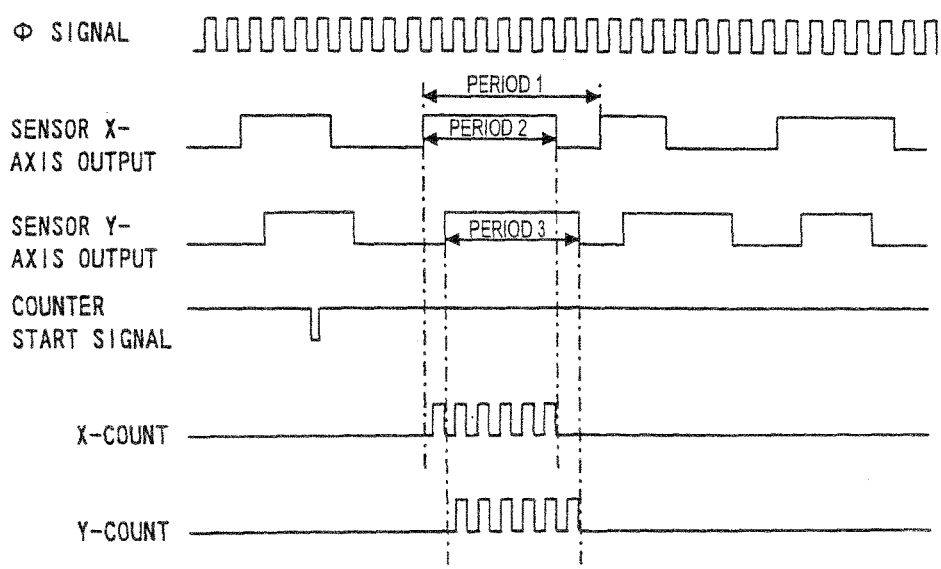
FIG. 5 is a diagram showing a principle on measuring the output of an acceleration sensor.

FIG. 5 is an illustrative view showing a principle that the sensor interface 33 measures a count value having a corresponding magnitude to an acceleration from an output of the acceleration sensor 31. The acceleration sensor 31 in this embodiment outputs a signal representative of an acceleration magnitude with a duty ratio that has changed with respect to one period of a waveform (period 1). It is shown in this case that the greater the ratio of a high level period (period 2 or period 3) within one period the greater an acceleration has been detected. Also, the acceleration sensor 31 outputs a magnitude of X-axis acceleration through its X-axis output and a magnitude of Y-axis acceleration through the Y-axis output.

When a count start signal outputted from the decoder 336 becomes a low level, the X counter 331 detects a rise from low to high level in the X-axis output and then starts counting. Specifically, the X counter 331 inches up its count value each time a clock signal $\Phi$ is given, and stops the counting in response to a count stop signal sent from the count stop circuit 333. In this manner, the X counter 331 counts the clock signal $\Phi$ during a period (period 2) between a rise of an X-axis output to a high level and a fall of same to a low level, immediately after the count start signal has become a low level. The Y counter 332, similarly, counts the clock signal $\Phi$ during a period (period 3) of between a rise of the Y-axis output to a high level and a fall of same to a low level, immediately after the count start signal has become low level. In this manner, the X counter 331 holds a count value dependent upon a magnitude of an X-axial acceleration while the Y counter 332 holds a count value dependent upon a magnitude of a Y-axial acceleration. The values of the X counter 331 and Y counter 332 are held in the latch 334 and latch 335 so that the data of latches 334 and 335 can be read out by the CPU 21 through the data bus and utilized for a game program.

The X counter 331 and the Y counter 332 each perform counting, for example, from "0" up to "31", wherein setting is made such that, with respect to a count value "15" as a reference (acceleration 0), −2G (twice a gravity acceleration in a minus direction) is assigned a count value of "0" and 2G (twice the gravity acceleration in a plus direction) is assigned a count value of "31". The CPU 21 reads in such a count value based on a game program wherein the count value "15" is read as "0", the count value "0" as "−15" and the count value "31" as "16". Accordingly, when the acceleration sensor 31 detects an acceleration in the negative direction, the CPU has a negative (−) reading value. When an acceleration in the positive direction is detected, the CPU has a positive (+) reading value.

Figure 6:
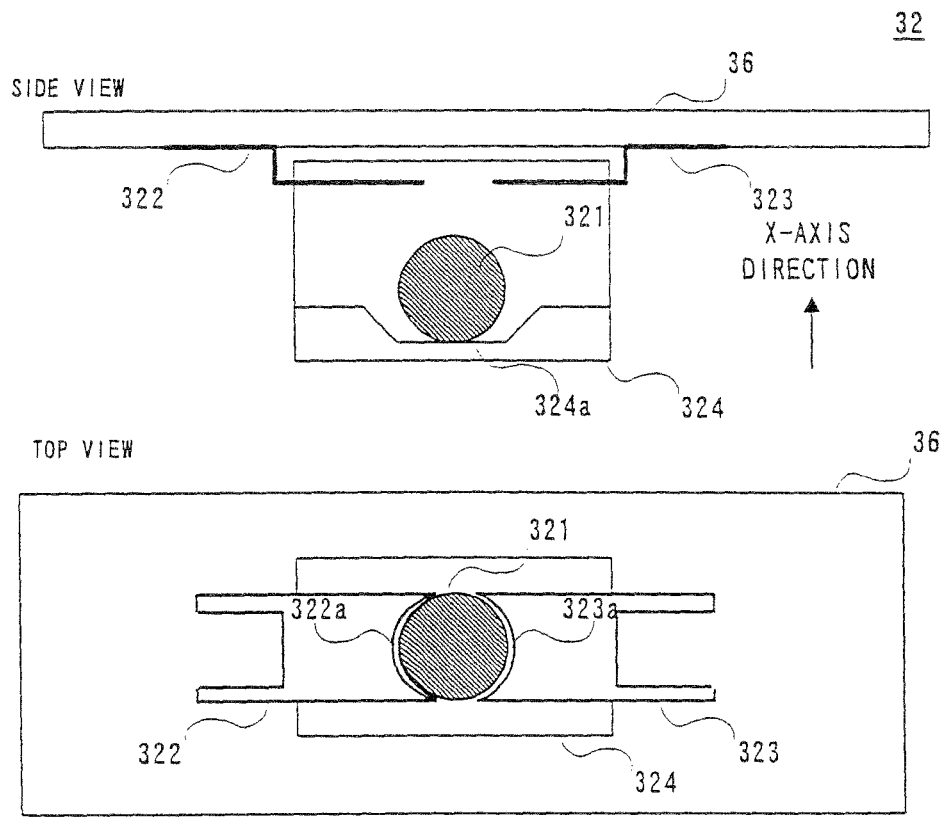
FIG. 6 is a side view and a top view of a structure of a Z-axis contact switch.
Figure 7:
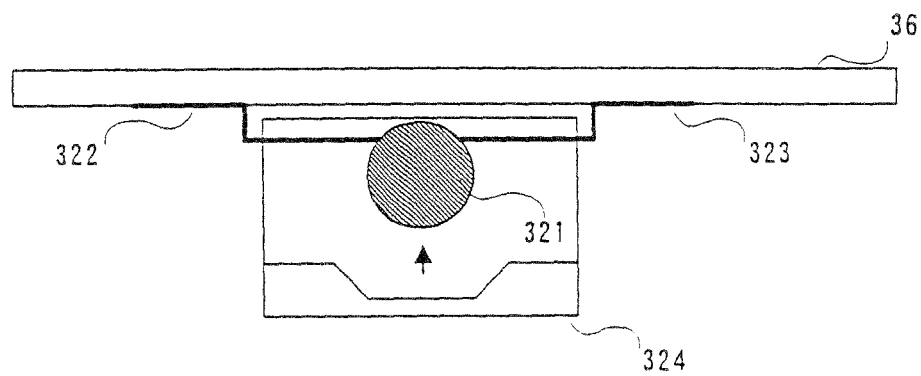
FIG. 7 is a view showing that a movement input (or impact input) in the Z-axis direction is detected by the Z-axis contact switch.

FIG. 6 shows (top view and side view) a structure of the contact switch 32. The contact switch 32 is structured by a spherical contact 321, contacts 322 and 323, and a box member 324 which are formed of a conductor. Specifically, the spherical contact 321 is movably held almost at a center of a space defined within the member 324. For this reason, the box member 324 has, in its inner bottom, a depression 324*a* at which the spherical contact 321 can rest at almost the center thereof. The box member 324 has, at above, sheet-formed contacts 322 and 323 having respective first ends formed with semicircular cut-outs 322*a* and 323*a*. The sheet contacts 322 and 323, at their respective other ends, are secured to a board 36 with the first ends opposed to each other. The box member 324 is fixedly held by the board 36 in a hung state through the contact 322 and 323. With this structure, if the cartridge 30 is powerfully moved in the Z-axis direction (in a plus (positive) or minus (negative) direction), the spherical contact 321 shown in FIG. 7 is moved in the Z-axis direction within the box member 324 and contacts with the contacts 322 and 323 simultaneously. Thus, the contact 322 and the contact 323 are conducted through the spherical contact 321, thereby detecting an acceleration input in the Z-axis direction. Based on a time for which the contact 322 and the contact 323 are in conduction, it is possible to detect a magnitude of acceleration in the Z-axis direction. When the cartridge 30 is moderately tilted, the spherical contact 321 moves in the box member 324 but does not short-circuit between the contacts 322 and 323, detecting no acceleration.

Figure 8:
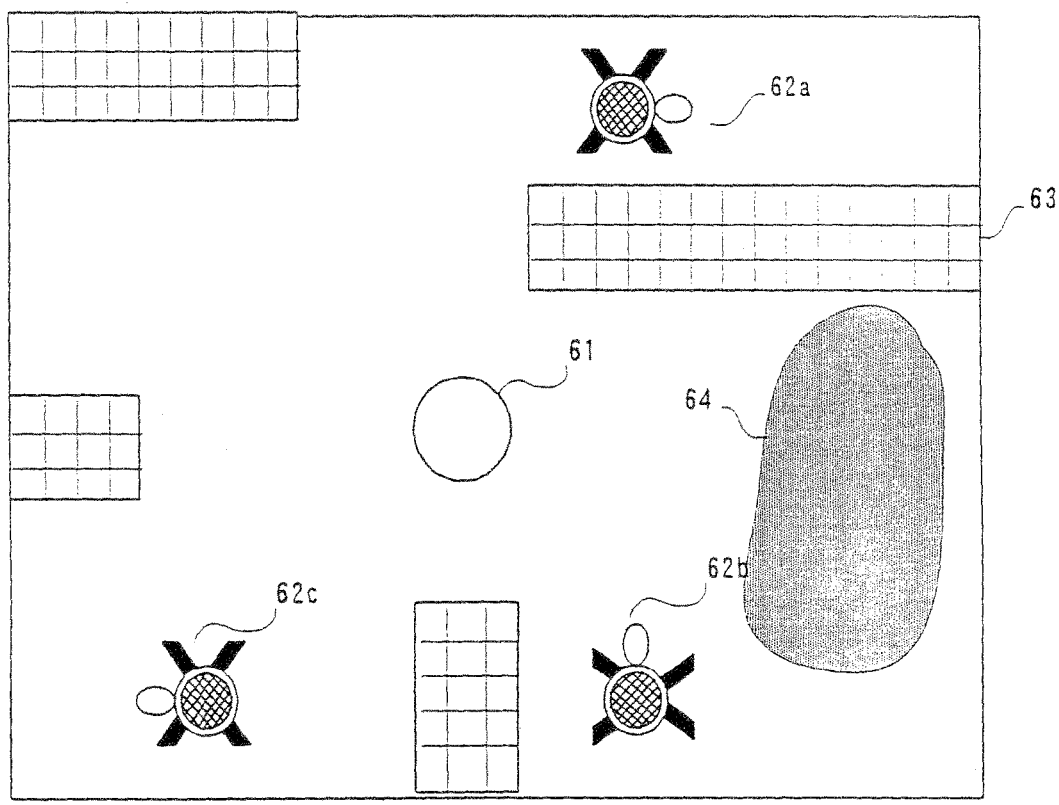
FIG. 8 is an example of a game scene of a first embodiment.

FIG. 8 shows an example of a game scene. In this game scene, a ball 61 as one example of a player character, tortoises 62 as examples of an enemy characters (non-player character; hereinafter abbreviated as "NPC"), and a wall 63 and hole 64 forming a maze are displayed. Because a game map is a virtual map that is broader than a display range on an LCD 12, LCD 12 can display only part of the game map so that scroll is made in accordance with the movement of the player character 61. Although three tortoises 62*a*-62*c* are displayed as NPC on the LCD 12, there exist many of other tortoises in the game map. Also, there exist on the game map such lands as floors, ice surfaces, and under water areas.

The ball 61 is changed in its moving amount or direction by the player's operation, such as tilting of or applying movement or impact to the portable game apparatus. The shape is changed as required. Although the movement of the tortoises 62*a*-62*c* are controlled (moved by self-control) by the game program, they are moved or changed in shape where the player tilts, moves or gives impact to the portable game apparatus.

Outlining this game, a player can manipulate the ball 61 on the game map with a maze formed by the walls 63, and smashes the tortoises 62*a*-62*c* as an example of NPC. A tortoise, if smashed, will vanish or be erased away. If all the tortoises are successfully vanished out of the game map, a game clear is reached. There exist some holes 64 on the game map. If the ball 61 falls into the hole 64, one mistake is counted or the game becomes over.

Figure 9:
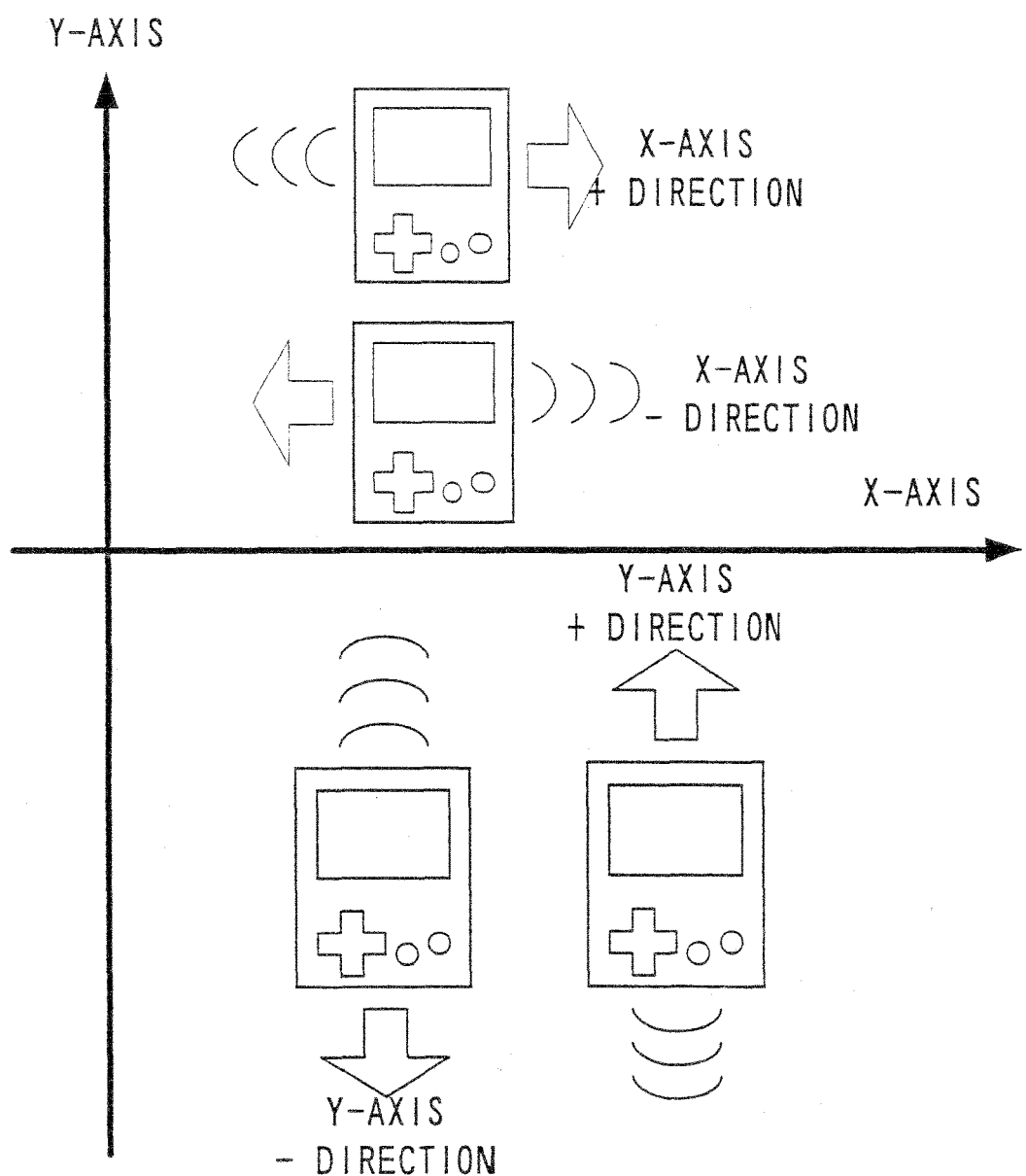
FIG. 9 is an illustrative view showing a slide input.
Figure 10:
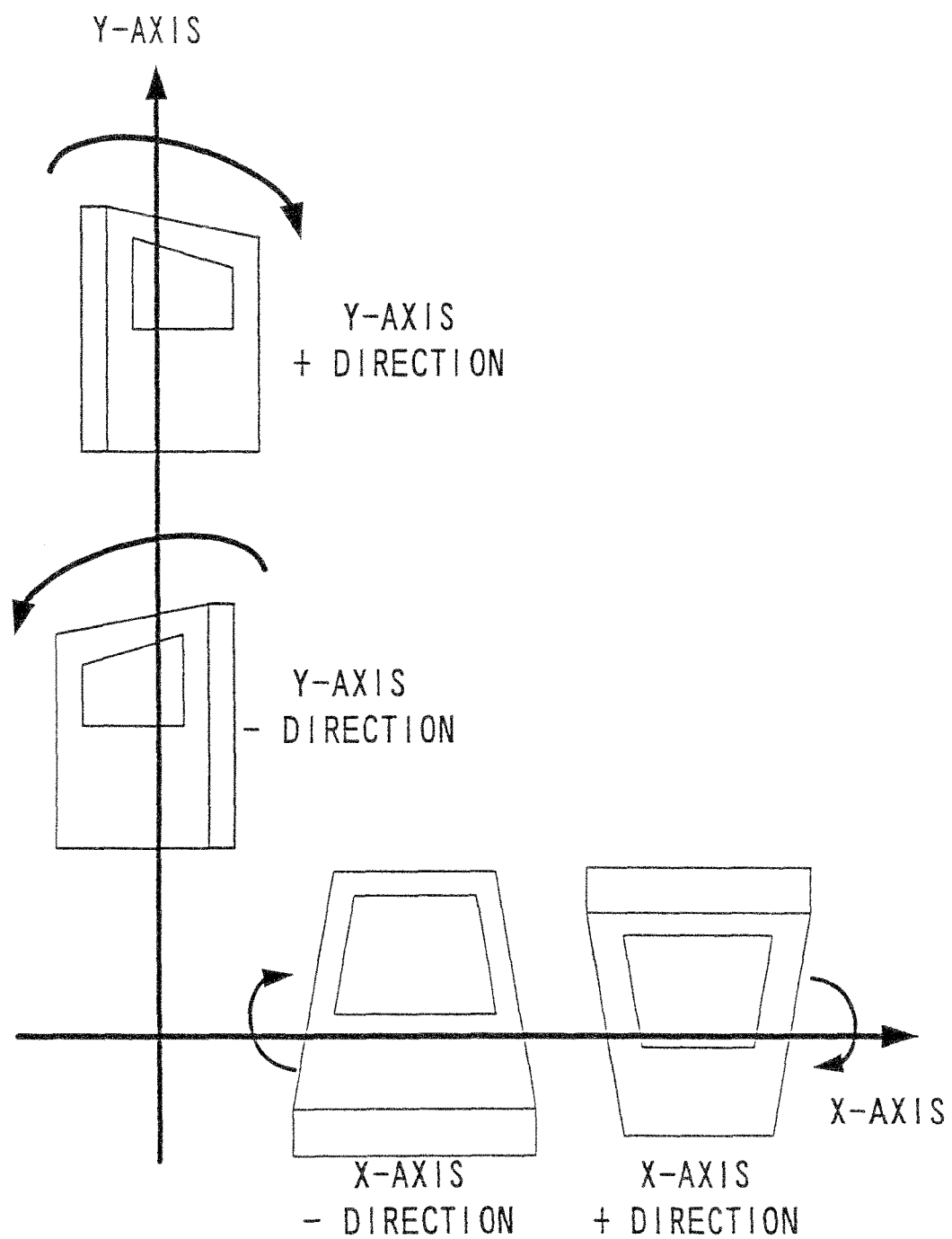
FIG. 10 is an illustrative view showing a tilt input.
Figure 11:
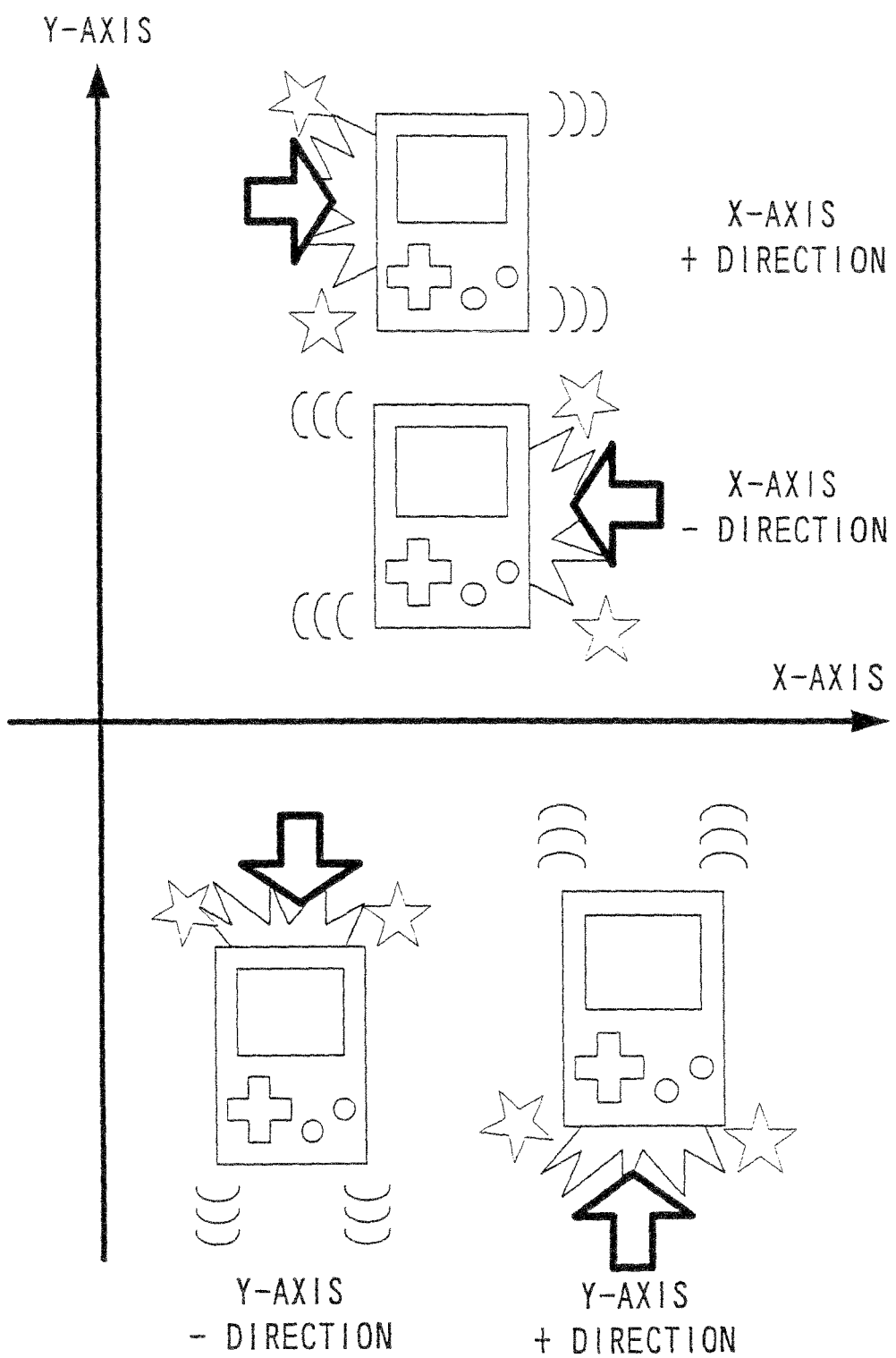
FIG. 11 is an illustrative view showing an impact input in an X-axis or Y-axis direction.
Figure 12:
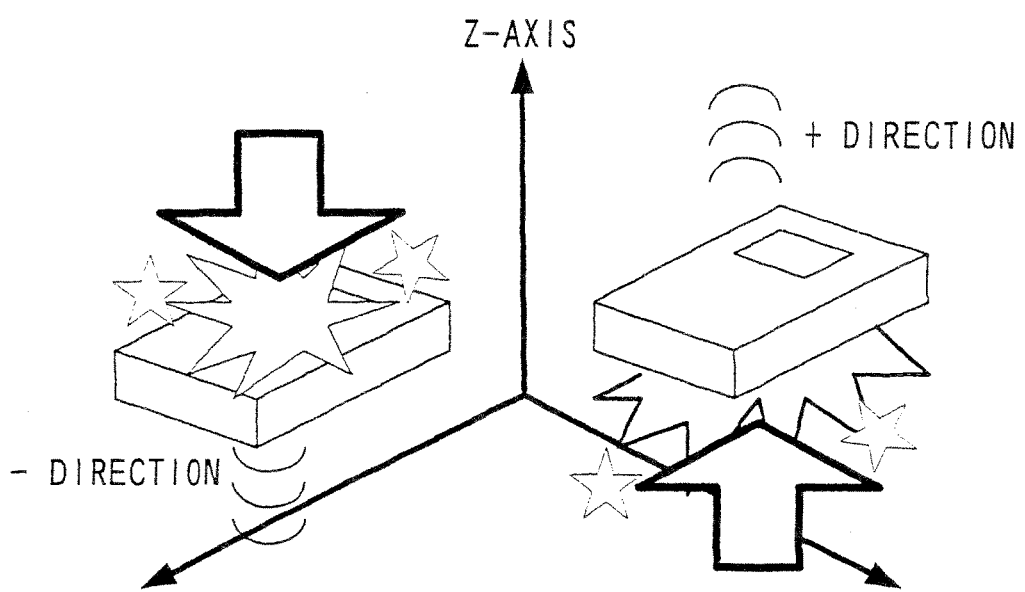
FIG. 12 is an illustrative view showing a movement input (impact input) in the Z-axis direction.

FIG. 9 to FIG. 12 illustrate examples of game operation. FIG. 9 illustrates a slide input in the X-axis or Y-axis direction. A movement (slide) in the X-axis direction is detected based upon an X-axis output of the XY-axis acceleration sensor 31, and a movement (slide) in the Y-axis direction is detected based on a Y-axis output of the XY-axis acceleration sensor 31 (acceleration is caused by movement in the X-axis or Y-axis direction). FIG. 10 illustrates a tilt input about the X or Y axis. A tilt about the X-axis is detected based on a Y-axis output of the XY-axis acceleration sensor 31, and a tilt about the Y-axis is detected based upon an X-axis output of the XY-axis acceleration sensor 31 (a tilt if caused about the X-axis gives rise to acceleration in the Y-axis direction due to gravity, and a tilt if caused about the Y-axis causes acceleration in the X-axis direction due to gravity). FIG. 11 illustrates an impact input in the X-axis or Y-axis direction. The acceleration input in the X-axis direction is outputted at an X-axis output of the XY-axis acceleration sensor 31. If this output value is a constant value or greater, it is considered that there has been an impact input. Also, the acceleration input in the Y-axis direction is outputted at a Y-axis output of the XY-axis acceleration sensor 31. If this output value is a constant value or greater, it is considered that there has been an impact input. FIG. 12 illustrates a movement input (or impact input) in the Z-axis direction. The movement (or impact) in the Z-axis direction is detected by the Z-axis contact switch 32.

Figure 14:
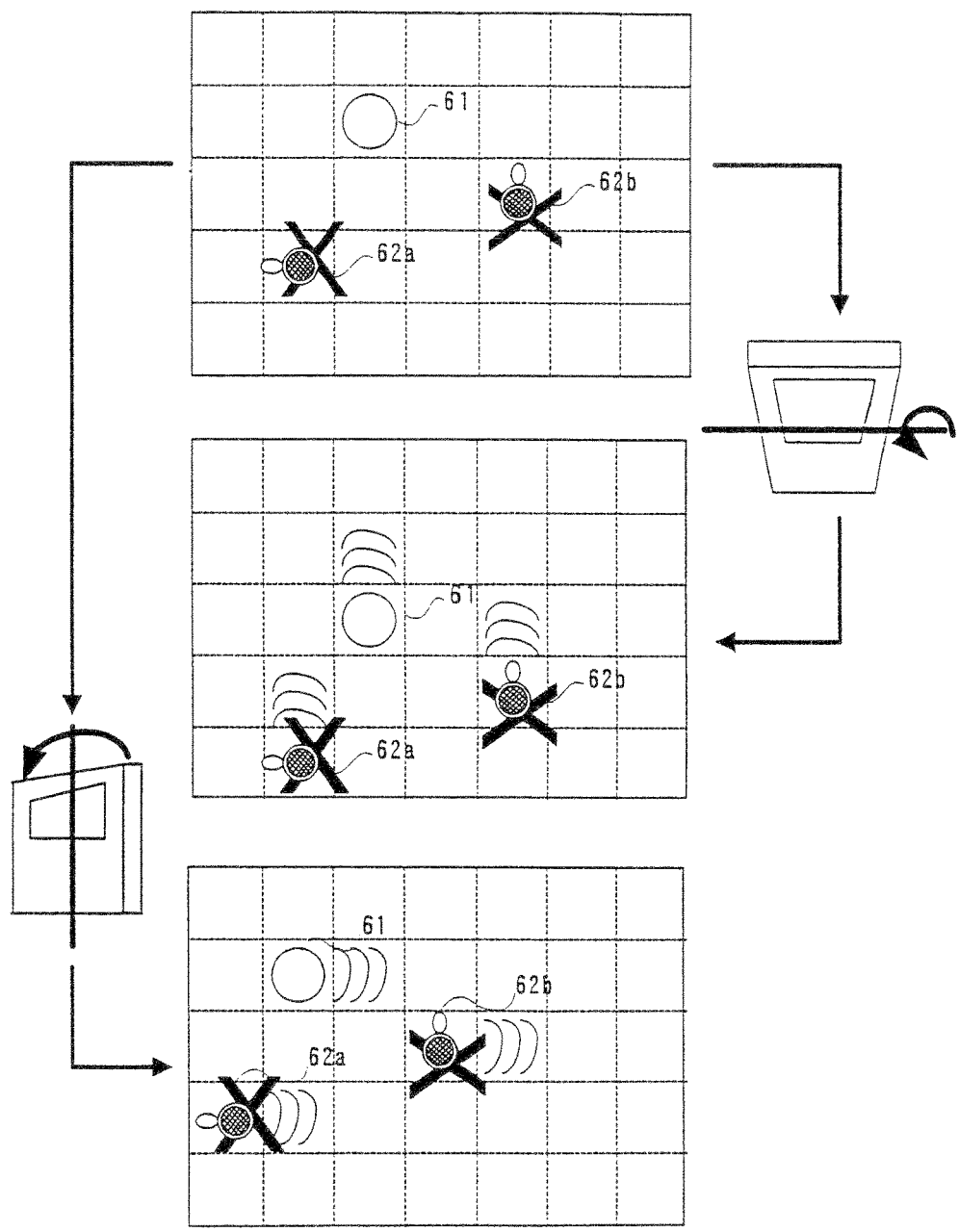
FIG. 14 is an illustrative view showing a way to utilize a tilt input.
Figure 15:
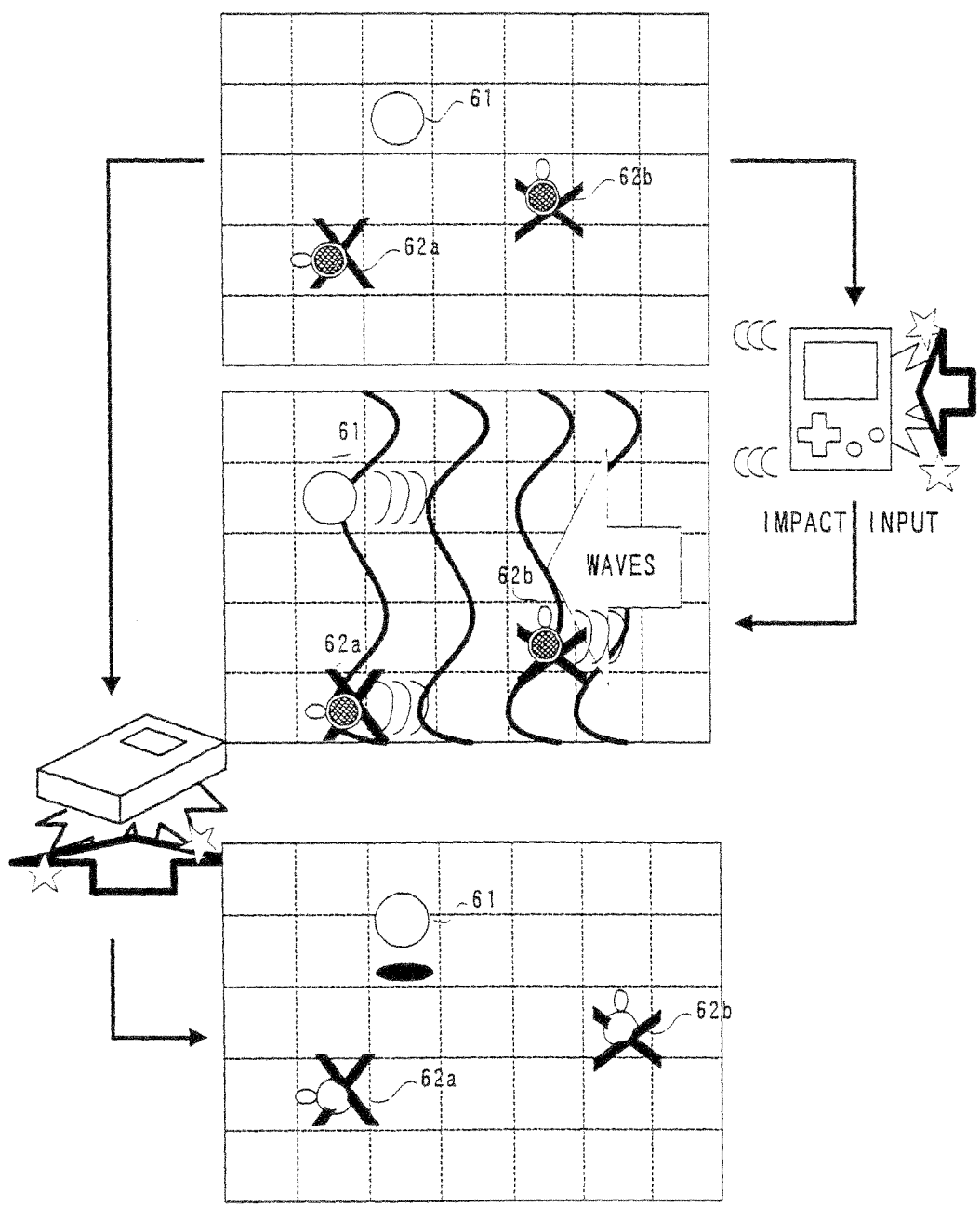
FIG. 15 is an illustrative view showing a way to utilize an impact input.

FIG. 13 to FIG. 15 illustrate an examples of a way to utilize the respective ones of game operation stated above. FIG. 13 illustrates a way to utilize a slide input (as one example of a game scene in a game map select process hereinafter described with reference to FIG. 30). In a case of displaying on the LCD 12 partial area of a virtual map broader than a display range of the LCD 12, the display area is scrolled by giving a slide input. Specifically, where providing a slide input in an X-axis plus (i.e., positive) direction, to be displayed is an area moved in the X-axis plus (i.e., positive) direction from the present display area. A slide input in the Y-axis direction is similarly processed. By thus processing a slide input, it is possible to provide a player with a feeling as if he or she is viewing part of a vast world through the LCD 12. Incidentally, in this embodiment, such slide input is merely utilized in a game map select process hereinafter described with reference to FIG. 30, but not utilized in a game-map scroll process as a main game process. The way of processing the scroll of a game map will be hereinafter described with reference to FIG. 38 to FIG. 40.

FIG. 14 illustrates a way to utilize a tilt input about an X or Y axis. Where there is a tilt input about the X-axis, display is made such that a game character in a game scene (player character 61 and NPC 62) removes parallel in the Y-axis direction (where tilting in a plus (i.e., positive) direction about the X-axis, display is made such that the game character moves parallel in a Y-axis minus (i.e., negative) direction). Also, where there is a tilt input about the Y-axis, display is made such that the game character in the game scene, player character 61 and NPC 62) moves parallel in the X-axis direction (where tilting in a minus direction about the Y-axis, display is made such that the game character moves parallel in an X-axis minus direction). By thus processing a tilt input, it is possible to provide a player with a feeling as if a maze plate, as a game space, was being tilted likewise manner as the portable game apparatus, and the game character was sliding (rolling) over the tilted maze plate. Incidentally, the game map includes lands, such as floor surface, ice surface and underwater areas. These lands vary the amount of the ball's movement so that the amount is varied by a tilt input in a manner dependent upon a place where the game character is present. For example, the magnitude of control of the ball 61 is changed in such a way that the movement amount is great on an ice surface easy to slide, whereas the movement amount is small at underwater area.

FIG. 15 shows a way to utilize impact input or Z-axis movement input. When an impact input is applied in the X-axis or Y-axis direction, a different process is performed from the tilt input process (game character movement due to tilting the maze plate). For example, waves are caused in a water surface of the game space. When an impact input is applied in the X-axis plus direction, waves are caused in the X-axis plus direction. When an impact input is applied in an X-axis minus direction, waves are caused in the X-axis minus direction. This is true for an impact input in a Y-axis direction. Meanwhile, waves may be caused in a direction of a resultant vector of vector components, wherein an acceleration input in the X-axis direction is taken as a vector component in the X-axis direction while an acceleration input in the Y-axis direction is taken as a vector component in the Y-axis direction. The character is displayed as if it was carried away by the waves. The character may be put out of control while it is being carried by the waves. Also, when there is an input of movement in the Z-axis direction (or impact input), the ball 61, as one example of a player character, the display changes so that it appears that the ball 61 makes a jump. By thus processing the movement input in the Z-axis direction, the maze plate as a game space moves in the Z-axis direction in a way similar to the portable game machine. This can provide the player with a feeling as if the game character on the maze plate was caused to jump. During the jump, the ball 61 will not move even if there is a tilt input. Also, when there is a movement input (or impact input) in the Z-axis direction, the tortoise 62 as NPC is turned upside down (a tortoise upside down returns to the normal position). The tortoise in an upside-down position is easy to slide, so that the movement process is made to give a greater tilt-input moving amount than if the tortoise was in the normal position.

Figure 16:
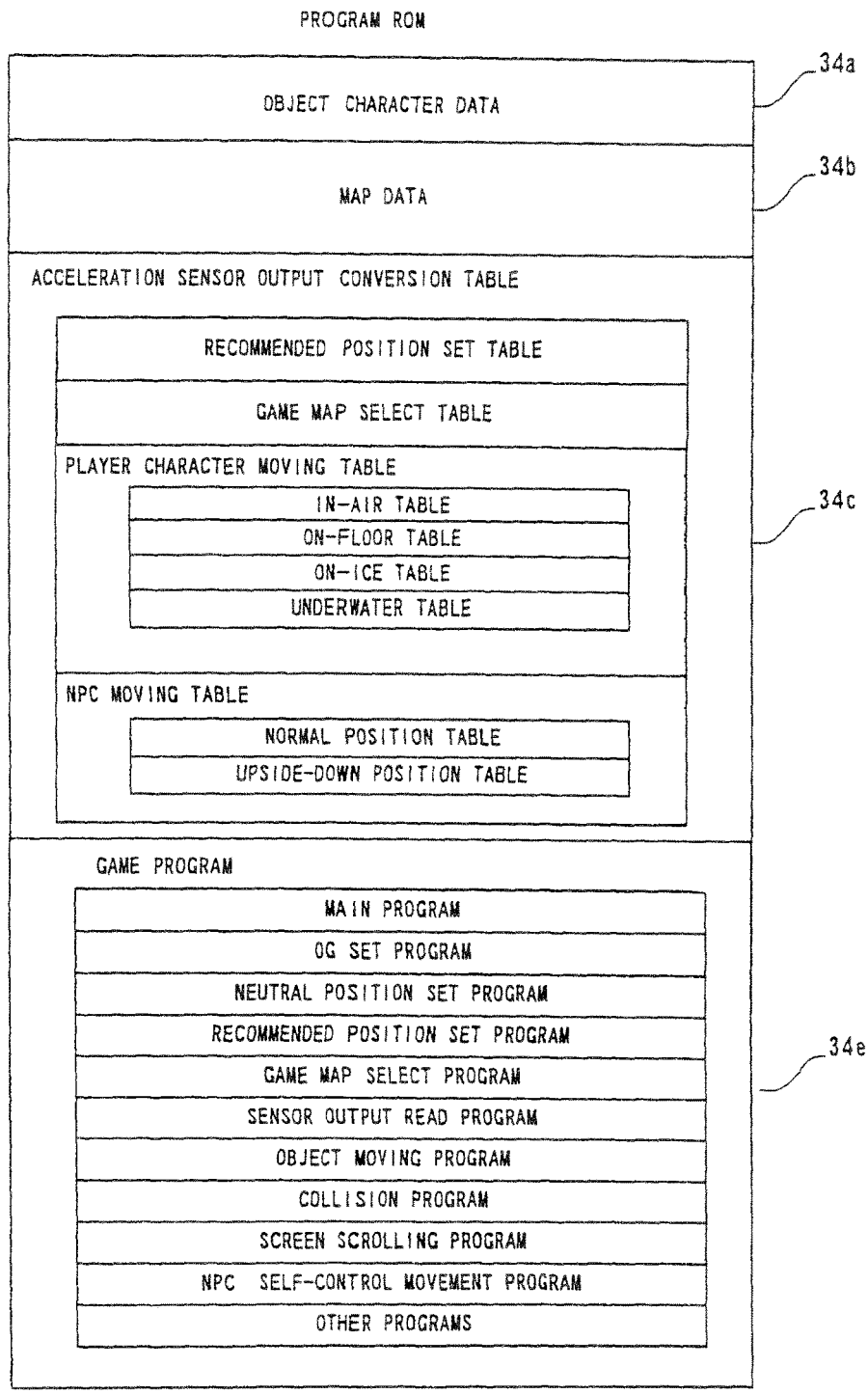
FIG. 16 is a memory map of a program ROM of the first embodiment.

FIG. 16 is a memory map of the program ROM 34. The program ROM 34 stores a game program and game data to be executed by the CPU 21. The program ROM 34 includes an object character data memory area 34a, a map data memory area 34b, an acceleration-sensor output value conversion table memory area 34c and a game program memory area 34e. The object character data memory area 34a stores graphic data of the object characters. Because the object character has some poses (e.g. tortoise "normal position" and tortoise "upside-down position", etc.), for each character a plurality of respective sets of graphic data are stored for a plurality of poses. The map data memory area 34b stores map data on a game map basis and game-map-select maps. The game-map select map is virtual map data to be displayed on the LCD 12 during a game map select process hereinafter described with reference to FIG. 30.

The acceleration-sensor output value conversion table memory area 34c stores conversion tables to convert output values of the XY-axis acceleration sensor 31 and Z-axis contact switch 32, for utilization in a game program. The conversion tables includes a game map select table, a player character moving table and an NPC moving table. The player character moving table includes tables for in-air, on-floor, on-ice and underwater, which are to be selected depending upon a land coordinate where a player character is present. The NPC moving table includes tables for normal position and upside-down position. The tortoise as NPC assumes states of normal and backside-down positions, depending upon which a table is to be selected. The details of the tables will be hereinafter described with reference to FIG. 20 to FIG. 26.

The game program memory area 34e stores various game programs to be executed by the CPU 21. Specifically, stored in the game program memory area 34e are the following: a main program hereinafter described with reference to FIG. 27, a 0G set program hereinafter described with reference to FIG. 28, a neutral-position set program hereinafter described with reference to FIG. 29, a game map select program hereinafter described with reference to FIG. 30, a sensor output read program hereinafter described with reference to FIG. 31, an object moving program hereinafter described with reference to FIG. 32 to FIG. 36, a collision program hereinafter described with reference to FIG. 37, a screen scrolling program hereinafter described with reference to FIG. 40, an NPC self-controlled movement program and other programs.

Figure 17:
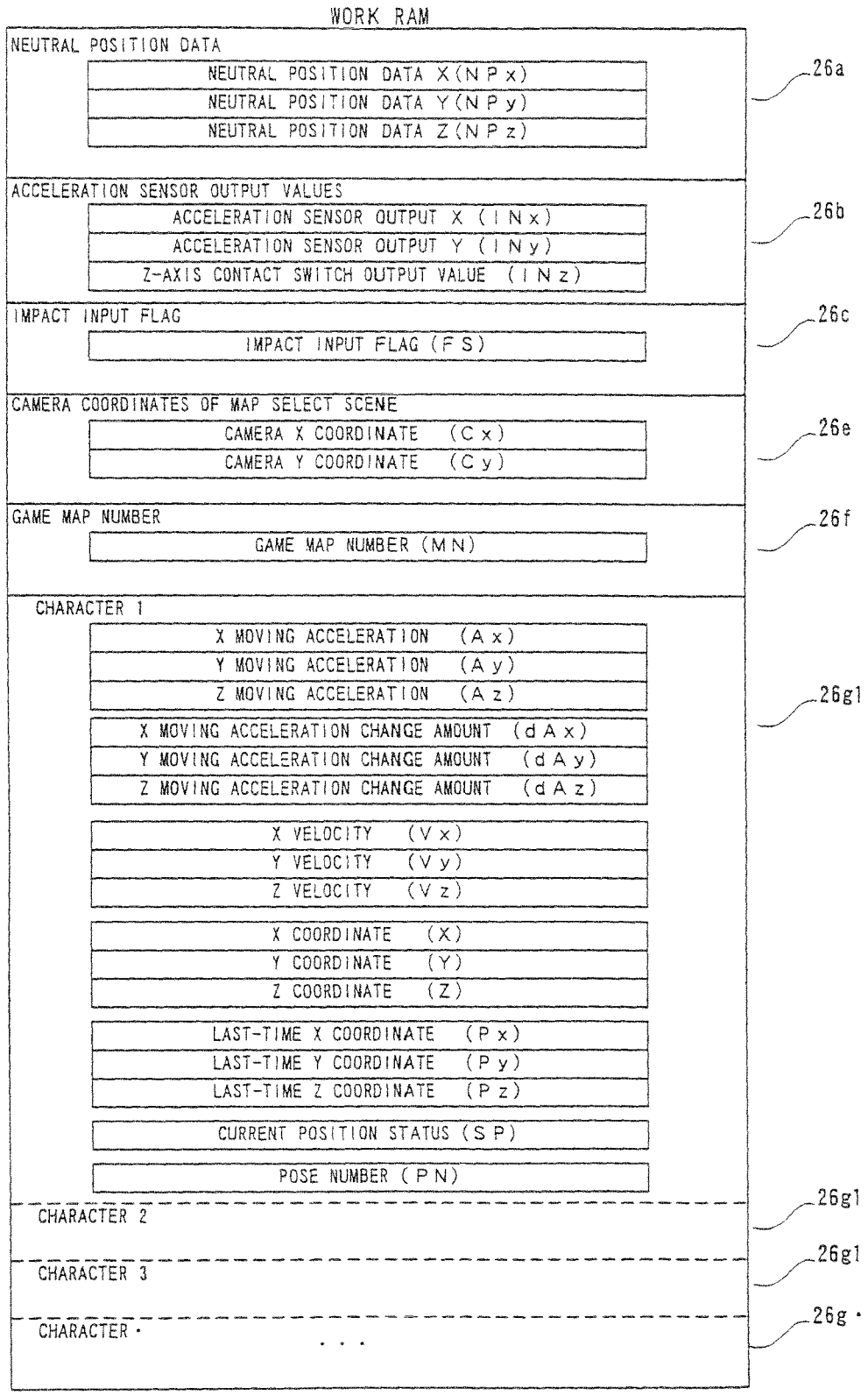
FIG. 17 is a memory map of a work RAM of the first embodiment.

FIG. 17 is a memory map of the work RAM 26. The work RAM 26 stores temporary data for executing a game program by the CPU 21. Specifically, the following memory areas are included in the work RAM 26: a neutral position data memory area 26a, an acceleration sensor memory area 26b, an impact input flag memory area 26c, a map select screen camera coordinate memory area 26e, a game map number memory area 26f and a character data memory area 26g.

The neutral position data memory area 26a stores neutral position data (NPx, NPy, NPz) to be set in a neutral-position set process hereinafter described with reference to FIG. 29. This data concerns a reference tilt of the portable game apparatus for playing a game.

Figure 31:
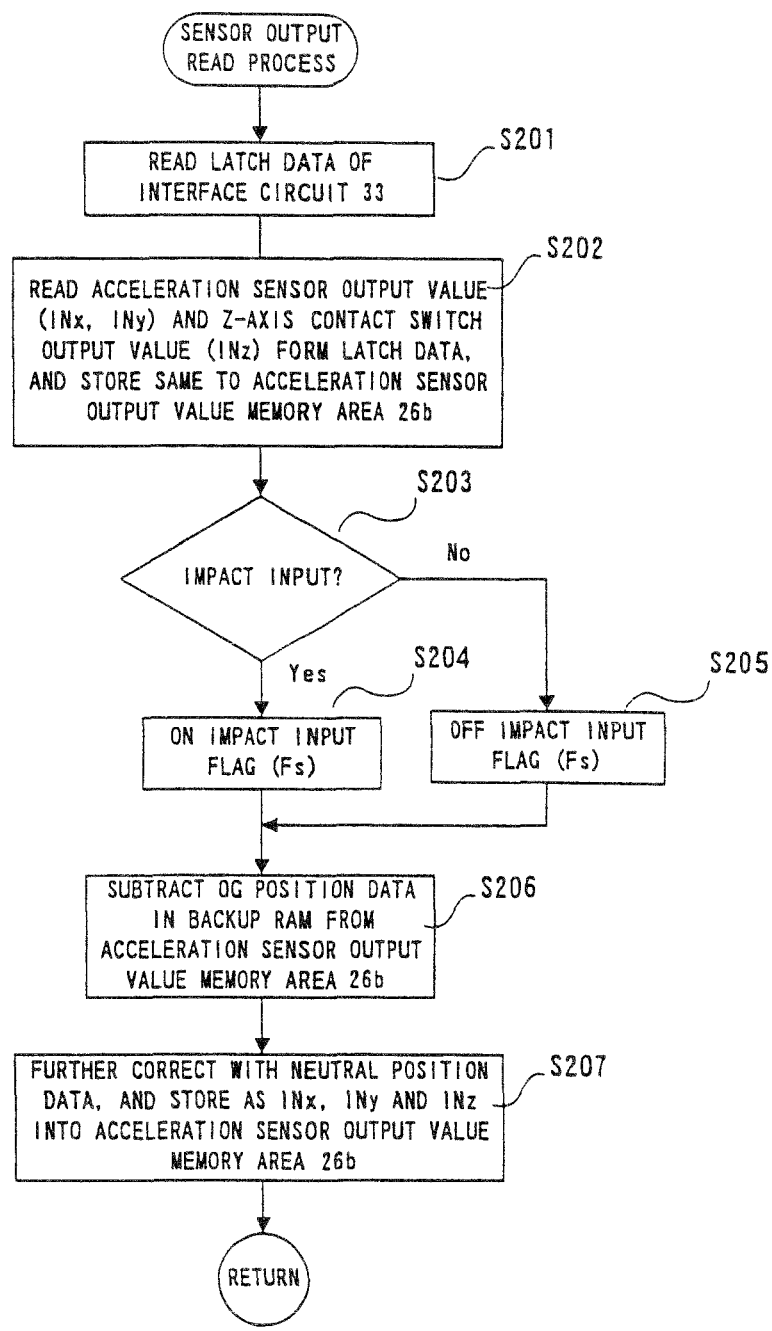
FIG. 31 is a sensor output read process flowchart of the first embodiment.

The acceleration-sensor output value memory area 26b stores output values (INx, INy, INz) of the XY-axis acceleration sensor 31 and Z-axis contact switch 32 which are detected by the acceleration sensor 31 and contact switch 32, respectively, and are read out through the sensor interface 33 in a sensor output read process of FIG. 31. The impact input flag memory area 26c stores an impact input flag (FS) that assumes a value of 1 when the magnitude of resultant vector of a vector component in the X-axis direction taken of an acceleration input in the X-axis direction and a vector component in the Y-axis direction taken of an acceleration input in the Y-axis direction is equal to or greater than a constant value. The determination of an impact input is executed in a sensor output read process of FIG. 31.

The map select screen camera coordinate memory area 26e stores coordinates (Cx, Cy) at upper left corner of an LCD 12 display area in a game map select map which is to be displayed in a game map select process hereinafter described with reference to FIG. 30. The game map number memory area 26f stores corresponding number data (MN) to a game map that is selected by a player during a game map select process hereinafter described with reference to FIG. 30.

The character data memory area 26g stores, for each of the player characters and NPCs, moving acceleration data (Ax, Ay, Az), moving-acceleration change amount data (dAx, dAy, dAz), velocity data (Vx, Vy, Vz), coordinate data (X, Y, Z), last-time coordinate data (Px, Py, Pz), current position status (SP) and pose numbers (PN).

The last time coordinate data (Px, Py, Pz) returns a player character or NPC to its last-time coordinates when it collided with a wall or the like. The current-position status data (SP) concerns a land at a coordinate where the player character is present. Based on this data, an acceleration-sensor output value conversion table (in-air, on-floor, on-ice, underwater) is to be selected. The pose number (PN) is data concerning a character state (pose) (e.g. tortoise normal and upside-down positions, etc.).

Figure 18:
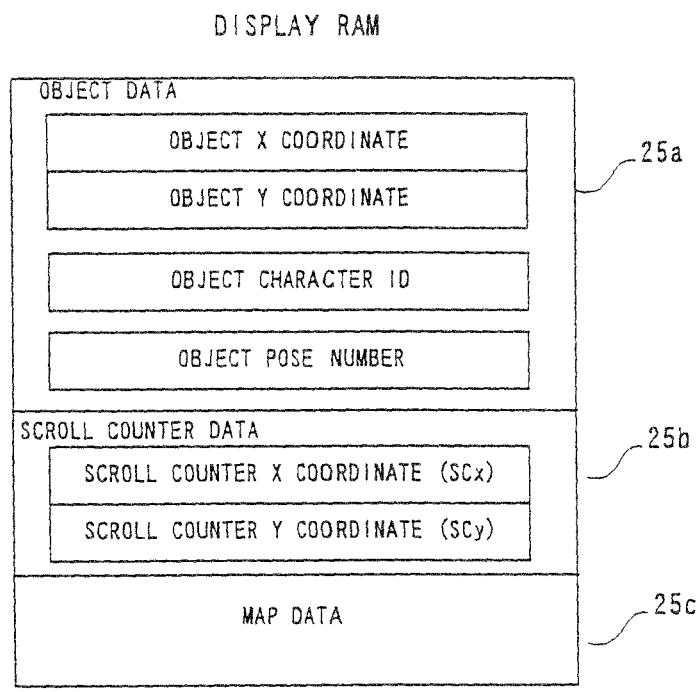
FIG. 18 is a memory map of a display RAM of the first embodiment.

FIG. 18 is a memory map of the display RAM 25. The display RAM 25 temporarily stores display data obtained through the execution of a game program by the CPU 21. The display RAM 25 has an object data memory area 25a, a scroll counter data memory area 25b and a map data memory area 25c. The object data memory area 25a stores data of the existing characters in the LCD 12 display area among all the characters to appear in a game. Specifically, stored area X-coordinates, Y-coordinates, character IDs, and pose numbers.

The scroll counter data memory area 25b stores a relative coordinate of an upper left corner of the LCD 12 display area of the game. The map data memory area 25c stores game map data of the game map in an area to be displayed on the LCD 12.

Figure 19:
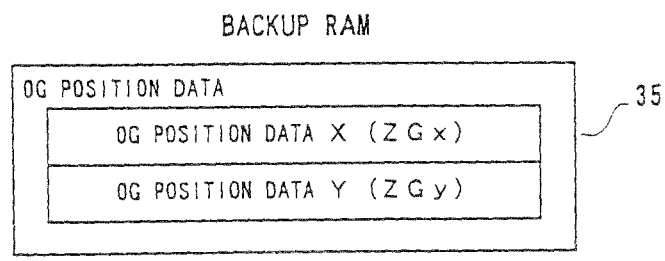
FIG. 19 is a memory map of a backup RAM of the first embodiment.

FIG. 19 is a memory map of the backup RAM 35. The backup RAM 35 stores 0G position data (ZGx, ZGy) to be set in a 0G set process hereinafter described with reference to FIG. 38. The 0G position data copies with not having a sensor output value of 0 because of the error possessed by the XY-axis acceleration sensor even when the portable game apparatus is held horizontal. A sensor output value when the portable game apparatus is held horizontal is stored as 0G position data in the backup RAM 35, which in the game process, is subtracted from a sensor output value.

FIG. 20 to FIG. 26 illustrate in detail conversion tables stored in the acceleration-sensor output value conversion table memory area 34c of the program ROM 34. The conversion tables store data, concerning utilization methods and correction of limiting maximum values, etc., for utilizing sensor output values (INx, INy, INz) of the XY-axis acceleration sensor 31 and Z-axis contact switch 32 and impact input flag (FS) in game processing. Specifically, data is stored concerning utilization methods, correction ratio, special correction conditions and special correction numbers. The tables are stored in plurality, including a game-map select process table, player-character moving table and an NPC moving table.

The game map select processing table shown in FIG. 20 is made with reference to a game map select process hereinafter described with reference to FIG. 30. The output values (INx, INy) of the XY-axis acceleration sensor of this table are utilized for calculating camera coordinates (Cx, Cy) change amount. Incidentally, because the correction ratio is wise, the camera coordinates (Cx, Cy) will be moved twice the output value (INx, INy) of the XY-axis acceleration sensor 31. The output value (INz) of the Z-axis contact switch 32 is utilized for a map decision determining process. The impact input flag (FS) is not utilized.

The player character moving table shown in FIG. 21 to FIG. 24 is made in reference to a tilt movement process to be executed at step S33, and in an impact movement process to be executed in step S33 in a player character moving process hereinafter described with reference to FIG. 33. The player character moving table includes tables for in-air, on-floor, on-ice and underwater conditions. Any one of the conversion tables can be selected and referred to in accordance with a coordinate topology where the player character is present (current position status).

In the player character moving table, the output value X (INx) of the XY-axis acceleration sensor 31 is utilized for calculating a change amount (dAx) of an X-movement acceleration of a player character while the output value Y (INy) is utilized for calculating a change amount (dAy) of an Y-movement acceleration. In the case the current position status is "in-air", the moving-acceleration change amount (dAx, dAy) is zero by referring to FIG. 21. For the case of "on-floor", because the correction ratio if referred to FIG. 22 is twice, twice the output values (INx, INy) of the XY-axis acceleration sensor 31 gives a change amounts (dAx, dAy) of moving acceleration. Also, where the output values (INx, INy) of the XY-axis acceleration sensor is greater than 20 due to particular correction condition 1, the moving-acceleration change amount (dAx, dAy) is limited to "40". For an "on-ice" condition, by referring to FIG. 23, three times the output values (INx, INy) of the XY-axis acceleration sensor 31 gives a change amount (dAx, dAy) (i.e., greater moving amount results for "on-ice" status). Meanwhile, where the output values (INx, INy) of the XY-axis acceleration sensor is greater than "20" due to particular correction condition 1, the moving-acceleration change amount (dAx, dAy) is limited to "60". For an "underwater" condition, by referring to FIG. 24, a half of the output values (INx, INy) of the XY-axis acceleration sensor 31 gives a moving-acceleration change amount (dAx, dAy) (i.e., a smaller moving amount results in a "in water" status). Also, where the output values (INx, INy) of the acceleration sensor 31 is greater than "10" due to a particular correction condition 1, the change amounts (dAx, dAy) is limited to "5".

In the player character moving tables, the output value (INz) of the Z-axis contact switch 32 is utilized to calculate a change amount (dAz) of Z-movement acceleration.

There is no special correction condition.

In the player-character moving table, an impact input flag (FS) has an effect upon X and Y moving-acceleration change amounts (dAx, dAy). If the present position status is "in-air" and "underwater", the impact input flag (FS) is ignored by referring to FIG. 21 and FIG. 24. Where the present position status is "on-floor", with reference to FIG. 22, processing is made to multiply by 3 times the X and Y moving-acceleration change amounts (dAx, dAy). Where the current position status is "on-ice", with reference to FIG. 23, processing is made to multiply by 5 times the X and Y moving-acceleration change amounts (dAx, dAy). In this manner, when there is an impact input, for the "on-floor" and "on-ice" statuses, the X and Y moving-acceleration change amounts (dAx, dAy) are increased (moved at higher speed) as compared to the usual.

The NPC moving tables of FIG. 25 and FIG. 26 are to be referred to in a tilt movement process in step S44 and impact moving process in step S45 of an NPC moving process hereinafter described with reference to FIG. 34. The NPC moving tables include tables for normal and upside-down positions. Any one of the two conversion tables is selected and referred to depending upon a pose (normal or upside-down) of a tortoise as NPC.

In the NPC moving table, an output value X (INx) of the XY-axis acceleration sensor 31 is utilized to calculate a change amount (dAx) of an NPC X movement acceleration while an output value Y (INy) is utilized to calculate a change amount (dAy) of a Y movement acceleration. For the "normal position", because with reference to FIG. 25, the correction ratio is 1/2 times, 1/2 times an output value (INx, INy) of the XY-axis acceleration sensor 31 gives an X-and-Y moving-acceleration change amount (dAx, dAy). Also, where the output values (INx, INy) of the XY-axis acceleration sensor 31 are smaller than 10 under special correction condition 1, the moving-acceleration change amount (dAx, dAy) is 0 (in the "normal position", with a small tilt the tortoise will brace its legs and not slide). Also, where the output values (INx, INy) of the XY-axis acceleration sensor 31 are greater than 20 under special correction condition 2, the moving-acceleration change amount (dAx, dAy) is limited to 10. For the "upside-down position", with reference to FIG. 26, 2 times an output value (INx, INy) of the XY-axis acceleration sensor 31 gives an X-and-Y moving-acceleration change amount (dAx, dAy) (moving amount greater because the tortoise "backside-down" easily slides as compared to a "normal" position). Also, where the output value (INx, INy) of the XY-axis acceleration sensor 31 is greater than 20 under special correction condition 1, the moving-acceleration change amount (dAx, dAy) is limited to 40.

In the NPC moving tables, the output value (INz) of the Z-axis contact switch 32 is utilized to determine tortoise inversion to a normal or inverted position. Each time the output value of contact switch 32 becomes "1", the tortoise turns to a normal or inverted state in a repetitive manner. The impact input flag (FS) is not utilized for the NPC movement process.

Figure 27:
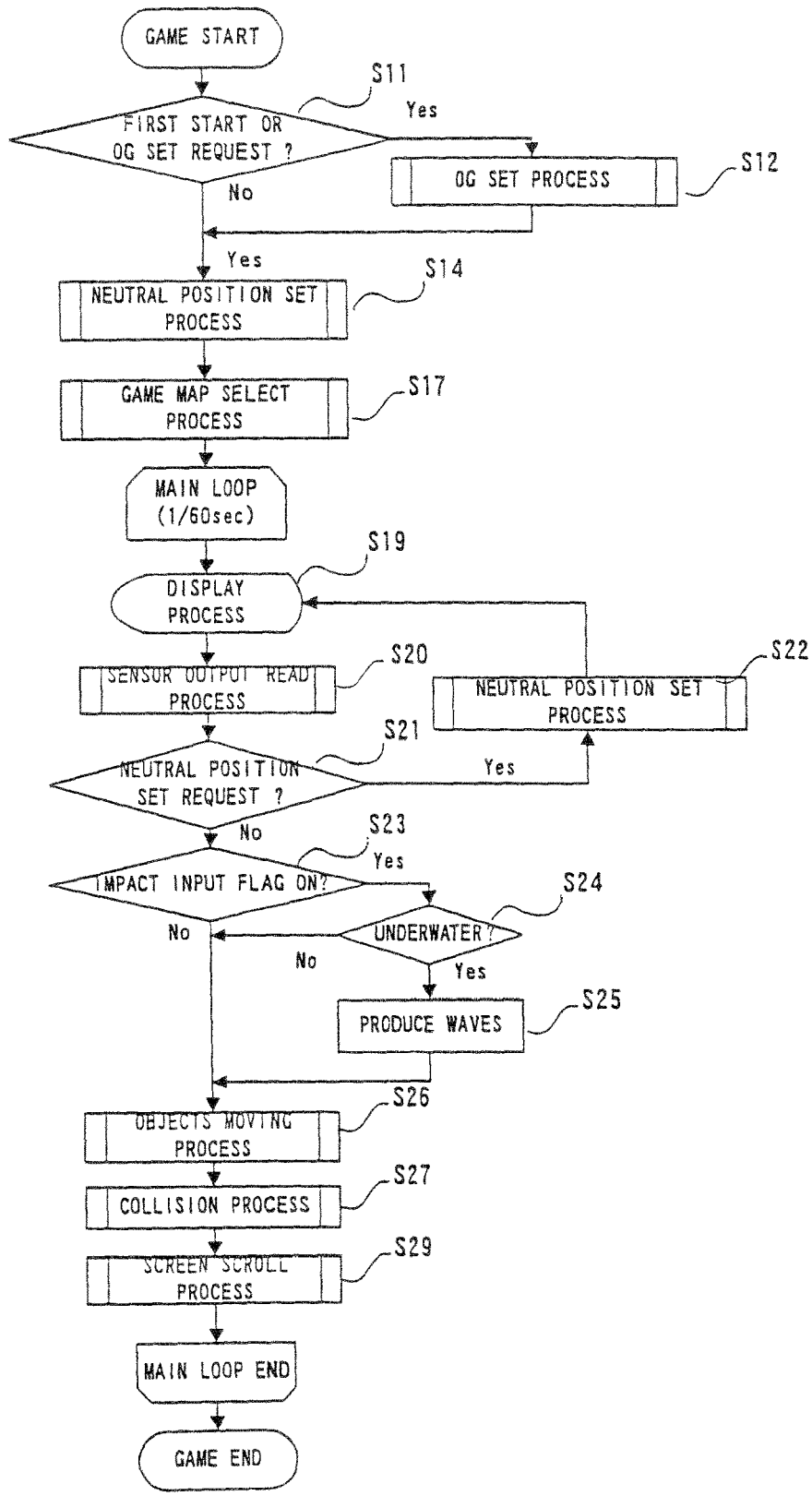
FIG. 27 is a main routine flowchart of the first embodiment.
Figure 28:
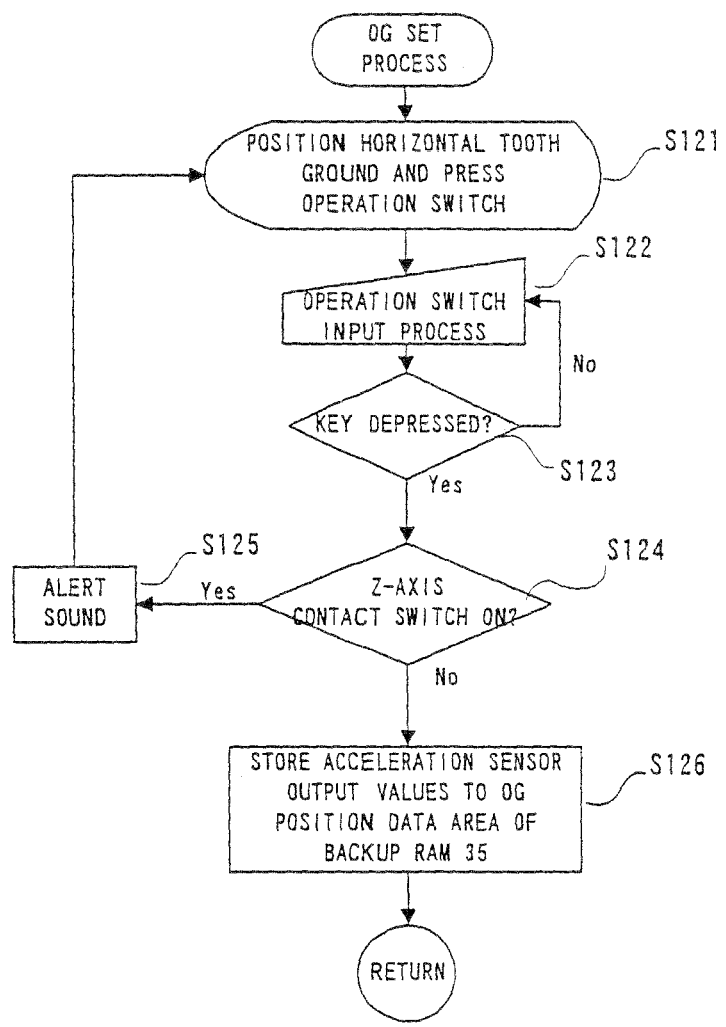
FIG. 28 is a 0G set process flowchart of the first embodiment.

FIG. 27 is a flowchart of a main routine. If a cartridge 30 is loaded onto the game machine main body 10 and the power switch of the game machine main body 10 is turned on, the CPU 21 starts to process the main routine of FIG. 33. First, in step S11 it is determined whether it is a first starting or not, or whether a player requested for a 0G setting (e.g. whether started while pressing the operation key 13b of FIG. 1) or not. If there was no first starting and there was no 0G set request, the process advances to step S13. Meanwhile, when there was a first starting or a 0G set request, a 0G set process hereinafter described with reference to FIG. 28 is made in step S12 and then the process proceeds to step S14. In the step S14, a neutral-position set process hereinafter described with reference to FIG. 29 is made and then the process advances to step S17. Here, the neutral-position setting is meant to set a reference tilt of the portable game apparatus for playing a game. The recommended position setting is meant to set a neutral position based on data wherein the data is concerned with a proper neutral position in accordance with a game content (the recommended position sight target coordinate 34d of the program ROM 34) that have been previously stored in a game program.

Figure 30:
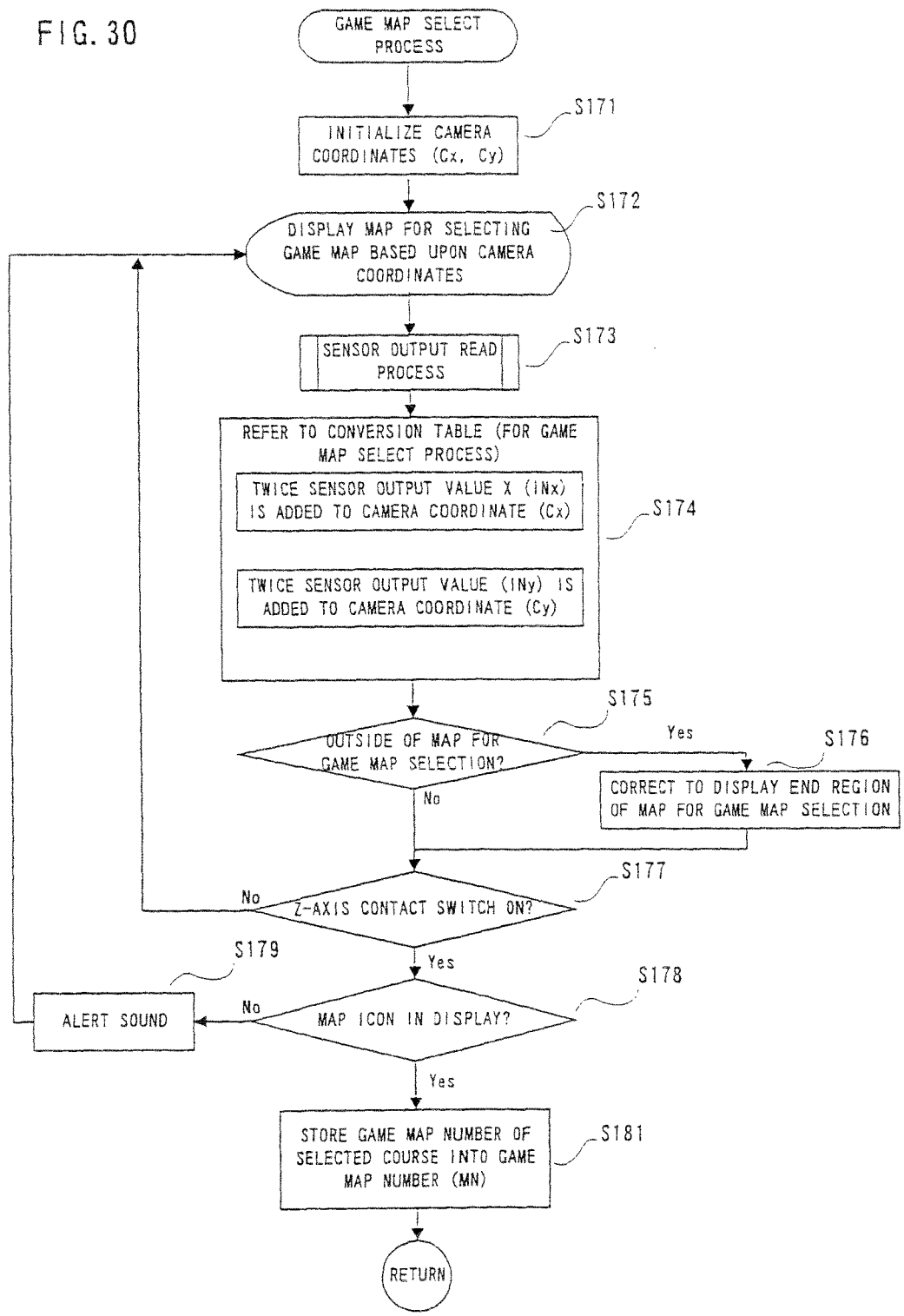
FIG. 30 is a game map elect process flowchart of the first embodiment.

In step S17, a game map select process hereinafter described with reference to FIG. 30 is performed so that one of a plurality of game maps is selected by the player. After the step S17, the process advances to a main loop.

The main loop is a process of from step S19 to step S29, which is repeatedly executed until game over or game clear is reached. In step S19, required data is written to the display RAM 25 based on coordinates (X, Y, Z) and pose number (PN) of the character data 26g of the work RAM 26, object character data 34a of the program ROM 34 and map data 34b. Based on the data stored in the display RAM, a game scene is displayed on the LCD 12. In step S20, a sensor output read process hereinafter described with reference to FIG. 31 is performed. The output values of the XY-axis acceleration sensor 31 and Z-axis contact switch 32 are read out through the sensor interface 33 and then corrected. After the step S20, in step S21 it is determined whether there was a neutral-position set request or not. If there was no request, the process advances to step S23 while if there was a request, the process proceeds to step S22 to perform a neutral-position set process. After resetting a neutral position, the process returns to step S19. This means that one operation switch (e.g. operation switch 13e shown in FIG. 1) is assigned to an exclusive operation switch for neutral-position setting so that neutral-position setting can be made at any time by pressing the operation switch 13e even during the playing a game.

In step S23, it is determined whether the impact input flag is ON or not. If the impact input flag is OFF, the process proceeds to step S26 while if the flag is ON, the process advances to step S24 to determine whether the topology of current coordinate that the player character is present is underwater or not (determined based on a current position status). If the topology determined is not, the process advances to step S26, while if the topology is determined to be underwater, the process advances to step S25 to perform a wave producing process (display is as shown in the middle portion in FIG. 15). Specifically, processing is made to cause waves in a direction and with a magnitude depending on a resultant vector. The resultant vector is given by a vector component in the X-axis direction taken from a sensor output value X (INx) and a vector component in the Y-axis direction is taken from a sensor output value Y (INy). The player can have a feeling as if the impact applied by him or her to the portable game apparatus was reflected in an environment (water) of the game space. After step S25, the process proceeds to step S26.

Figure 37:
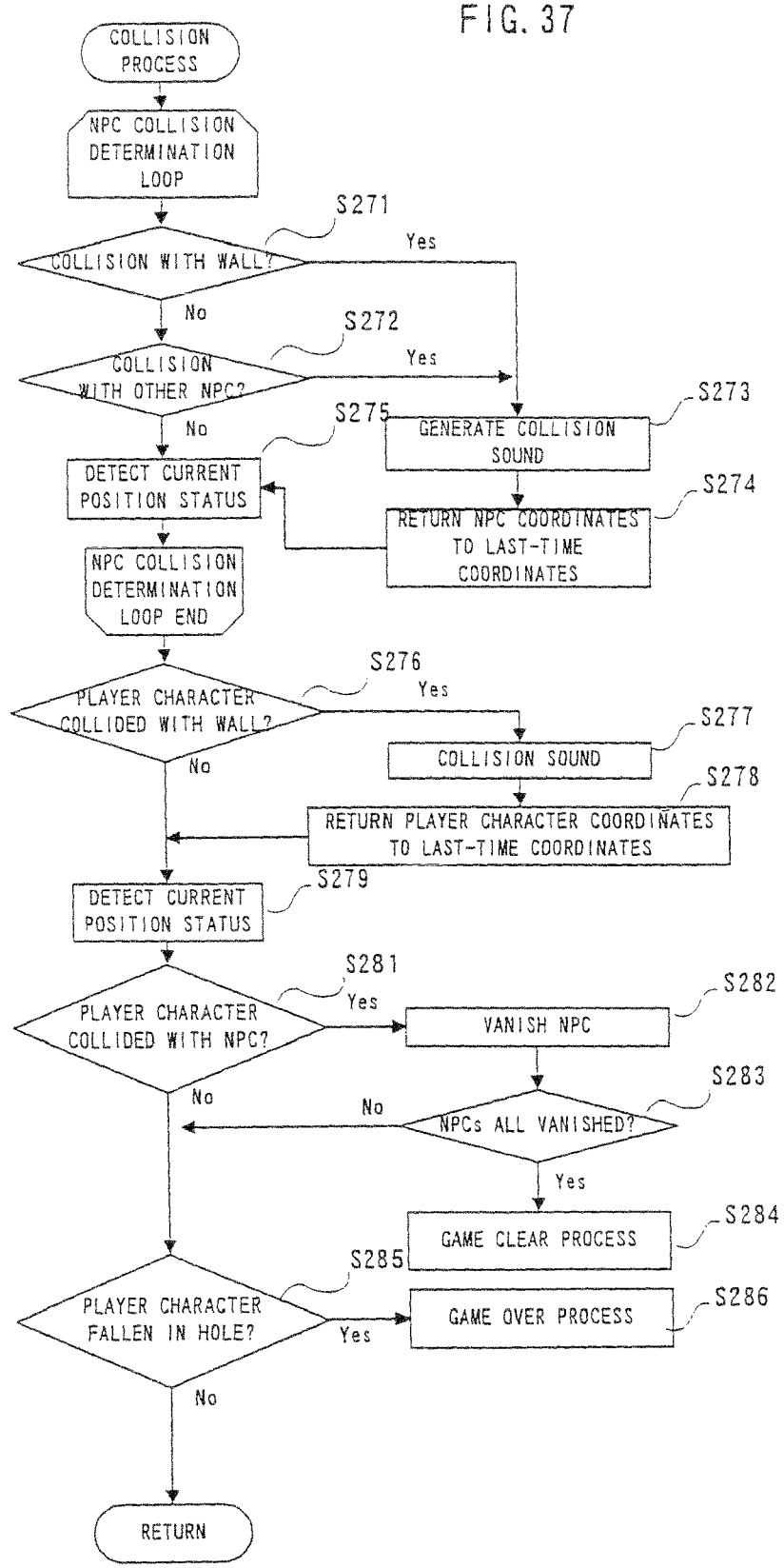
FIG. 37 is a collision process flowchart of the first embodiment.
Figure 40:
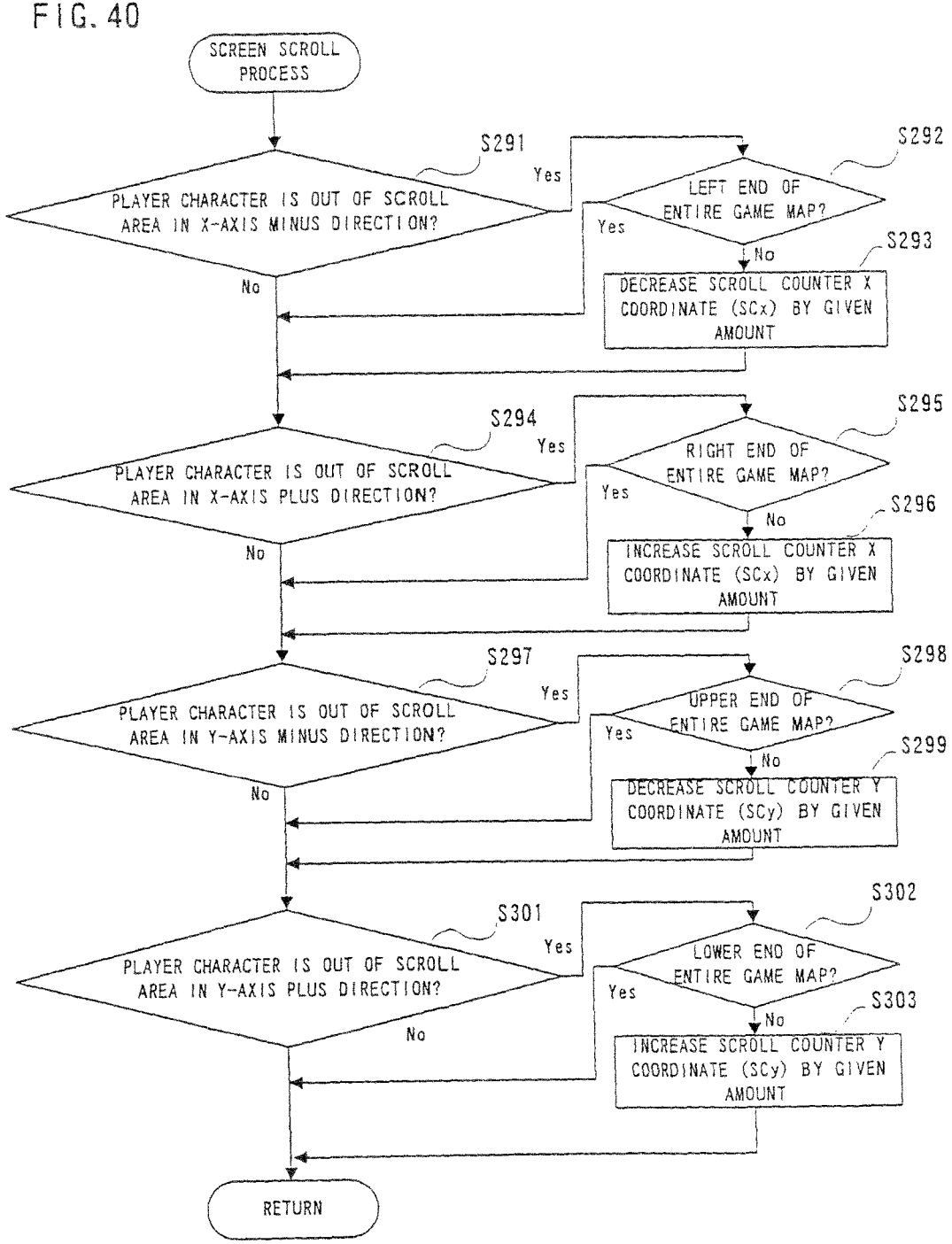
FIG. 40 is a screen-scroll process flowchart of the first embodiment.

In the step S26, each-character moving process hereinafter described with reference to FIG. 32 to FIG. 35 is performed thereby performing a process of moving the player character and NPC. After the step S27, a collision process hereinafter described with reference to FIG. 37 is performed thereby executing a process of colliding the player character with NPC, etc. After the step S27, a screen scroll process (step S29) hereinafter described with reference to FIG. 40 is performed.

FIG. 28 shows a subroutine flowchart for a 0G set process. This subroutine performs a process to store 0G position data in the backup RAM 35 as an output value of the XY-axis acceleration sensor 31 when the portable game apparatus (specifically, the LCD 12 display surface) is held horizontal.

In step S121, "POSITION HORIZONTAL TO GROUND AND PRESS OPERATION SWITCH" is displayed on the LCD 12, requesting the player to hold the portable game apparatus (specifically, the LCD 12 display surface) in a horizontal state. In step S122, an operation switch input process is performed. In step S123, if the depression of an operation switch (e.g. operation switch 13b of FIG. 1) for determination is detected, it is then determined in step S124 whether the Z-axis contact switch 32 is ON or not. When the Z-axis contact switch 32 is ON, an alert sound is generated in step S125 and the process returns to step S121. This is because, where the Z-axis contact switch is ON, the LCD 12 in its display surface is directed downward and the player is requested to perform the setting again. In step S124, where the Z-axis contact switch is determined as being OFF, then in step S126 the output value of the XY-axis acceleration sensor 31 at this time is stored as 0G position data in the backup RAM 35.

Figure 29:
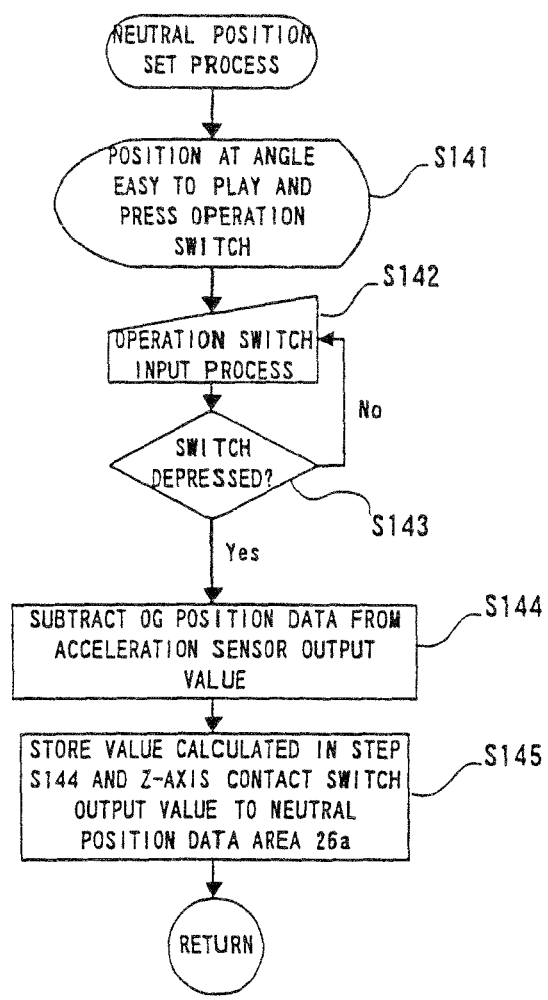
FIG. 29 is a neutral-position set process flowchart of the first embodiment.

FIG. 29 is a subroutine flowchart for a neutral-position set process. This subroutine performs the process in which the player arbitrarily determines a holding angle in a portable game apparatus that is easy to play the game. The output value of the XY-axis acceleration sensor 31 and Z-axis contact switch 32 at that time are stored as neutral position data in the work RAM 26.

In step S141, "POSITION AT ANGLE EASY TO PLAY AND PRESS OPERATION SWITCH" is displayed on the LCD 12. In step S142, an operation switch input process is made. In step S143, if the depression of an operation switch (e.g. operation switch 13b of FIG. 1) is determined, then in step S144 correction is performed by subtracting 0G position data from an output value of the XY-axis acceleration sensor 31 at this time (the neutral position data is rendered as data corresponding to a tilt with respect to the horizontal state). Then, in step S145 a correction value of the output of the XY-axis acceleration sensor (calculation result of step S144) and an output value of the Z-axis contact switch 32 are stored as neutral position data to the neutral position data memory area 26a of the work RAM 26.

FIG. 30 is a flowchart of a game map select process. In this subroutine, the player selects any one of a plurality of game maps stored in the game program. The screen of game map select process is displayed, for example, as shown in FIG. 13 mentioned before. On the LCD 12, one area of a game-map select map is displayed. The player makes a slide input in the X-axis or Y-axis direction to move the display area on the LCD 12 thereby displaying map icons (A, B, C, D in FIG. 16) within the display area. Then, a movement is inputted in the Z-axis direction. This results in selection of a game course corresponding to a course icon being displayed on the LCD 12 upon inputting the movement (or impact) in the Z-axis direction.

First, in step S171 a camera coordinate (Cx, Cy) is initialized. Then, in step S172 one area of the game-map select map is displayed on the LCD 12 based on the camera coordinates (Cx, Cy). In step S173, a sensor output read process hereinafter described with reference to FIG. 31 is made. As a result, the output values of the XY-axis acceleration sensor 31 and Y-axis contact switch 32 are read out and corrected. In step S174, a table shown in FIG. 26 is referred to. Specifically, the camera coordinates (Cx, Cy) are changed based on the sensor output values (INx, INy). Specifically, because the correction ratio is twice (2 times), the camera coordinates (Cx, Cy) are varied by an amount twice the sensor output values (INx, INy). For example, when the sensor output value (INx) is 5, the camera coordinate (Cx) is rendered as +10. In step S175, it is determined whether the display area based on the camera coordinates (Cx, Cy) is outside a range of the game map select map or not. If not outside the range, the process advances to step S177, while if inside the range the process proceeds to step S176. In step S176, correction is made so as to display an end area of the game-map select map and then the process proceeds to step S177. In the step S177, it is determined whether the Z-axis contact switch 32 is ON or not. If the contact switch 32 is determined as being OFF, the process returns to step S172. If the Z-axis contact switch 32 is determined ON, then it is determined in step S178 whether any one of the map icons (A, B, C, D in FIG. 16) is displayed in the display range of the LCD 12 or not. If it is determined that no map icon is displayed within the display range, then in step S179, an alert sound is generated and the process returned to step S172. If it is determined that a map icon is displayed within the display range, then in step S181, a corresponding game map number (MN) to the map icon being displayed is stored in the work RAM 26.

FIG. 31 is a flowchart for a sensor output read process. In this subroutine, the output values of the XY-axis acceleration sensor 31 and Z-axis contact switch 32 are read out and corrected. Specifically, from the data of the latch 334 and latch 335 of the sensor interface 33 are read output values (INx, INy) of the acceleration sensor and an output value (INz) of the Z-axis contact switch 32. Furthermore, a correction process is made based on 0G position data and neutral position data.

In step S201, data is read out of the latch 334 and latch 335. In step S202, acceleration-sensor output values (INx, INy) and Z-axis contact switch output value (INz) are read from the latch data, and stored in the acceleration-sensor output value memory area 26b of the work RAM 26. In step S203, it is determined whether there was an impact input or not. Specifically, it is determined whether a magnitude of a resultant vector having vector component in the X-axis direction taken of the acceleration sensor 31 output value X (INx) and a vector component in the Y-axis direction taken of the acceleration sensor 31 output value Y (INy) is equal to or greater than a given value. If the resultant magnitude is equal to or greater than the given value, then in step S204, the impact input flag (FS) is set "ON" and the process advances to step S206. If the resultant vector magnitude is determined to be smaller than the given value, then in step S205, the impact input flag (FS) is set "OFF" and the process advances to step S206. In step S202, processing is made to subtract the 0G position data stored in the backup RAM 35 from the data of the acceleration-sensor output value memory area 26b. In step S207, the value further corrected with the neutral position data is stored as INx, INy and INz in the acceleration-sensor output memory area 26b.

The correction with the neutral position data is performed, specifically, on the output value X (INx) and output value Y (INy) of the acceleration sensor by subtracting the values of the neutral position data (NPx, NPy). For the output value (INz) of the Z-axis contact switch 32, when the value of neutral position data (NPz) is "1", processing is made to invert the "0" and "1".

Figure 32:
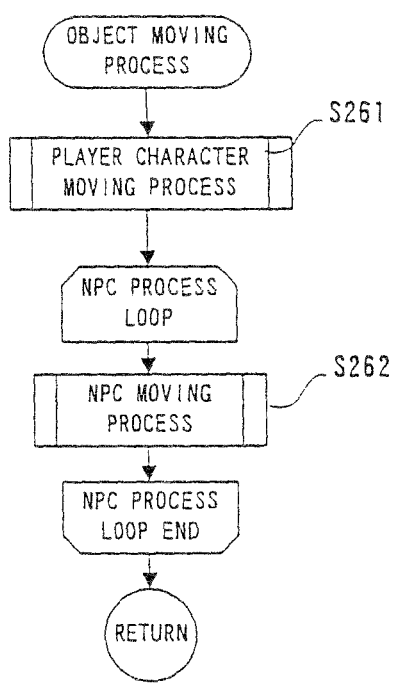
FIG. 32 is an each-object moving process flowchart of the first embodiment.

FIG. 32 to FIG. 36 are flowcharts for an object moving process. FIG. 32 is an object moving process main routine flowchart. In step S261, a player-character moving process is performed that is hereinafter described with reference to FIG. 33. In step S262, an NPC moving process is performed that is hereinafter described with reference to FIG. 34. The NPC moving process is repeated the number of NPCs.

Figure 33:
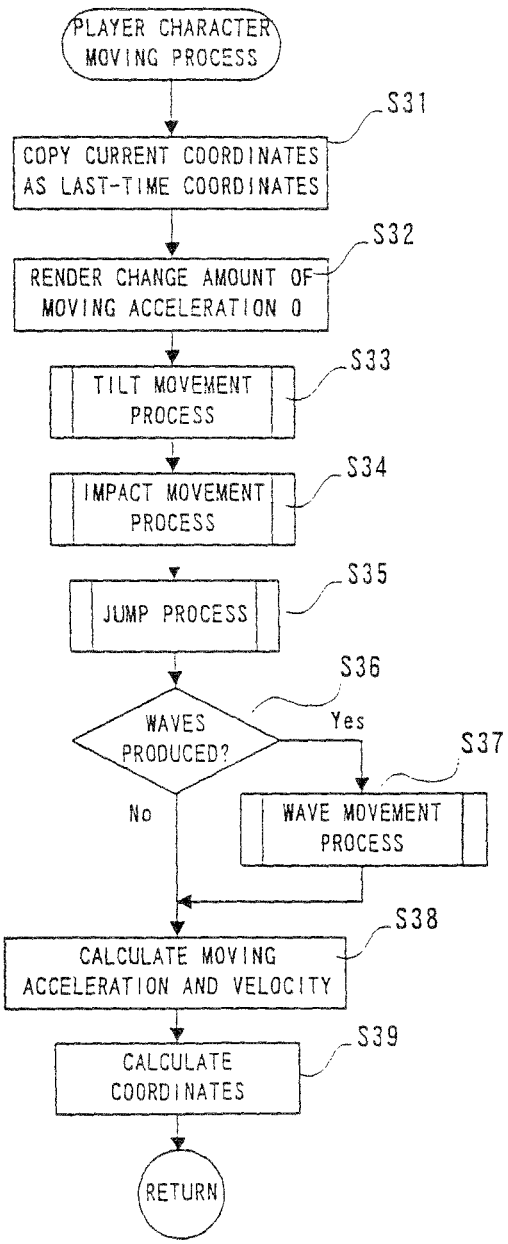
FIG. 33 is a player-character moving process flowchart of the first embodiment.

FIG. 33 is a player-character moving process flowchart. In step S31, present coordinates (X, Y, Z) of the player character are stored as a copy of last-time coordinates (Px, Py, Pz). This is required to return the player character that collided with a wall to last-time coordinates, in a collision process hereinafter described with reference to FIG. 37. In step S32, moving-acceleration change amounts (dAx, dAy, dAz) are initialized, and then in step S33 a tilt movement process is performed. In the tilt movement process, reference is made to proper one of the conversion tables shown in FIG. 21 to FIG. 24 depending upon a present position status of the player character, to make processing of calculating an X-and-Y moving-acceleration change amount of the player character. This processing determines moving-acceleration change amounts (dAx, dAy) such that the player character is rolled (slid) responsive to a tilt (tilt input) of the portable game apparatus. Furthermore, in step S34, an impact moving process is performed. In the impact moving process, reference is made to proper one of the conversion tables of FIG. 21 to FIG. 24, to execute processing to increase X-and-Y change amounts of the player character. This process increases moving-acceleration change amounts (dAx, dAy) such that the player character makes a dash (moves at higher speed) when applying an impact input. In step S35, a jump moving process is made that is hereinafter described with reference to FIG. 35. After the step S35, it is determined in step S36 whether a wave generation process in step S25 of the flowchart of FIG. 27 is to be executed or not. If wave generation is not determined, the process advances to step S38. If waves generation is determined, in step S37, a wave moving process hereinafter described with reference to FIG. 36 is made, and then the process proceeds to step S38. In the step S38, a moving acceleration (Ax, Ay, Az) is calculated based on the moving-acceleration change amounts (dAx, dAy, dAz) calculated in the tilt moving process, impact moving process, jump process and wave moving process of the steps S33 to S37, and a velocity (Vx, Vy, Vz) is calculated based on the moving acceleration (Ax, Ay, Az). In step S39, coordinates (X, Y, Z) are calculated based on the velocity (Vx, Vy, Vz).

Figure 34:
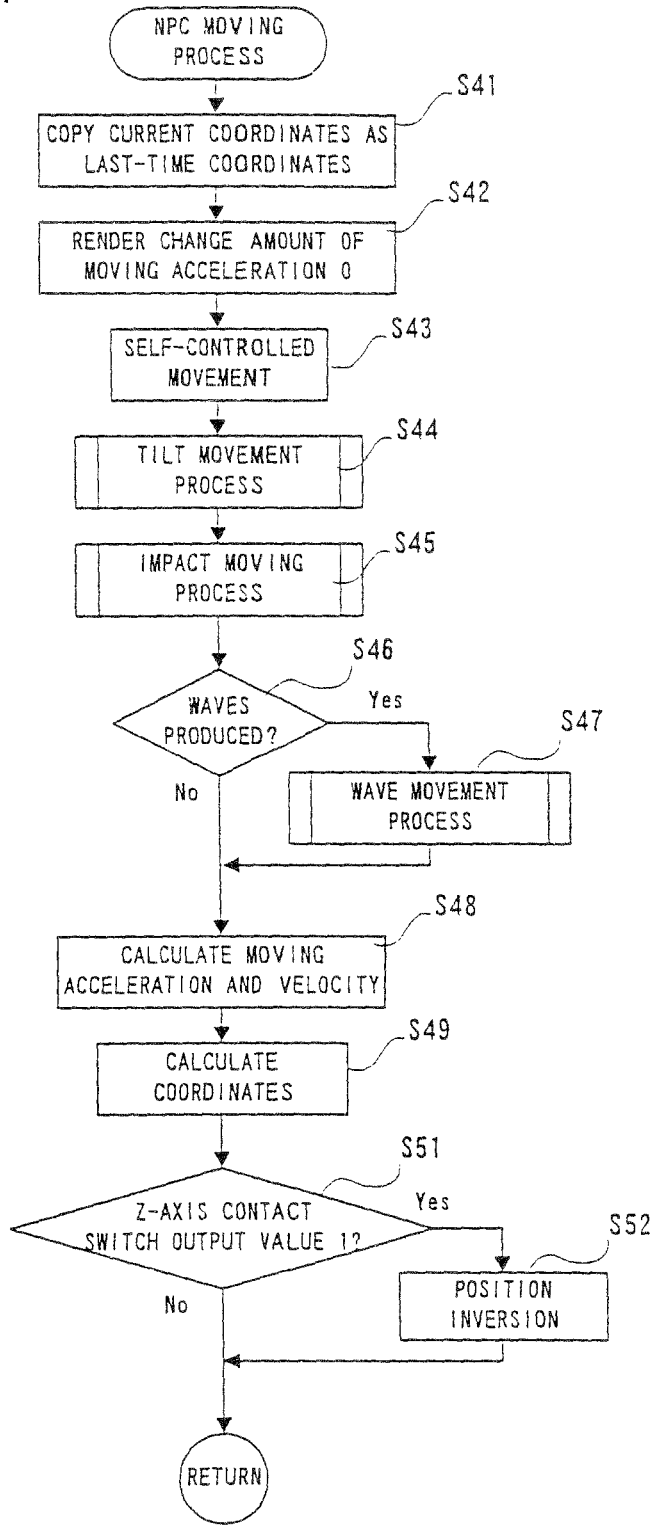
FIG. 34 is an NPC moving process flowchart of the first embodiment.

FIG. 34 is a flowchart of an NPC movement process. In step S41, current coordinates (X, Y, Z) are stored by copying the last-time coordinates (Px, Py, Pz). In step S42, the moving-acceleration change amount (dAx, dAy, dAz) are initialized. In step S43, an NPC self-controlled movement process is executed based on the game program. Specifically, moving-acceleration change amounts (dAx, dAy, dAz), e.g. for a tortoise, is determined based on a random number value. After the step S43, in step S44, a tilt movement process is executed. In the tilt movement process, NPC X-and-Y moving-acceleration change amounts are calculated by referring to an appropriate one of the conversion tables shown in FIG. 25 or FIG. 26 according to an NPC pose number. Furthermore, in step S45 an impact moving process is made. However, in the present embodiment, the NPC will not be affected by impact input. In step S46, it is determined whether a wave producing process has been made in step S25 of the flowchart of FIG. 25 or not. If no wave production is determined, the process advances to step S48. If waves have been produced is determined, then in step S47 a wave movement process hereinafter described with reference to FIG. 36 is executed and then the process advances to step S48.

In step S48, a moving acceleration (Ax, Ay, Az) is calculated based on the moving-acceleration change amounts (dAx, dAy, dAz) determined by the self-controlled movement process, tilt movement process, impact movement process and wave movement process of steps S43 to S47. Furthermore, a velocity (Vx, Vy, Vz) is calculated based on the movement acceleration (Ax, Ay, Az). In step S49, a coordinate position (X, Y, Z) is calculated based on the velocity (Vx, Vy, Vz). In step S51, it is determined whether an output value (INz) of the Z-axis contact switch is "1" or not. If the Z-axis contact switch output value (INz) is "0", the NPC movement process subroutine is ended. Where the Z-axis contact switch output value (INz) is "1", an inversion process to a normal or upside-down position is executed in step S52. Specifically, a pose number (PN) of the character data in the work RAM 26 is changed.

Figure 35:
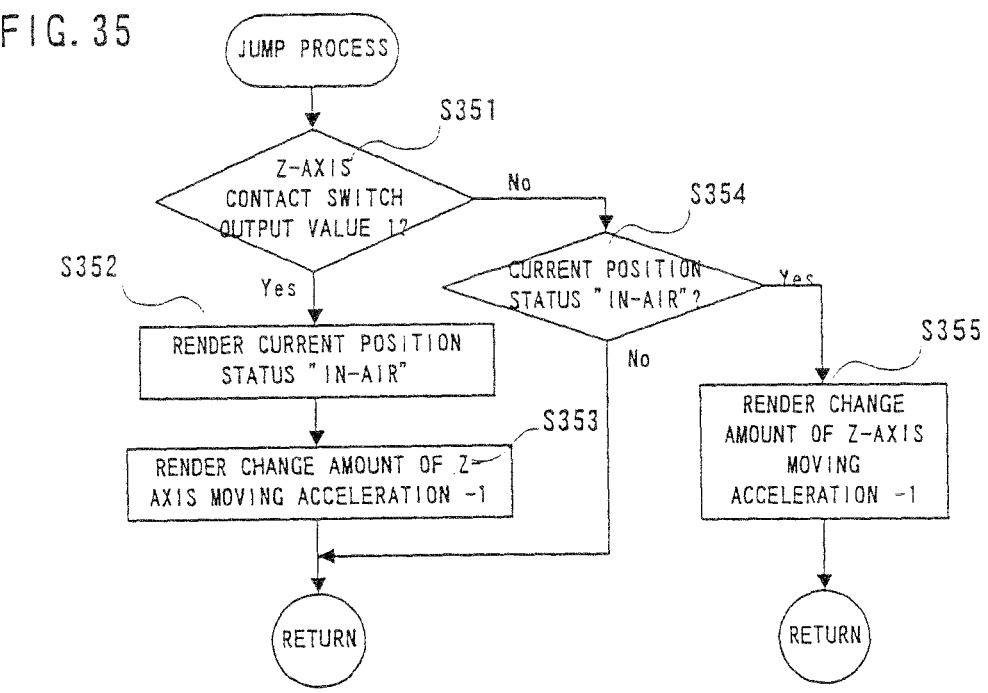
FIG. 35 is a jump moving process flowchart of the first embodiment.
Figure 36:
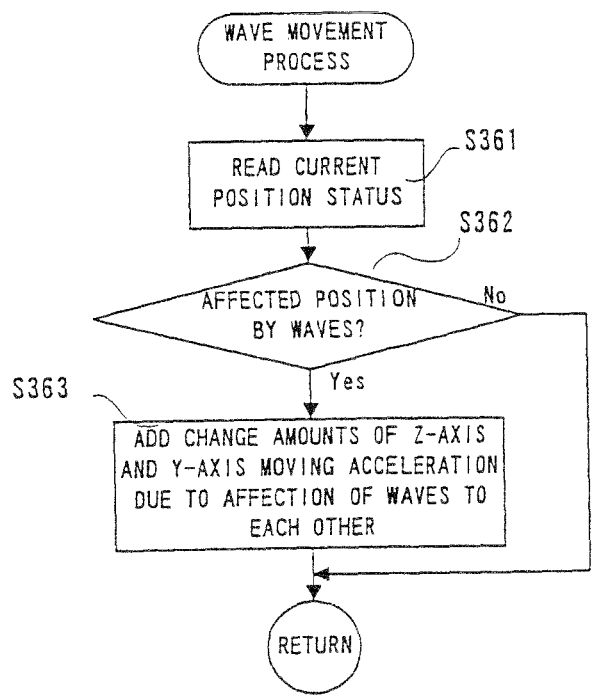
FIG. 36 is a wave moving process flowchart of the first embodiment.

FIG. 35 shows a flowchart of a jump process. In this subroutine, when there is a movement input in the Z-axis direction, processing is made to cause the player character to jump. Also, when there is no movement input in the Z-axis direction in a state the player character is in a state of air, processing is made to lower the player character.

In step S351, it is determined whether the output value (INz) of the Z-axis contact switch 32 is 1 or not. When the output value (INz) of contact switch 32 is "1", the current position status (PS) is set as "in-air" in step S52. Thereafter in step S353, the Z moving-acceleration change amount (dAz) is rendered "1". When the output value (INz) of the Z-axis contact switch 32 is "0" in the step S351, it is determined in step S354 whether the player character is "in-air" or not. When not "in-air", the jump process is ended. Where "in-air" in the step S354, the Z moving-acceleration change amount (dAz) is rendered "−1" in step S355 and then the jump process is ended.

FIG. 36 shows a flowchart of a wave movement process. In this subroutine, processing is made to calculate a moving-acceleration change amount due to the waves produced due to an impact input by the player. In step S361, a current position status is read in. In step S362, it is determined whether the current position status is in a position to undergo an affection of waves or not (i.e. is the current position "underwater" or not). If the current position is determined as a position free from an affection of waves, the wave movement process is ended. If the current position is determined as a position to undergo an affection of waves, then in step S363 respective X and Y moving-acceleration change amounts due to an affection of waves are calculated and added to the X and Y moving-acceleration change amounts calculated by the tilt movement process and impact movement process.

FIG. 37 shows a flowchart of a collision process. In steps S271 to S275, an NPC collision determination process is performed. The NPC collision determination process is repeated to the number of NPCs. In step S271, it is determined whether an NPC has collided with a wall or not. If it is determined that an NPC has collided with a wall, the process proceeds to step S273. If no collision is determined, the process advances to step S272 wherein it is determined whether there has been a collision with another NPC or not. If it is determined that an NPC has collided with another NPC, the process advances to step S272. If it is determined that the NPC has not collided with another NPC, the process proceeds to step S273. Where a collision with a wall or another NPC has been determined, then in step S273 an impact sound is generated, and then in step S274 the NPC coordinates (X, Y, Z) are returned to the last-time coordinates (Px, Py, Pz), and the process advances to the step S275.

In step S275, a current position status of NPC is detected and stored in the work RAM 26. After step S275, it is determined in step S276 whether the player character has collided with a wall or not. If no collision against wall is determined, the process proceeds to step S279. If a collision with a wall is determined, then in step S277 an impact sound is generated, and then in step S278 the player character coordinates (X, Y, Z) are returned to the last-time coordinates (Px, Py, Pz), and the process advances to step S279.

In step S279, a current position status of the player character is detected and stored in the work RAM 26. After step S279, it is determined in step S281 whether the player character has collided with an NPC or not. If a collision against an NPC is determined, a process is made in step S282 to vanish the NPC. After step S282, it is determined in step S283 whether all the NPCs have been vanished or not. If a determination is made that all the NPCs have vanished, a game clear process is executed in step S284. When a determination is made that no collision with an NPC has been executed in step S281 or when a determination is made that all the NPCs have not vanished in step S283, the process proceeds to step S285. In step S285, it is determined whether the player character has fallen in a hole or not. If it is determined that the player character has fallen in a hole, a game over process is effected in step S286. Where it is determined that the player character has not fallen in a hole, the impact process is ended.

Figure 38:
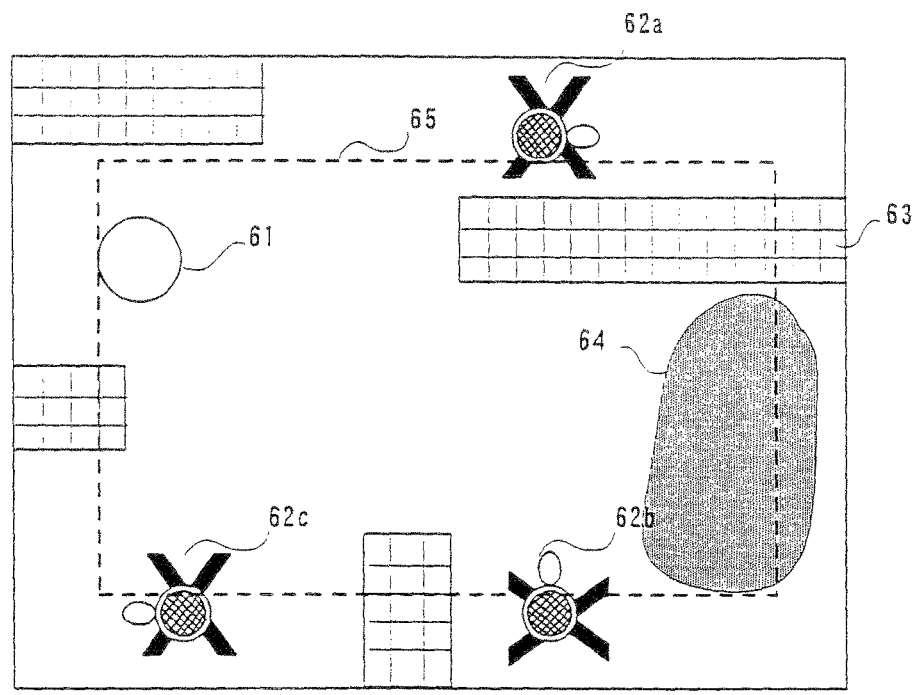
FIG. 38 is a screen-scroll explanatory view (before scroll) of the first embodiment.
Figure 39:
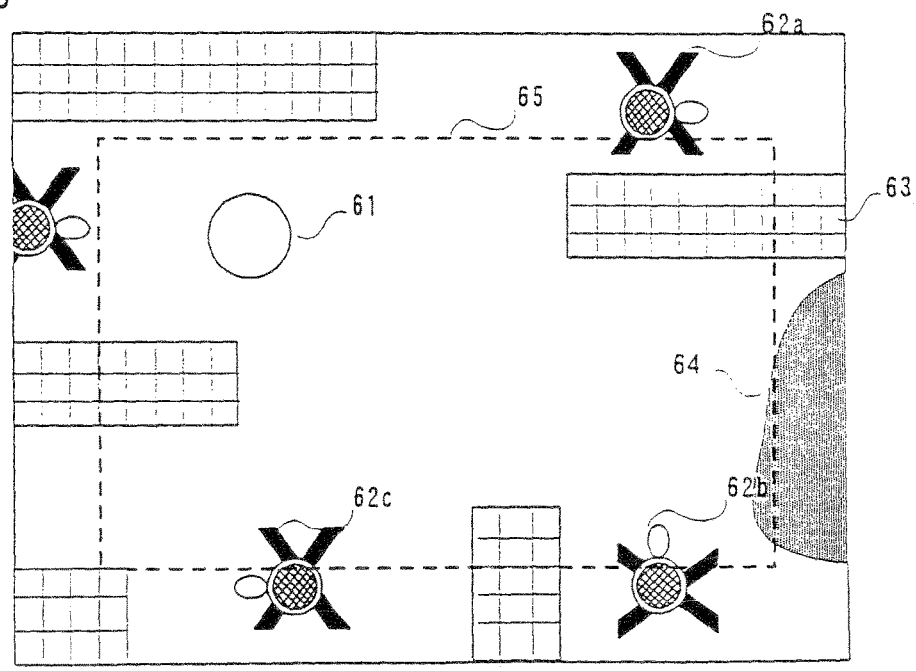
FIG. 39 is a screen-scroll explanatory view (after scroll) of the first embodiment.

FIGS. 38 and 39 each show one example of a scene showing on-screen scroll. In the scene, a ball as a player character, tortoises 62a-62c as NPC, and a wall 63 and hole 64 forming a maze are displayed. The dotted lines 65 show a limit of screen scroll (actually, the dotted lines 65 will not be displayed on the LCD 12). As discussed above, the game map is a virtual map that is broader than the LCD 12 display area. On the LCD 12 is displayed part of a game map around the player character 61. When the player tilts the portable game apparatus and the player character 61 is moving to an outer area of the dotted lines 65, the scene is scrolled moving the game-map display area over the LCD 12. Furthermore, the player character 61 and NPC 62 are moved to and displayed in a position toward a center of a scene by a corresponding amount of scrolling. In this manner, screen scrolling makes game play possible with a broader game map. For example, if the player character is going beyond the dotted line 65 to a left side area as shown in FIG. 38, the game map area in display is scrolled to left so that the player character 61 and NPC can be moved to and displayed in a position by a corresponding amount of scrolling (FIG. 39). The scroll rate may be changed depending upon a magnitude of tilt input.

FIG. 40 shows a flowchart of a screen scroll process. In step S291, it is determined whether the player character is out of a scroll area in an X-axis minus (i.e., negative) direction or not. Here, the scroll area refers to an area as surrounded by the dotted lines 65 shown in FIG. 38. If determined not out of the area with respect to the X-axis minus direction, the process advances to step S294. If determined out of the area in the X-axis minus direction, it is then determined in step S292 whether the current display area on the LCD 12 is a left end area of the game map or not. If determined as a left end area, the process advances to step S294. If the display area is not determined as a left end area, then in step S293 a scroll counter X coordinate (SCx) stored in the display RAM 25 is decreased by a given amount and then the process proceeds to step S294. In step S294, it is determined whether the player character is out of the scroll area with respect to the X-axis plus (i.e., positive) direction or not. When it is determined that the player character is not out of the area in the X-axis plus direction, the process advances to step S297. When it is determined that the player character is out of the area in the X-axis plus direction, it is determined in step S295 whether the current display area on the LCD 12 is a right end area of the game map or not. If the current display area is determined as a right end area, the process advances to step S297. When the current display area is not determined as a right end area, in step S296 the scroll counter X coordinate (SCx) is increased by a given amount and then the process proceeds to step S297.

In step S297, it is determined whether the player character is out of the scroll area in a Y-axis minus (i.e., negative) direction or not. If the player character is determined as not being out of the area in the Y-axis minus direction, the process advances to step S301. When the player character is determined as being out of the area in the Y-axis minus direction, it is determined in step S298 whether the current display area on the LCD 12 is an upper end area of the game map or not. If the current display is determined as an upper end area, the process proceeds to step S301. When the current display is not determined as an upper end area, in step S299 a scroll counter Y coordinate (SCy) is decreased by a given amount and then the process proceeds to step S301. In step S301, it is determined whether the player character is out of the scroll area in a Y-axis plus direction or not. When the player character is not determined as being out of the area in the Y-axis plus direction, the screen scroll process is ended. When the current display is determined as being out of the area in the Y-axis plus direction, it is determined in step S302 whether the current display area on the LCD 12 is an lower end area of the game map. When the player character is determined as being a lower end area, the screen scroll process is ended. When the player character is determined as not being a lower end area, in step S303 the scroll counter Y coordinate (SCy) is decreased by a given amount and then the screen scroll process is ended.

(Second Embodiment)

Next, a portable game apparatus according to a second present exemplary embodiment will be explained with reference to FIGS. 41(a)-41(c) to FIG. 49. The second embodiment has the same external view, XY-axis definition diagram, block diagram, sensor-interface measurement principle diagram and Z-axis contact switch structural view as FIG. 1 to FIG. 7 of the first embodiment. Hence, detailed explanations are omitted.

Figure 41:
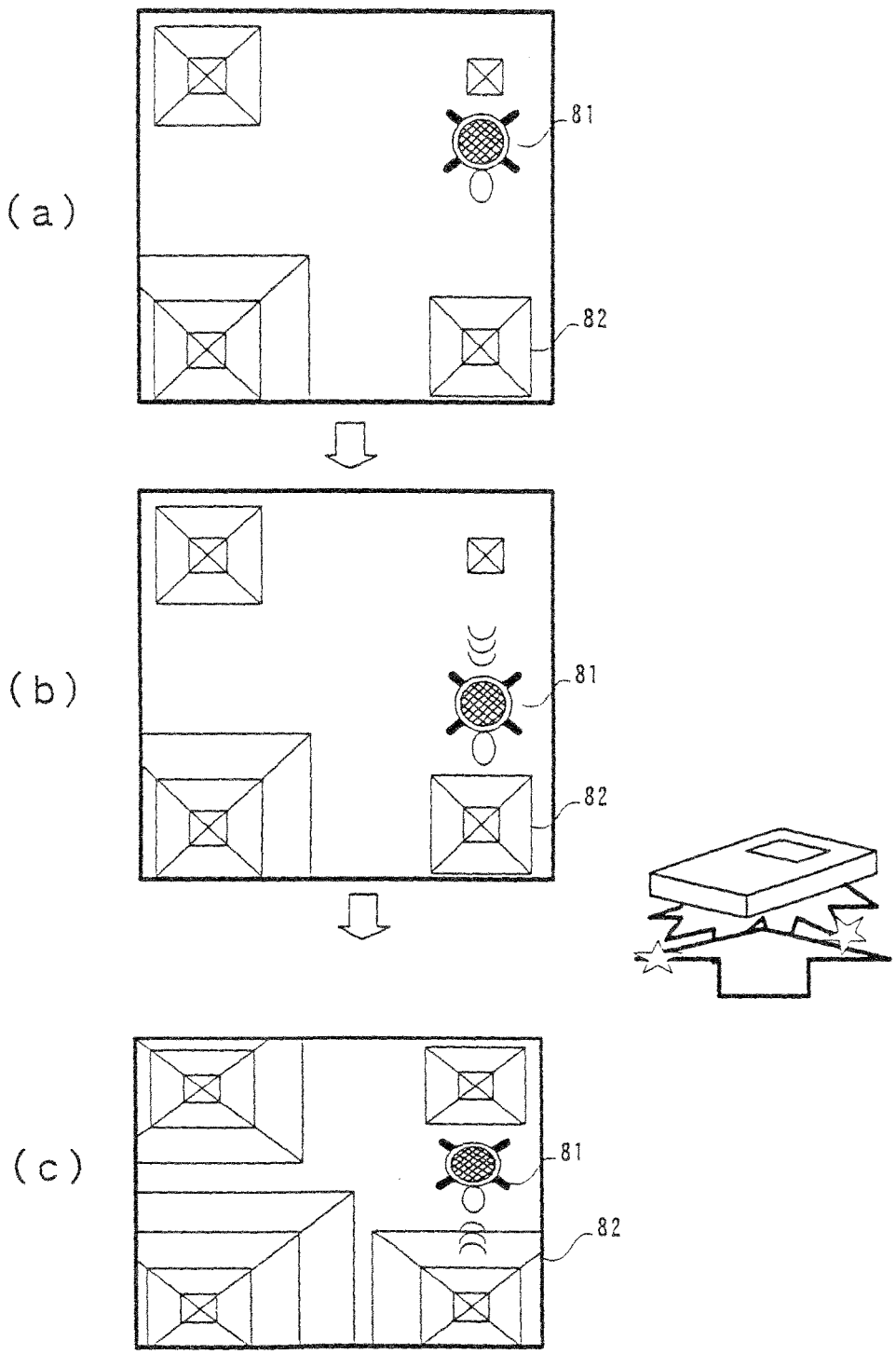
FIGS. 41(a), 41(b) and 41(c) are an example of a game scene of a second embodiment.

FIGS. 41(a)-41(c) illustrate examples of a game scene in the present embodiment. In this game, a player can give impact to the portable game apparatus to cause an upheaval in a game-space land, thereby enjoying the game while controlling the movement of a game character.

As shown in FIG. 41(a), a game-character tortoise 81 and a land-upheaval character 82 are displayed in the game scene. As shown in FIG. 41(b), the tortoise 81 is moved in a self-controlled manner according to a game program. In a state shown in FIG. 41(b), when an impact input is given in the Z-axis direction to the portable game apparatus, the land-upheaval character 82 is displayed higher and greater with upheaval, as shown in FIG. 41(c). This controls the tortoise 81 to slide (tortoise 82 in advancing retracts due to land upheaval). It is thus possible to provide the player with a feeling as if the game-space land receives energy and is upheaved when an impact is applied in the Z-axis direction to the portable game apparatus.

FIGS. 42(a)-42(c) are one example of a game scene illustrating a land-upheaval process due to an impact input in the Z-axis direction. In FIG. 42(a), an outer frame 12' designates a whole game space and an inner frame 12 a display area to be displayed on the LCD 12. The game space is a world greater than a display area of the LCD 12. The LCD 12 displays a part of the game space. In the game space, there are twelve land-upheaval characters 82 (82a-82l) and three tortoise characters 81 (81a-81c). Among them, four land-upheaval characters (82a, 82b, 82e, 82o and one tortoise character (82a) are displayed on the LCD 12.

In a state shown in FIG. 42(a), if an impact input is applied in the Z-axis direction to the portable game apparatus, the twelve land-upheaval characters (82a-82l, the land-upheaval characters over the entire game space) are raised by one step and displayed higher and greater, as shown in FIG. 42(b). At this time, the tortoise characters (81a and 81b) existing at land upheaval are displayed as sliding due to the upheaval of land.

In a state shown in FIG. 42(b), when an impact input is applied in the Z-axis direction while operating the button A (operation switch 13b), only the four land-upheaval characters (82a, 82b, 82e, 82f) being displayed on the LCD 12 are further raised by one step and displayed higher and greater. Also in this case, the tortoise character (81*a*) existing at land upheaval is displayed sliding due to the land upheaval. When applying an impact input in the Z-axis direction while pressing the button A, it is thus possible to provide the player with a feeling as if energy due to the impact was given to the game space limited to the area being displayed on the LCD 12.

Figure 42:
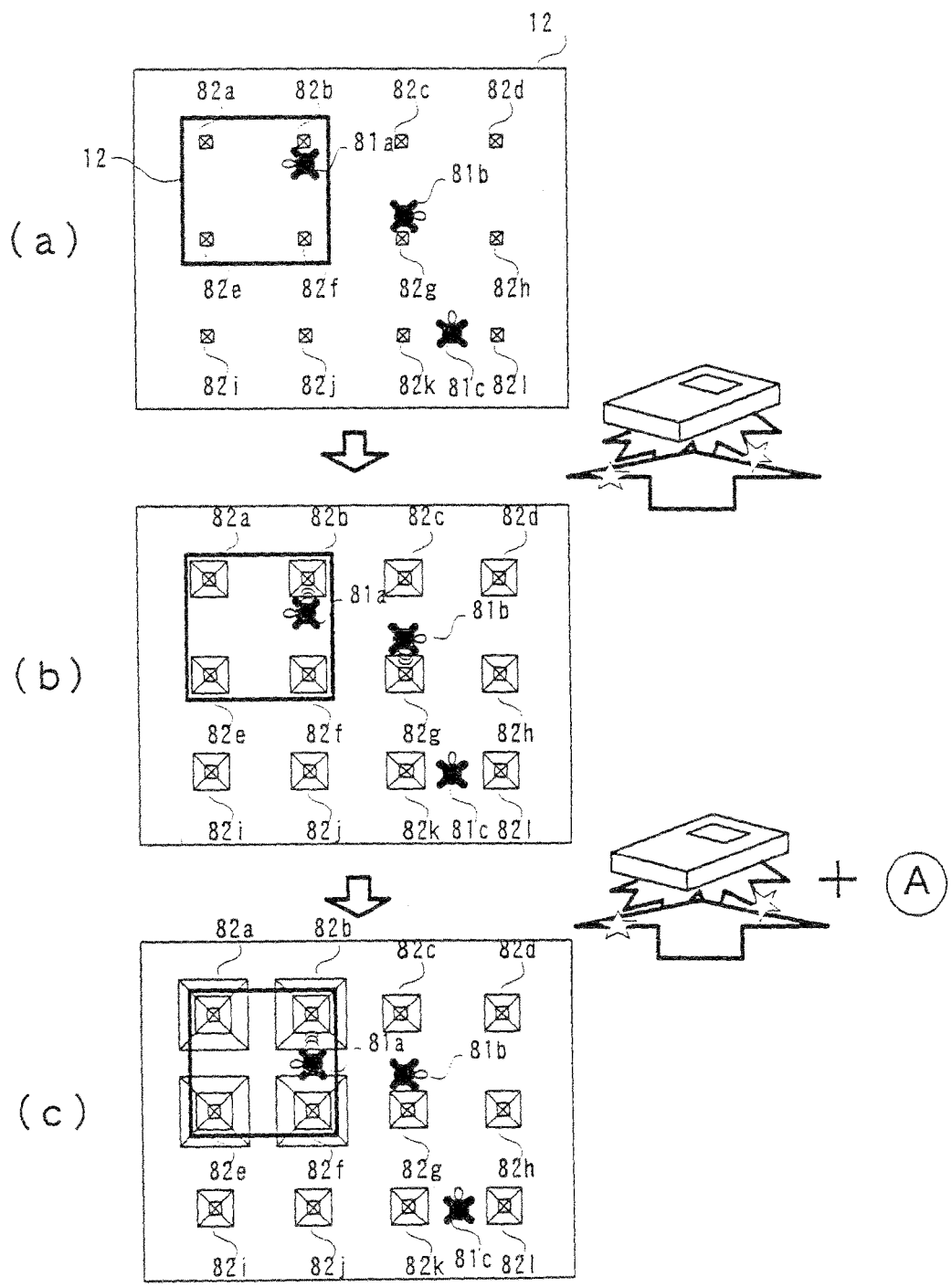
FIGS. 42(a), 42(b) and 42(c) are an example of a game scene (land-upheaval process) of the second embodiment.

Incidentally, although not shown, if in the state shown in FIG. 42(*b*), an impact input is given in the Z-axis direction while operating the button B (operation switch 13*c*), only the eight land-upheaval characters (82*c*, 82*d*, 82*g*, 82*h*, 82*i*-82*l*) not being displayed on the LCD 12 are raised by one step and displayed higher and greater. Also in this case, the tortoise characters (81*b*, 81*c*) existing at the land upheaval are displayed as sliding due to the land upheaval. Where an impact input is given in the Z-axis direction while pressing the button B, it is thus possible to provide the player with a feeling as if energy due to impact was supplied to the game space limited to the area not being displayed on the LCD 12.

FIGS. 43(*a*)-43(*c*) are one example of a game scene illustrating a scroll process for a game space on display. The game space on display is to be scrolled by giving a slide-input to the portable game apparatus (see FIG. 9 in the first embodiment). For example, in FIG. 43(*a*) land-upheaval characters 82*a*, 82*b*, 82*e*, 82*f* and tortoise character 81*a* are displayed on the LCD 12. In this state, when the portable game apparatus is slid in a Y-axis minus (i.e., negative) direction, the game space on display is scrolled down, resulting in display of land characters 82*e*, 82*f* and tortoise character 81*a* as shown in FIG. 43(*b*).

Also, in a state shown in FIG. 43(*b*), when the portable game apparatus is slid in an X-axis plus (i.e., positive) direction, the game space on display is scrolled right, to provide display with a land character 82*f* and tortoise character 81*a*. It is thus possible for the player to enjoy a game with a game space greater than the LCD 12. Also, (because as discussed above) an effect (land upheaval) can be given to the game space limited to an inside or outside of the area of display by the use of the button A or button B, respectively, the player can enjoy a complex game.

Figure 44:
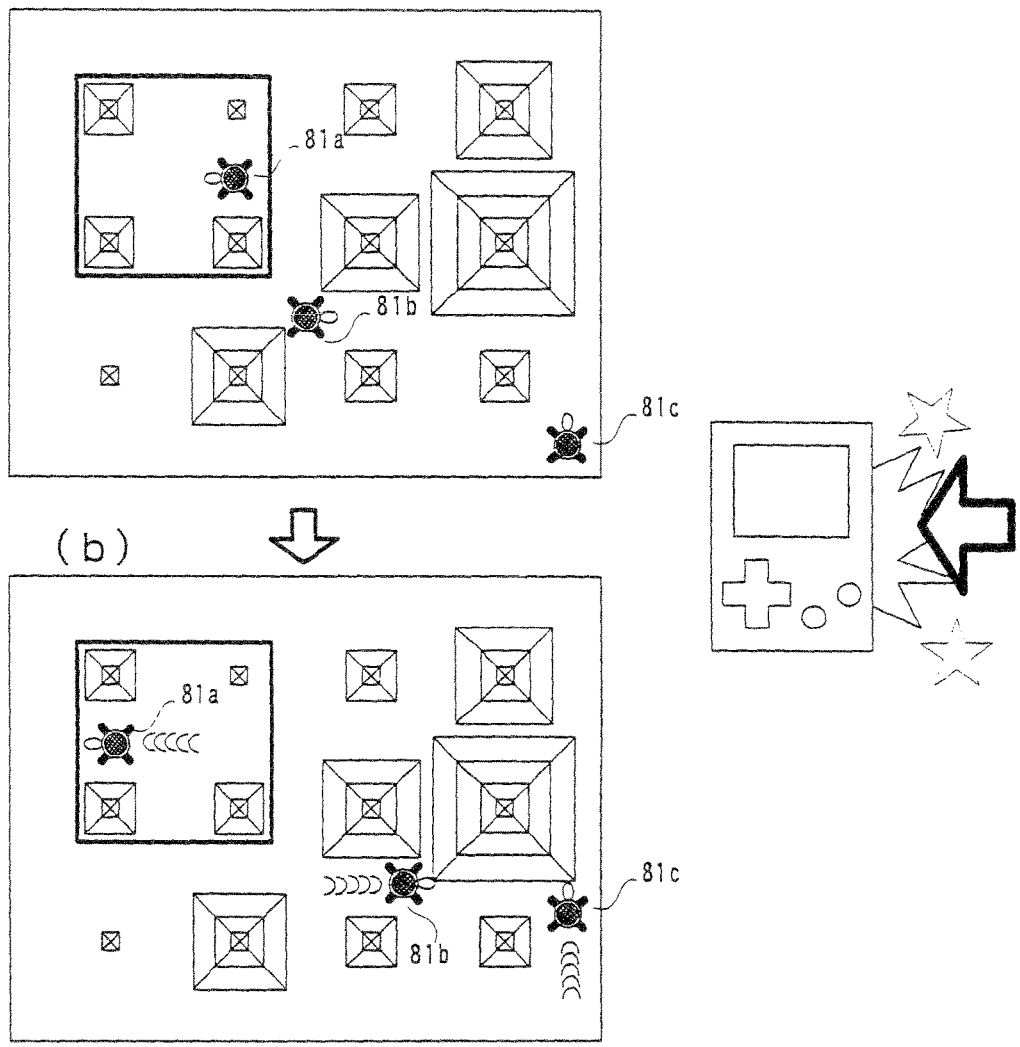
FIGS. 44(a) and 44(b) are an example of a game scene (temperature increasing process) of the second embodiment.

FIGS. 44(*a*)-44(*b*) illustrate control of scenes with a temperature increase caused by impact input in XY-axis directions. Although the tortoise characters 81*a*-81*c* moves in a self-controlled fashion according to the game program as stated before, this self-controlled movement becomes more active as the temperature increases (specifically, moving amount increases). In a state shown in FIG. 44(*a*), when an impact input is applied in the XY-axis direction (see FIG. 11 in the first embodiment), a parameter of temperature increases to provides display in which the tortoise characters 81*a*-81*c* are actively moving. It is thus possible to provide the player with a feeling as if energy was supplied and the temperature was increased in the game space upon giving an impact in the XY-axis direction to the portable game apparatus.

Hereunder, explanations will be made on the data stored on the memory with reference to FIG. 45 and FIG. 46.

Figure 45:
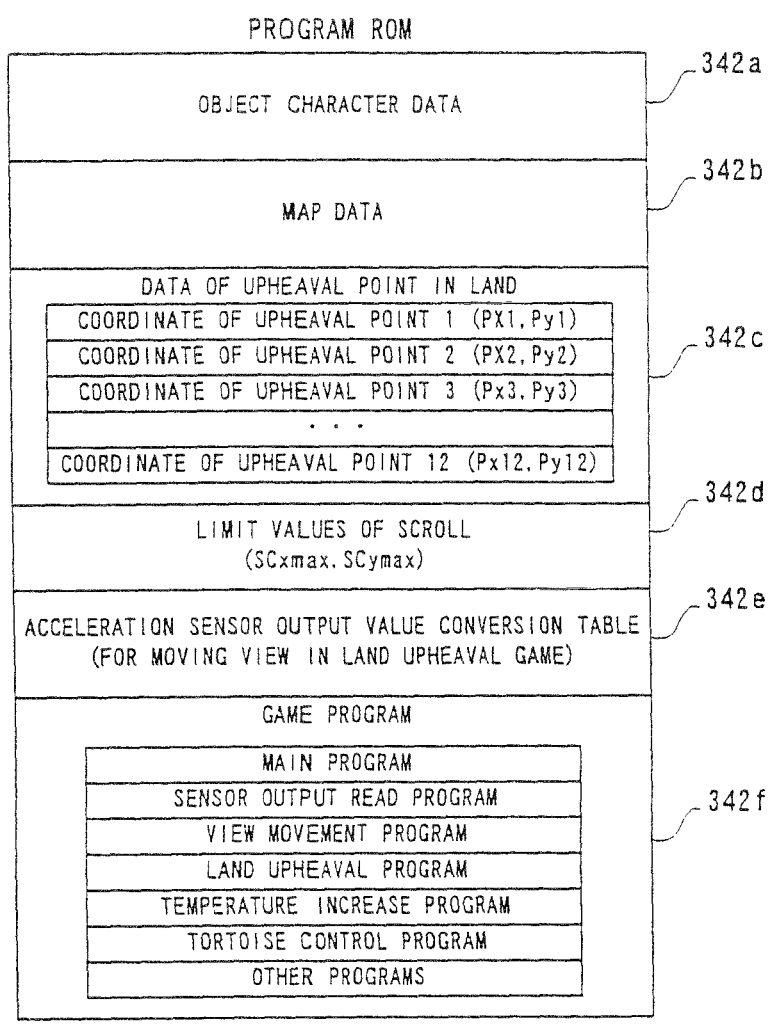
FIG. 45 is a memory map of a program ROM of the second embodiment.

FIG. 45 is a memory map of the program ROM 34. The program ROM 34 stores a game program and game data to be executed by the CPU 21. The program ROM 34, includes an object-character data memory area 342*a*, a map-data memory area 342*b*, a land-upheaval-point data memory area 342*c*, a scroll-limit value data memory area 342*d*, an acceleration-sensor output value conversion table memory area 342*e* and a game program memory area 342*f*. The object-character data memory area 342*a* and the map-data memory area 342*b* store object characters and game-map graphic data. The land-upheaval-point data memory area 342*c* stores position data (X coordinate and Y coordinate; Px1-Px12, Py1-Py12) in a game space for each of the land upheaval characters (82*a*-82*l*) shown in FIG. 42. The scroll-limit-value data memory area 342*d* stores data representative of scroll limit values (SCxmax, SCymax) in order not to allow scrolling at an up, down, left or right end of the game space when scrolling the game space.

The acceleration-sensor output value conversion table memory area 342*e* stores a conversion table to convert, and utilize in a game program, output values of the XY-axis acceleration sensor 31 and Z-axis contact switch 32. Specifically, data similar to that of the conversion tables (FIG. 20 to FIG. 26) of the first embodiment is stored. A sensor output value X (INx) and sensor output value Y (INy) are defined to be utilized in calculating a change amount of a scroll counter X coordinate (SCx) and Y coordinate (SCy) in a range-of-sight moving process hereinafter described with reference to FIG. 48. Due to this, by giving a slide-input to the portable game apparatus (see FIG. 9 in the first embodiment), the game space on display is scrolled thereby making processing to move the range of sight. Also, definition is made to utilize a Z-axis contact switch output value (INz) in a land upheaval determination. Definition is made to utilize an impact input flag (FS) in temperature rise determination.

The game program memory area 342*f* stores a game program to be executed by the CPU 21. Specifically, the following are stored in a game program memory area: a main program hereinafter described with reference to FIG. 47, a sensor output read program similar to FIG. 31 of the first embodiment, a range-of-sight moving (i.e., view movement) program hereinafter described with reference to FIG. 48, a land upheaval program hereinafter described with reference to FIG. 49, a temperature increase program, a tortoise-character control program and other programs.

Figure 46:
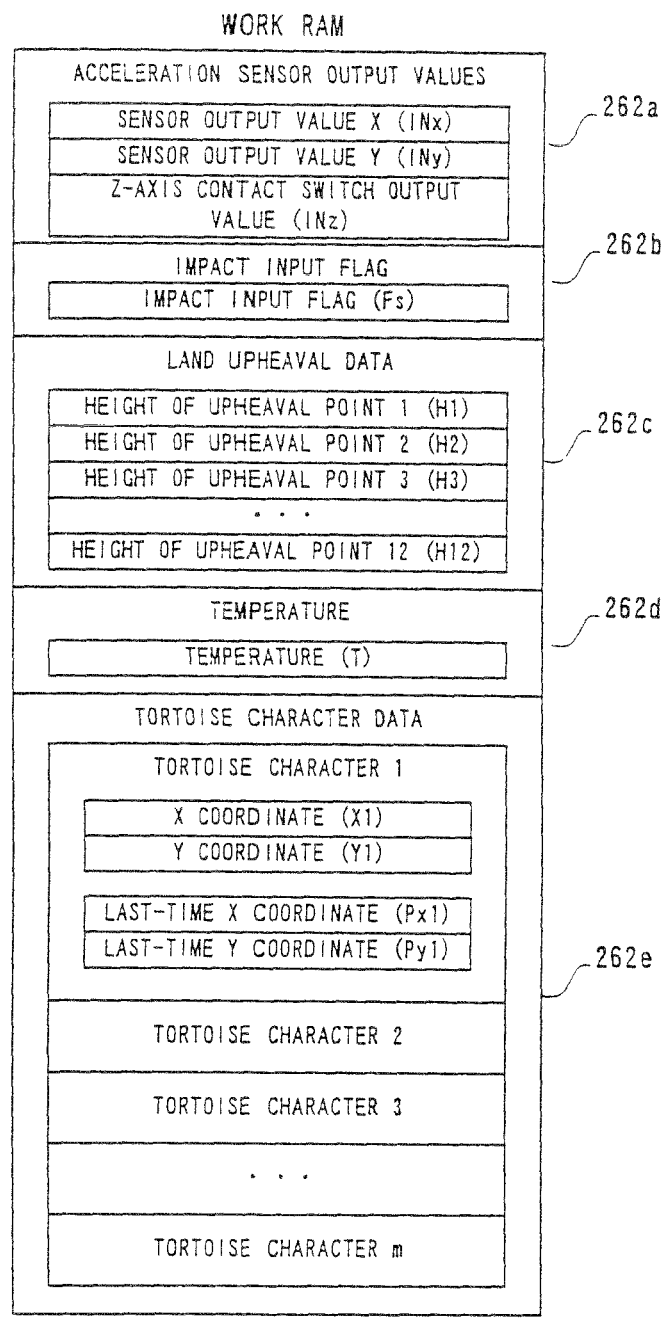
FIG. 46 is a memory map of a work RAM of the second embodiment.

FIG. 46 is a memory map of the work RAM 26. The work RAM 26 stores temporary data for the CPU 21 to execute a game program. Specifically, the following memory areas are included in the RAM 26: an acceleration-sensor output value memory area 162*a*, an impact input flag memory area 262*b*, a land-upheaval data memory area 262*c*, a temperature data memory area 262*d* and a character (e.g., tortoise) data memory area 262*e*.

The data stored in the acceleration-sensor output value memory area 262*a* and impact input flag memory area 262*b* are similar to that of the first embodiment. Hence detailed explanations thereof are omitted. The land-upheaval data memory area 262*c* stores height data concerning respective points of land upheaval. The height data is varied according to an impact input in the Z-axis direction in a land upheaval process hereinafter described with reference to FIG. 49. Based on this data, the land upheaval characters at respective land upheaval points are determined in the state of the display. For example, where the height data is 1, the land upheaval character is displayed as shown at 82*a* in FIG. 42(*a*). Where the height data is 2, display is as shown at 82*a* in FIG. 42(*b*). Where the height data is 3, display is as shown at 82*a* in FIG. 42(*c*).

The temperature data memory area stores temperature data for the game space. The temperature data is varied according to an impact input in the XY-axis direction, in a temperature increase process (in step S64 of the main program shown in FIG. 47). This data has an effect upon a tortoise-character control process (self-control movement, in step S65 of the main program shown in FIG. 47).

The character-data memory area 262e stores coordinate data (X, Y, Z) and last-time coordinate data (Px, Py, Pz), of the tortoise characters.

The memory map of the display RAM is similar to that of FIG. 18 of the first embodiment. Hence, a detailed explanation thereof is omitted.

Hereunder, a process flow of a game program will be explained with reference to FIG. 47 to FIG. 49.

Figure 47:
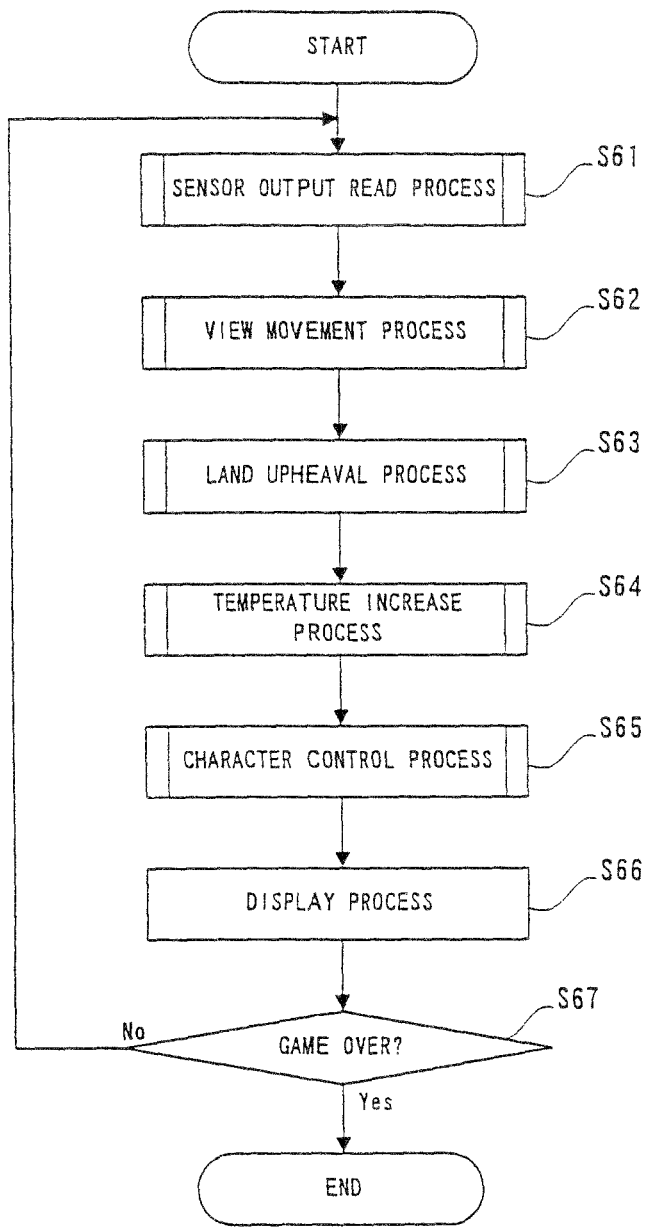
FIG. 47 is a main routine flowchart of the second embodiment.

FIG. 47 is a main routine flowchart. When a cartridge 30 is inserted into the portable game apparatus main body 10 and the power to the portable game apparatus main body 10 is turned on, a main routine as shown in FIG. 47 is started. In the second embodiment, a 0G position process or neutral-position set process may be made similarly to the first embodiment. Hence, a detail explanation thereof is omitted for the sake of simplicity.

First, in step S61, a sensor output read process is performed similarly to FIG. 31 of the first embodiment. This process reads output values of the XY-axis acceleration sensor 31 and Z-axis contact switch 32 through the sensor interface 33 (corrections by 0G position data and neutral position data is omitted). After the step S61, in step S62 a range-of-sight moving process (view movement scroll process of a game space on display) is made that is hereinafter described with reference to FIG. 48. After the step S62, in step S63 a land upheaval process is made that is hereinafter described with reference to FIG. 49. After the step S63, in step S64 a temperature increase process is made. In the temperature increase process, it is first determined whether there is an impact input in the XY-axis direction or not. If the presence of an impact input in the XY-axis direction is determined, processing is made to increase a temperature parameter (T) by 1. After the step S64, in step S65 a tortoise-character control process is made. In the tortoise-character control process, a tortoise-character moving process is first made due to self-controlled movement. Specifically, processing is made to calculate a tortoise-character moving amount, e.g. using random values. Incidentally, control is made such that the self-controlled movement of a tortoise character increases as the amount of the temperature (T) becomes higher. Thereafter, a tortoise-character moving process is made with land upheaval. Specifically, processing is made to move the tortoise character in a sliding manner when a land under the tortoise character is raised. Incidentally, the tortoise-character control process is repeated by the number of the tortoise characters.

After the step S65, in step S66 game-space scrolling as well as a display process for a land upheaval object and tortoise character are made based on a result of the range-of-sight moving process, land-upheaval process and tortoise-character control process. Incidentally, where a land upheaval point is raised in height due to the land upheaval process, it would be effective to display the land upheaval character higher and greater together with generation of such sound as imagining an upheaval of a land. After the step S66, it is determined in step S67 whether the game is over or not. For example, a game-over determination is to be made under a proper condition suited for a game content, including effecting a game over determination, e.g. when a predetermined time has elapsed. If a game over is determined in the step S67, the main routine ends. If no game over is determined in the step S67, the process returns to the step S61.

Figure 48:
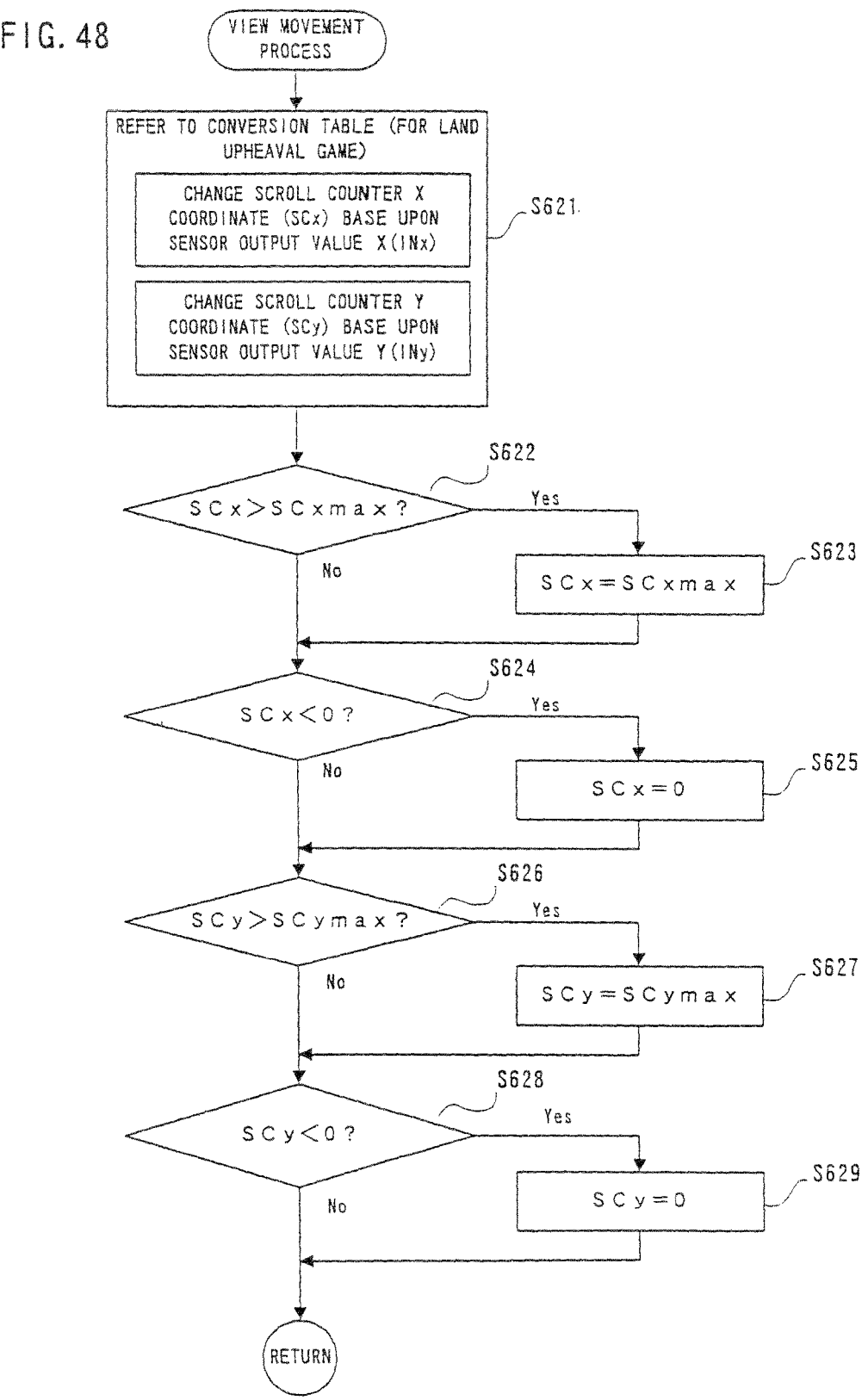
FIG. 48 is a range-of-sight moving process flowchart of the second embodiment.

FIG. 48 is a range-of-sight moving process (view movement process) flowchart. First, in step S621 reference is made to a conversion table to perform a process of changing a scroll-counter X coordinate (SCx) and Y coordinate (SCy). After the step S621, it is determined in steps S622-S629 whether a scroll is about to exceed an end of the game space or not. When the scroll is about to exceed a game-space end, processing is made to bring the scroll counter values (SCx, SCy) to proper values.

In step S622, it is determined whether the scroll-counter X coordinate (SCx) is in excess of a scroll limit value X coordinate (SCxmax) or not. If not in excess of it, the process advances to step S624. When in excess of the limit is determined in step S622, the process proceeds to step S623. After setting the scroll-counter X coordinate (SCx) value to the scroll limit value X coordinate (SCxmax), the process advances to step S624.

In step S624, it is determined whether the scroll-counter X coordinate (SCx) is smaller than 0 or not. If SCX is determined as being 0 or greater, the process advances to step S626. Where SCX is determined as being smaller than 0 in the step S624, the process proceeds to step S625 to set the scroll-counter X coordinate (SCx) value at 0, and then the process proceeds to step S626.

In step S626, it is determined whether the scroll-counter Y coordinate (SCy) is in excess of the scroll-limit-value Y coordinate (SCymax) or not. If SCY is determined not in excess thereof, the process proceeds to step S628. Where SCY is determined as being in excess of SCymax in the step S626, the process advances to step S627 to set a Y coordinate (SCy) value to the scroll-limit-value Y coordinate (SCymax), and then the process advances to step S628.

In the step S628, it is determined whether the scroll-counter Y coordinate (SCy) is smaller than 0 or not. If SCy is determined as being 0 or greater, the range-of-sight moving process is ended. If SCy is determined as being smaller than 0 in the step S628, the process proceeds to step S629 to set the scroll-counter Y coordinate (SCy) value at 0, and then the range-of-sight moving process ends.

Figure 49:
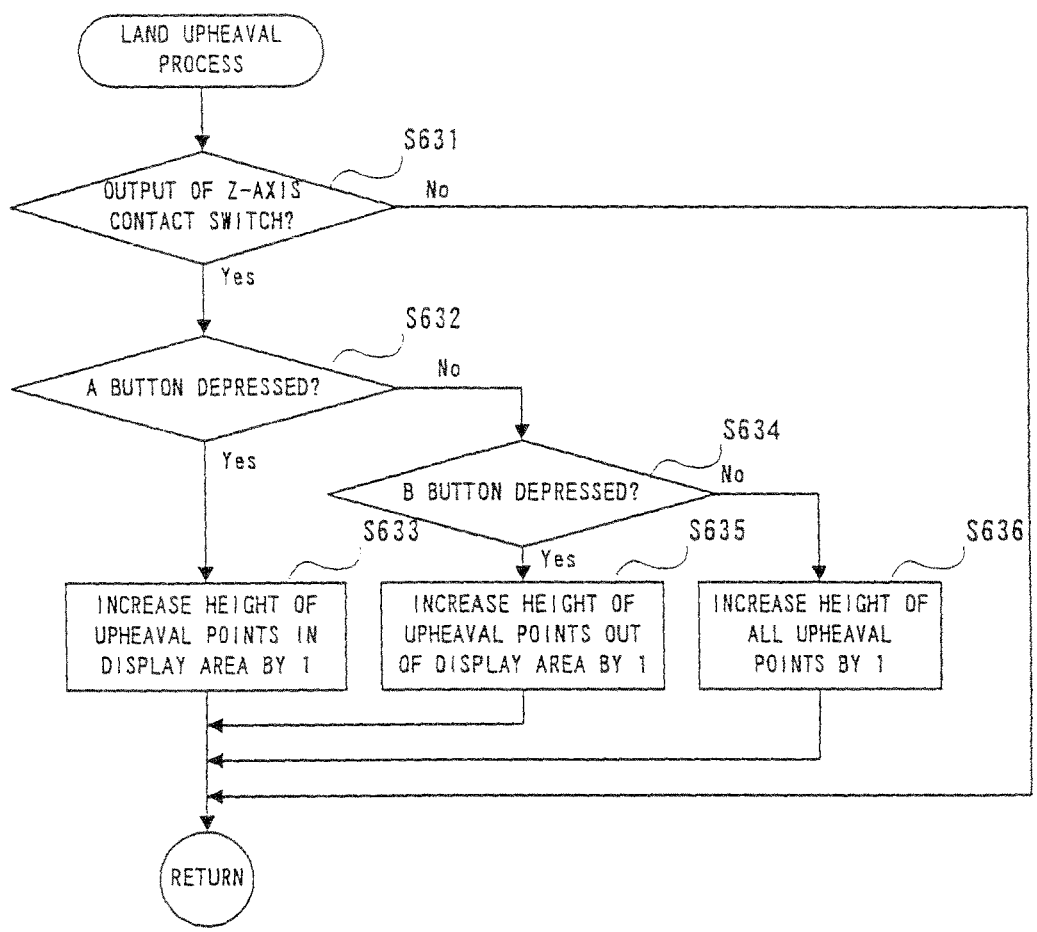
FIG. 49 is a land-upheaval process flowchart of the second embodiment.

FIG. 49 is a land-upheaval process flowchart. First, it is determined in step S631 whether there is an output of the Z-axis contact switch or not (i.e. whether there is an impact input in the Z-axis direction or not). Where it is determined that a Z-axis contact switch output is absent, the land-upheaval process ends. Where it is determined that a Z-axis contact switch output is present, the process advances to step S632. In the step S632, it is determined whether the button A (operation switch 13b) is being pressed or not. Where it is determined that the button A is being pressed, the process advances to step S633 to execute processing to increase by 1 the respective land-upheaval points in an area being displayed on the LCD 12. After the step S633, the land-upheaval process is ended.

If it is determined in the step S632 that the button A is not being pressed, the process proceeds to step S634 to determine whether the button B (operation switch 13c) is being pressed or not. If it is determined that the button B is being pressed, the process proceeds to step S635 to execute processing to increase by 1 the height (H) of the land upheaval points outside the area being displayed on the LCD 12. After the step S635, the land upheaval process ends. If it is determined in the step S634 that the button B is not being depressed, in step S636 all the land upheaval points in height (H) are increased by 1, and then the land upheaval process is ended.

(Third Embodiment)

Next, a third present exemplary embodiment will be explained with reference to FIG. 50 to FIG. 59. One goal of this game is to enjoy virtual cooking while moving the portable game apparatus as if it was a frypan or kitchen knife.

Figure 50:
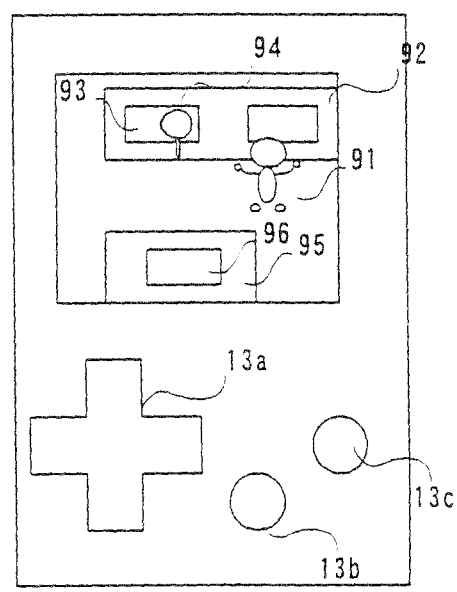
FIG. 50 is an example of a game scene of a third embodiment.
Figure 51:
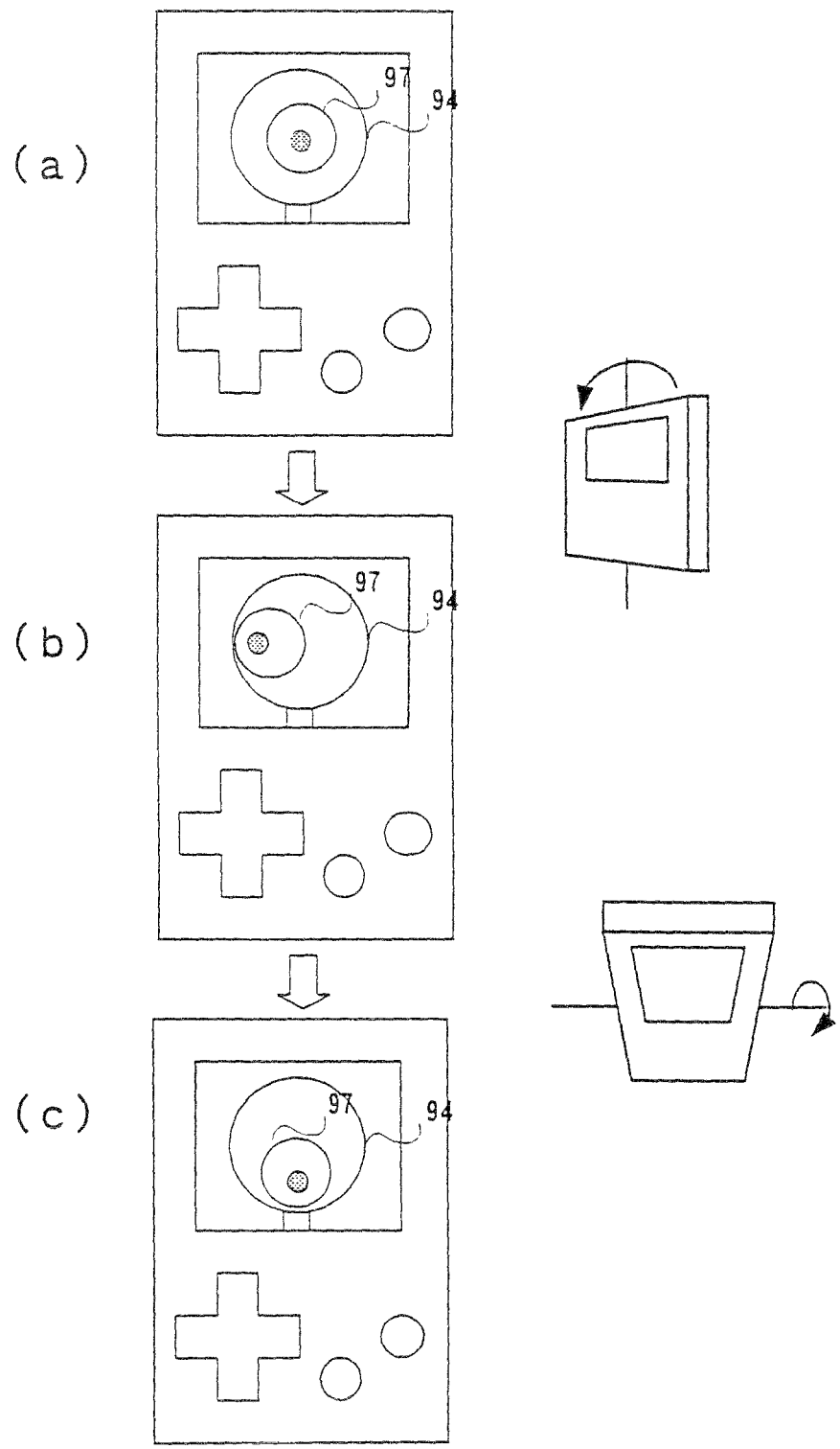
FIGS. 51(a), 51(b) and 51(c) are an example of a game scene (frypan space process) of the third embodiment.
Figure 52:
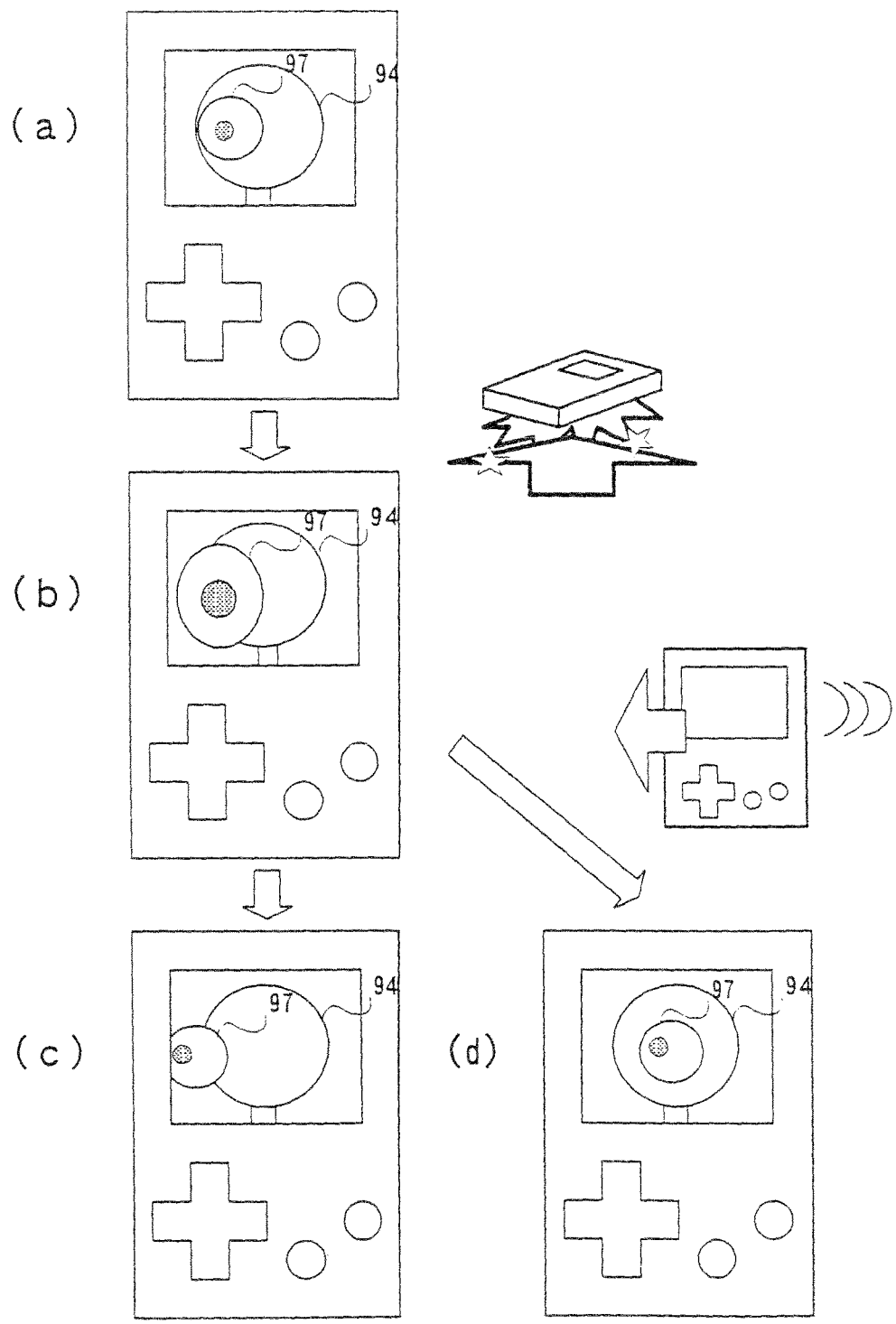
FIGS. 52(a), 52(b), 52(c) and 52(d) are an example of a game scene (frypan space process) of the third embodiment.
Figure 53:
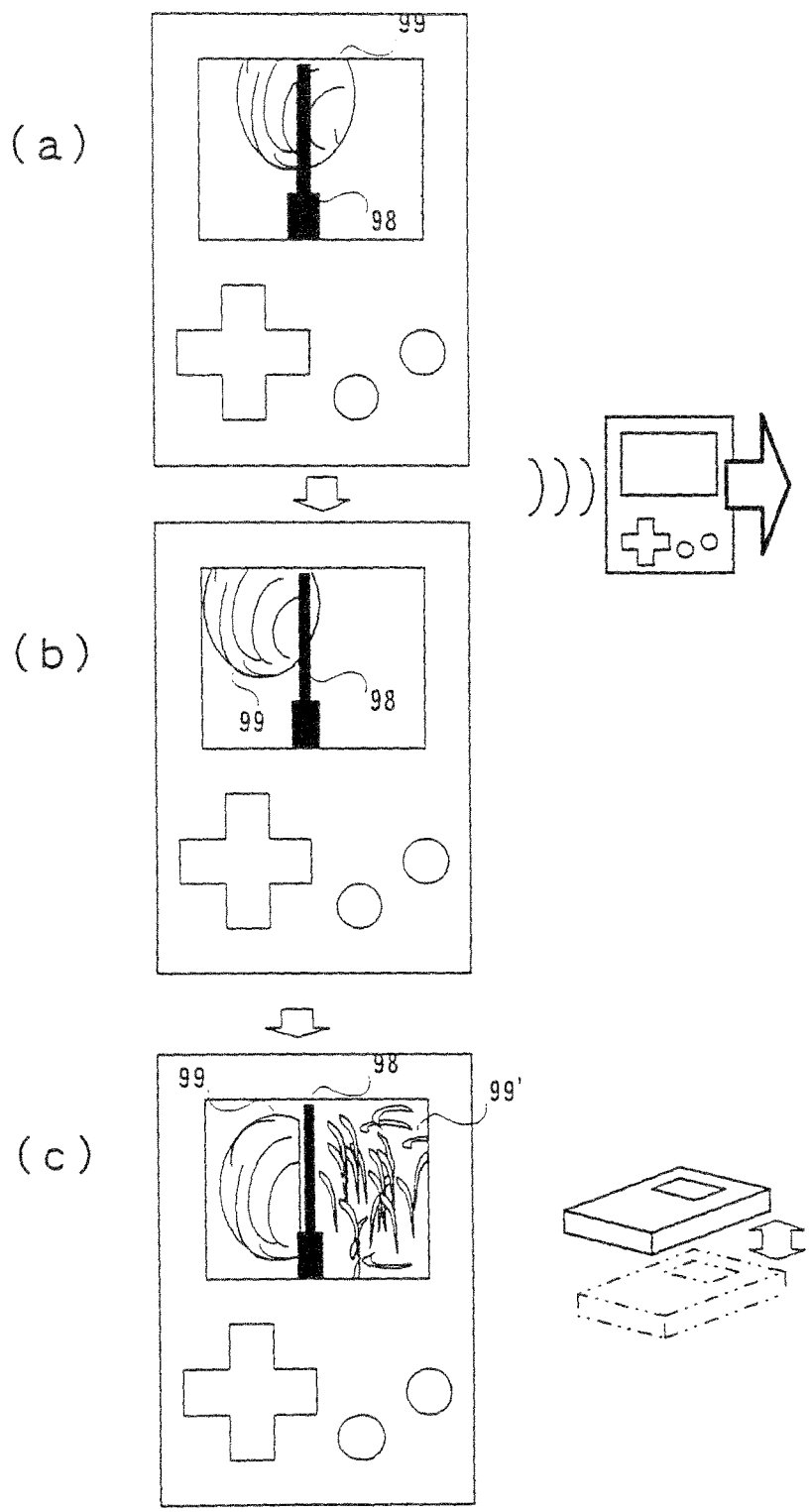
FIGS. 53(a), 53(b) and 53(c) are an example of a game scene (kitchen-knife space process) of the third embodiment.

FIG. 50 to FIGS. 53(a)-53(c) show examples of game scenes. In FIG. 50, the following are displayed in the game scene: a player character 91, a kitchen 92, a cooking stove 93, a frypan 94, a desk 95 and a chopping board 96. When pressing the button A (operation switch 13b), a frypan space process is started that is hereinafter described with reference to FIGS. 51(a)-51(c) and FIGS. 52(a)-52(d). Also, when pressing the button B (operation switch 13c), a kitchen-knife space process is started that is hereinafter described with reference to FIGS. 53(a)-53(c).

FIGS. 51(a)-51(c) and FIGS. 52(a)-52(d) are examples of game scenes in the frypan space process. In the frypan space process, the portable game apparatus is operated just like a frypan to play a game of cooking a fried egg. In FIG. 51(a), a frypan 94 and egg 97 is displayed in the game scene. In a state shown in FIG. 51(a), when the portable game apparatus is tilted in a minus (i.e., negative) direction about the Y-axis, the egg 97 is displayed moving toward left of the frypan as shown in FIG. 51(b). Also, in a state shown in FIG. 51(b), when the portable game apparatus is tilted in the plus (i.e., positive) direction about the X-axis, the egg 97 is displayed moving toward the lower portion of the frypan. It is thus possible to provide the player with a feeling as if he or she operates the portable game apparatus just like a frypan to move the egg by tilting the frypan.

In a state shown in FIG. 52(a), when an impact input in the Z-axis direction is applied to the portable game apparatus, the egg 97 is displayed jumping above the frypan 94 as shown in FIG. 52(b). Thereafter, the egg 97 is displayed landing as shown in FIG. 52(c) or (d). At this time, where the egg 97 at an impact input in the Z-axis direction is positioned close to an end of the frypan 94 as shown in FIG. 52(a), the egg 97 jumps and lands out of the frypan 94 (FIG. 52(c)) thus resulting in a failure. Incidentally, in a state shown in FIG. 52(b), it is possible to modify a relative positional relationship between the egg 97 and the frypan 94 to land the egg 97 in the frypan 94 by sliding the portable game apparatus (FIG. 52(d)). It is thus possible to provide the player with a feeling as if the portable game apparatus was operated just like a frypan to receive the jumped egg with the frypan.

FIGS. 53(a)-53(c) are examples of game scenes in a kitchen-knife space process. In the kitchen-knife space process, the portable game apparatus is operated just like a kitchen knife to play a game of cutting a cabbage into fine strips. In FIG. 53(a), a kitchen knife 98 and cabbage 99 is displayed in the game scene. As shown in FIG. 53(a), when the portable game apparatus is slid in the plus direction of the X-axis, the cabbage 99 is displayed as moving left relative to the kitchen knife 98 as shown in FIG. 53(b) (because the kitchen knife 98 is always displayed at a center of the game scene, the cabbage 99 is displayed moving relatively left). By thus processing, it is possible to provide the player with a feeling as if he or she adjusts a position to cut the cabbage by controlling the positional relationship between the cabbage and the kitchen knife.

Furthermore, in the state shown in FIG. 53(b), when the portable game apparatus is vertically moved (movement input in the Z-axis direction), the cabbage 99 is displayed being cut by the kitchen knife 98 into fine strips. When this happens, it will be more effective if a sound of cutting the cabbage is generated.

The explanation below will be made regarding the data stored on the memory with reference to FIG. 54. Incidentally, the program ROM 34 stores a program almost similar to the program ROM of the first embodiment (FIG. 16). However, the acceleration-sensor output value conversion table memory area stores a table for a frypan, a table for jumping an egg and a table for a kitchen knife. The game program memory area stores a main program, a sensor output read program, a frypan space program, an egg jump program, a kitchen knife space program and other programs. Incidentally, the frypan table in the acceleration-sensor output value conversion table will be referred to as a frypan space program as hereinafter described with reference to FIG. 56. The egg-jumping table will be referred to as an egg-jumping program as hereinafter described with reference to FIG. 58. The kitchen-knife table will be referred to as a kitchen-knife space program as hereinafter described with reference to FIG. 57.

In the frypan table, the output value (INx, INy) of the XY-axis acceleration sensor 31 is defined to be utilized in calculating a change amount of egg X-and-Y coordinate (Ex, Ey). Due to this, the display position of an egg is varied when a tilt is input to the portable game apparatus (see FIG. 10 in the first embodiment), thereby displaying and controlling the egg as if it slides over the frypan. Also, the output value (INz) of the coordinate Z-axis contact switch 32 is to be utilized in a jump determination of an egg. The impact input flag (FS) is defined so that it is not to be utilized.

In the egg jumping table, the output value (INx, INy) of the XY-axis acceleration sensor 31 is defined to be utilized in calculating a change amount of an egg X-and-Y coordinates (Ex, Ey). Due to this, the display position of an egg is varied when inputting a slide to the portable game apparatus while the egg is jumping (see FIG. 9 in the first embodiment). This provides display and control as if the relative position of the frypan and the egg was varied. Incidentally, in the egg jumping table, the correction ratio is defined as a minus value. This is because in the present embodiment the frypan is displayed fixedly in the game scene and the egg is displayed as moving relative to the frypan. Consequently, there is a need to display a movement of the egg in a direction reverse to the slide direction of the portable game apparatus. Also, the output value (INz) of the Z-axis contact switch 32 and the impact input flag (FS) are not utilized.

In the kitchen-knife table, the output values (INx, INy) of the XY-axis acceleration sensor 31 is defined to be utilized in calculating a change amount of a cabbage X-and-Y coordinates (CAx, CAy). Due to this, when a slide is input to the portable game apparatus, the display position of the cabbage is varied to provide display and control as if the relative position of the cabbage and the kitchen knife were varied. Incidentally, in the kitchen-knife table, the correction ratio is defined as a minus value similarly to the egg jumping table. This is because, in the present embodiment, the kitchen knife is fixedly displayed in the game scene. In order to display the cabbage moving relative to the kitchen knife, there is a need to display the cabbage as moving in a direction reverse to a slide direction of the portable game apparatus. Also, the output value (INz) of the Z-axis contact switch 32 is utilized in the determination of the cabbage cutting process, and the impact input flag (FS) is defined so that it is not to be utilized.

Figure 54:
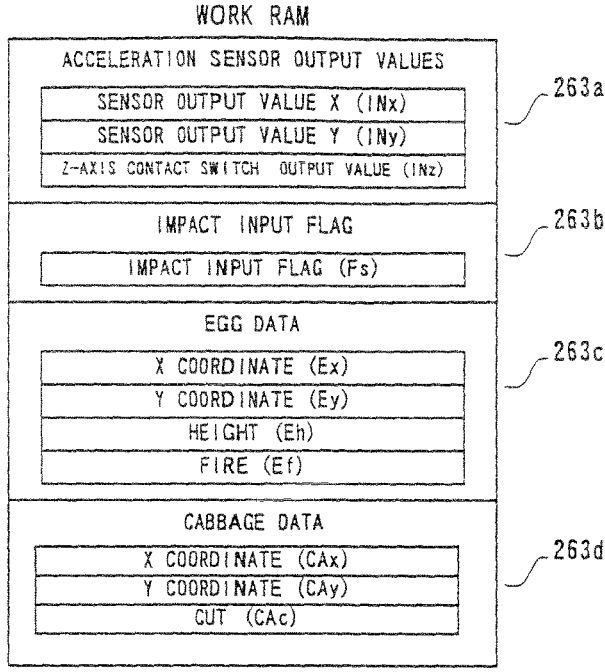
FIG. 54 is a memory map of a work RAM of the third embodiment.

FIG. 54 is a memory map of the work RAM 26. The work RAM 26 stores temporary data to be used upon executing the game program by the CPU 21. Specifically, the work RAM 26 includes the following memory areas: an acceleration-sensor output value memory area 263a, an impact input flag memory area 263b, an egg data memory area 263c and a cabbage data memory area 263d.

The data stored in the acceleration-sensor output value memory area 263a and impact input flag memory area 263b is similar to the first embodiment. Hence, explanation thereof is omitted.

The egg data memory area 263c stores data of the egg X coordinate (Ex), the egg Y coordinate (Ey), height (Eh) and broiling conditions (Ef). The cabbage data memory area 263d stores data of cabbage's X coordinate (CAx), Y coordinate (CAy) and cut conditions (CAc).

The memory map of the display RAM is similar to FIG. 18 in the first embodiment, and explanation thereof is thus omitted.

A flow of game program process will be explained below with reference to FIG. 55 to FIG. 59.

Figure 55:
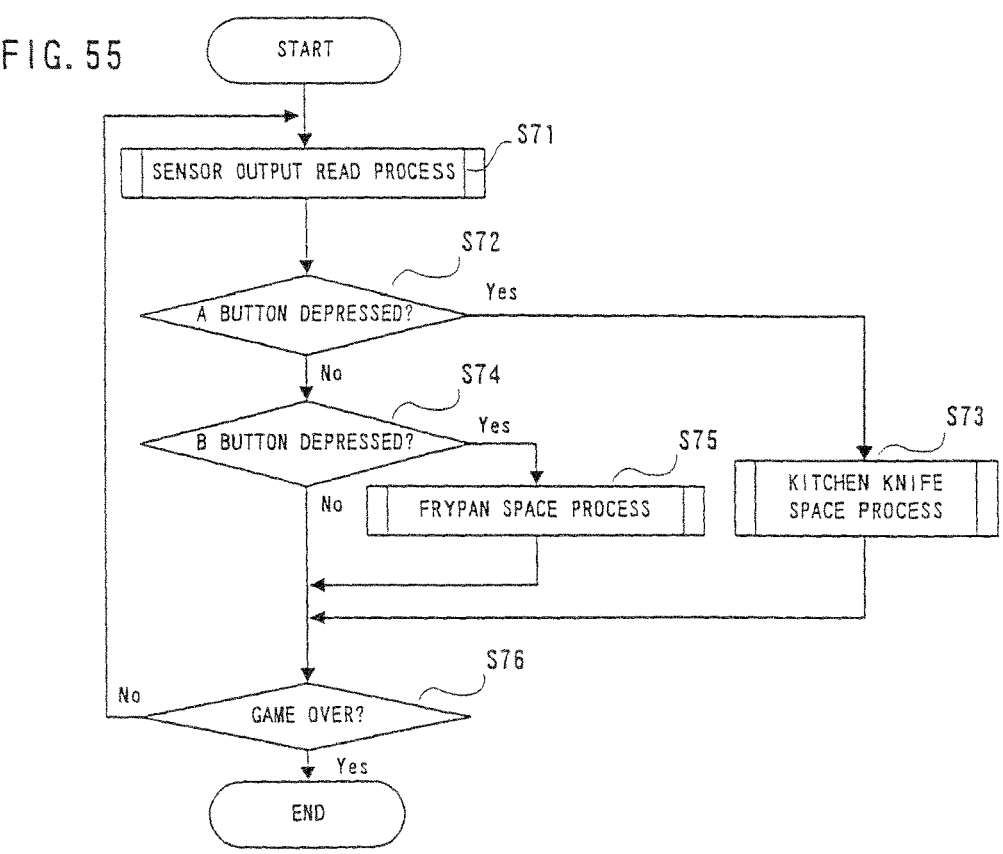
FIG. 55 is a main routine flowchart of the third embodiment.

FIG. 55 is a main routing flowchart. When a cartridge 30 is inserted in the portable game apparatus main body 10 and the power to the portable game apparatus main body 10 is turned on, a main routine shown in FIG. 55 is started. In the third embodiment, an 0G position set process or a neutral-position set process may be made as in the first embodiment. A detailed explanation thereof is thus omitted for the sake of simplicity.

First, in step S71 a sensor output read process is performed similarly to FIG. 31 of the first embodiment to read an output value of the XY-axis acceleration sensor 31 and Z-axis contact switch 32 through the sensor interface 33 (correction by 0G position data and neutral position data is omitted). After the step S71, it is determined in step S72 whether the button A (operation switch 13b) is pressed or not. If in the step S72 a determination is made that the button A is pressed, the process advances to step S73 to make reference to FIG. 57 and perform a kitchen knife space process hereinafter described, then the process proceeds to step S76.

If in the step S72, the button A is not pressed is determined, the process proceeds to step S74 to determine whether the button B (operation switch 13c) is pressed or not. If a determination is made that the B button is not pressed in the step S74, the process advances to step S76. If a determination is made that the button B is pressed in the step S74, the process advances to step S75 to perform a frypan space process hereinafter described with reference to FIG. 56, then the process advances to step S76.

It is determined in the step S76 whether the game is over is not. Specifically, game over determination is made under a proper condition as suited to a game content, such as determining a game over when a predetermined time has elapsed. If no game over is determined in the step S76, the process returns to the step S71. If game over is determined in the step S76, the main routine ends.

Figure 56:
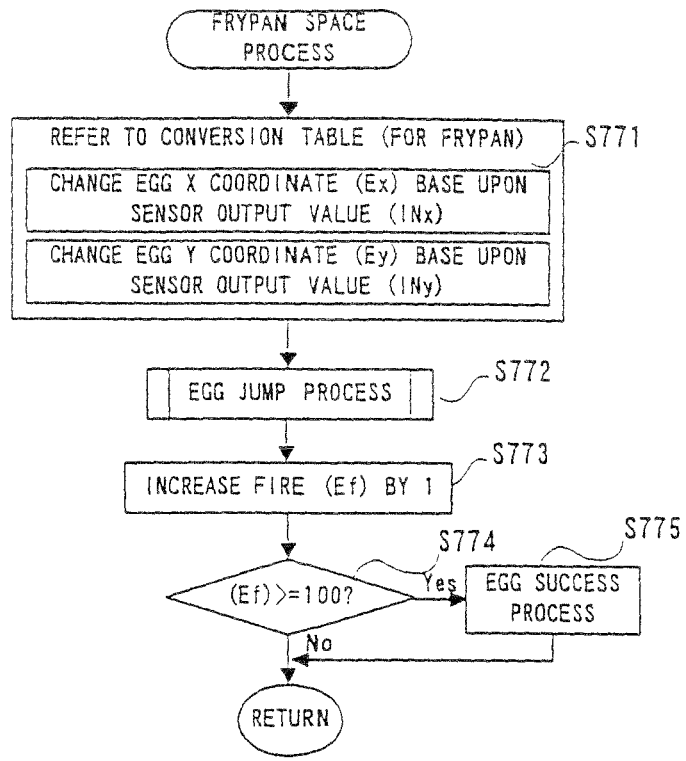
FIG. 56 is a frypan space process flowchart of the third embodiment.

FIG. 56 is a frypan space process flowchart. First, in step S771 reference is made to the frypan table to make a change process to the egg X coordinate (Ex) and egg Y coordinate (Ey). After the step S771, in step S772 an egg jump process is made that is hereinafter described with reference to FIG. 58. After the step S772, in step S773 processing is made to increase the egg-broil condition (Ef) by 1. After the step S773, it is determined in step S774 whether the egg-broil condition (Ef) becomes 100 or greater or not. If it is determined that the egg-broil condition (Ef) is smaller than 100, the frypan space process ends. If it is determined that the egg-broil condition (Ef) is 100 or greater, the process advances to step S775 to perform an egg success process. In the egg success process, a scene, e.g., of completing egg cooking is displayed and a score-adding process is made. After the step S775, the frypan space process ends.

Figure 57:
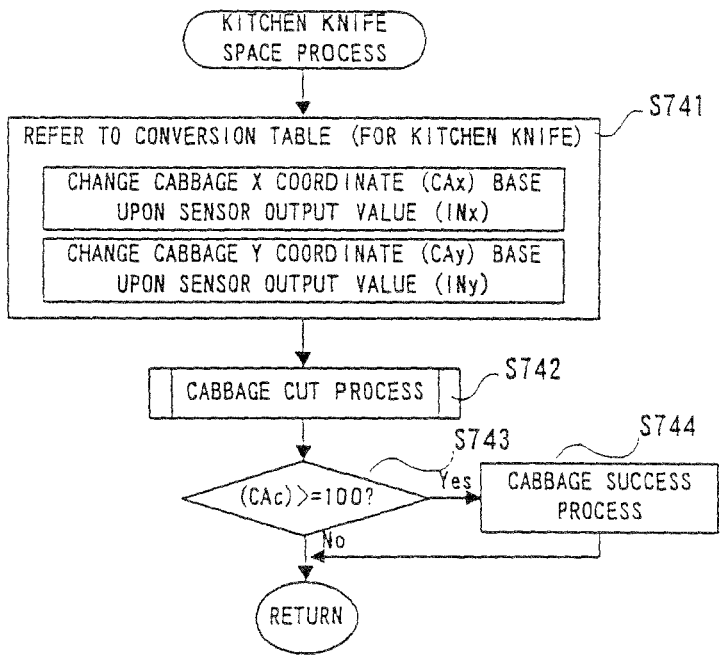
FIG. 57 is a kitchen-knife space process flowchart of the third embodiment.

FIG. 57 is a kitchen-knife space process flowchart. First, in step S741 reference is made to the kitchen-knife table to perform a change process to the cabbage X coordinate (CAx) and cabbage Y coordinate (CAy). After the step S741, in step S742 a cabbage cut process is made that is hereinafter described with reference to FIG. 59. After the step S742, it is determined in step S743 whether the cabbage cut ratio (CAc) is 100 or greater or not. If it is determined that the cabbage cut ratio (CAc) is smaller than 100 determined, the kitchen-knife space process is ended. If it is determined that the cabbage cut ratio (CAc) is 100 or greater, the process proceeds to step S744 to perform a cabbage success process. In the cabbage success process, a scene, e.g. of completing cabbage cutting is displayed and a score-adding process is made. After the step S774, the kitchen-knife space process ends.

Figure 58:
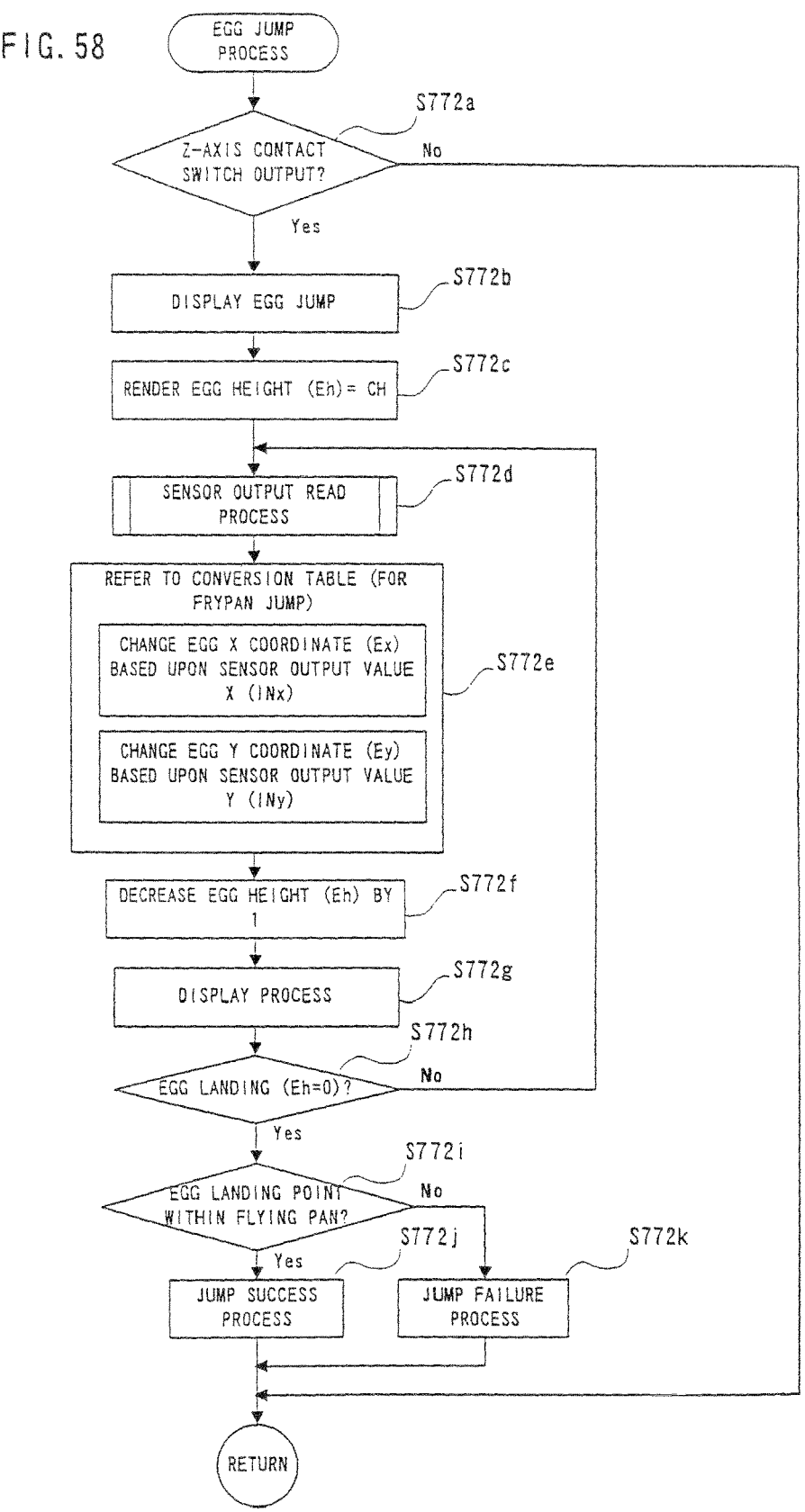
FIG. 58 is an egg jump process flowchart of the third embodiment.

FIG. 58 is an egg jump process flowchart. First, it is determined in step S772a whether there is an output of the Z-axis contact switch or not (e.g. whether there is an impact input in the Z-axis direction or not). If it is determined in the step S772a that there is no output of the Z-axis contact switch, the egg jump process ends. If it is determined that there is an output of the Z-axis contact switch in the step S772a, in step S772b the jumping egg is displayed. After the step S772b, in step S772c the egg is set in height (Eh) to CH (predetermined value). After the step S772c, in step S772d a sensor output read process is made similarly to FIG. 31 of the first embodiment, thereby reading an output of the XY-axis acceleration sensor 31 and Z-axis contact switch 32 through the sensor interface 33 (correction by 0G position data and neutral position data is omitted). After the step S772d, in step S772e reference is made to the egg jump table to perform a change process to the egg X coordinate (Ex) and egg Y coordinate (Ey). The step S772e, in step S772f processing is made to decrease the egg height (Eh) by 1. After the step S772f, in step S772g processing is made to display based on the egg X coordinate (Ex), Y coordinate (Ey) and height (Eh). After the step S772g, it is determined in step S772h whether the egg has landed or not, i.e. the egg height (Eh) has become 0 or not. If it is determined that the egg has not landed in the step S772h, the process returns to the step S772d. If it is determined that the egg has landed in the step S772h, it is determined in step S772a whether an egg landing position is within the frypan or not. If determined within the frypan, then in step S772j a jump success process has made and then the egg jump process is ended. In the jump success process, for example, music of success is generated while displaying "SUCCESS" and a score-adding process is made. Where it is determined in the S772i that the egg landing position is outside the frypan, in step S772k a jump failure process is made and then the egg jump process is ended. In the jump failure process, for example, music of failure is generated while displaying "FAILURE" and processing is made to render the egg-broil condition (Ef) 0 (re-frying egg cooking).

Figure 59:
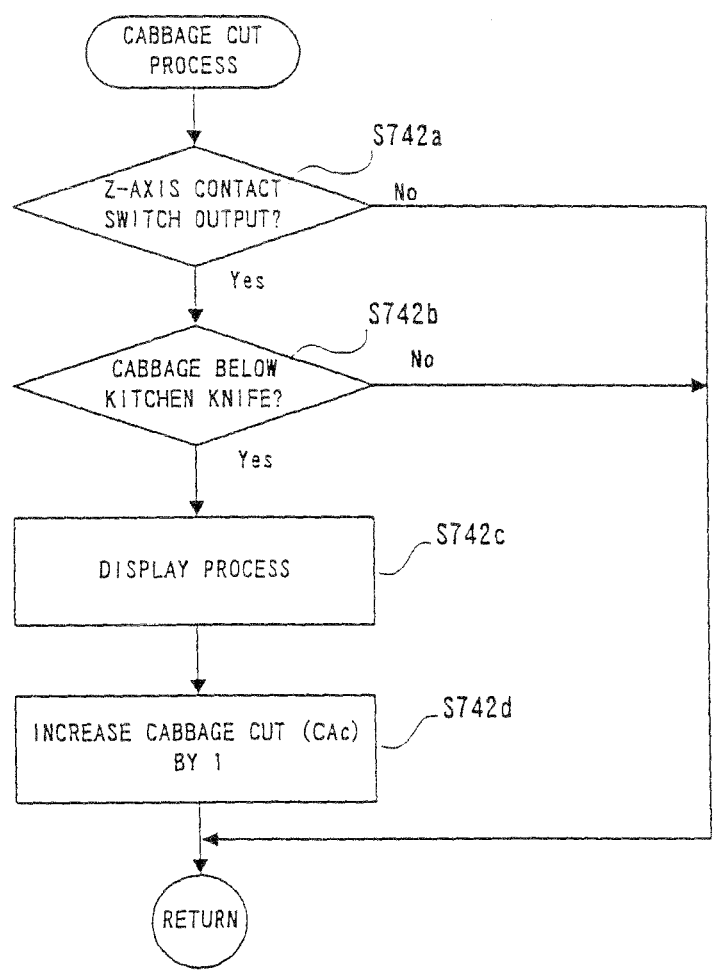
FIG. 59 is cabbage cut process flowchart of the third embodiment.

FIG. 59 is a cabbage cut process flowchart. First, it is determined in step S742a whether there is an output of the Z-axis contact switch or not (i.e. whether there is a movement input in the Z-axis direction or not). If no output of the Z-axis contact switch is determined in step S742a, the cabbage cut process ends. If an output of the Z-axis contact switch is determined in the step S742a, it is determined in step S742b whether there is a cabbage below the kitchen knife or not. If it is determined in the step S742b that there is no cabbage below the kitchen knife, the cabbage cut process ends. If it is determined that there is a cabbage below the kitchen knife in the step S742b, in step S742c a display process is made (display of cutting a constant amount of cabbage). After the step S742c, in step S742d processing is made to increase the cabbage cut ratio (CAc) by 1 and then the cabbage cut process ends.

(Fourth Embodiment)

Figure 60:
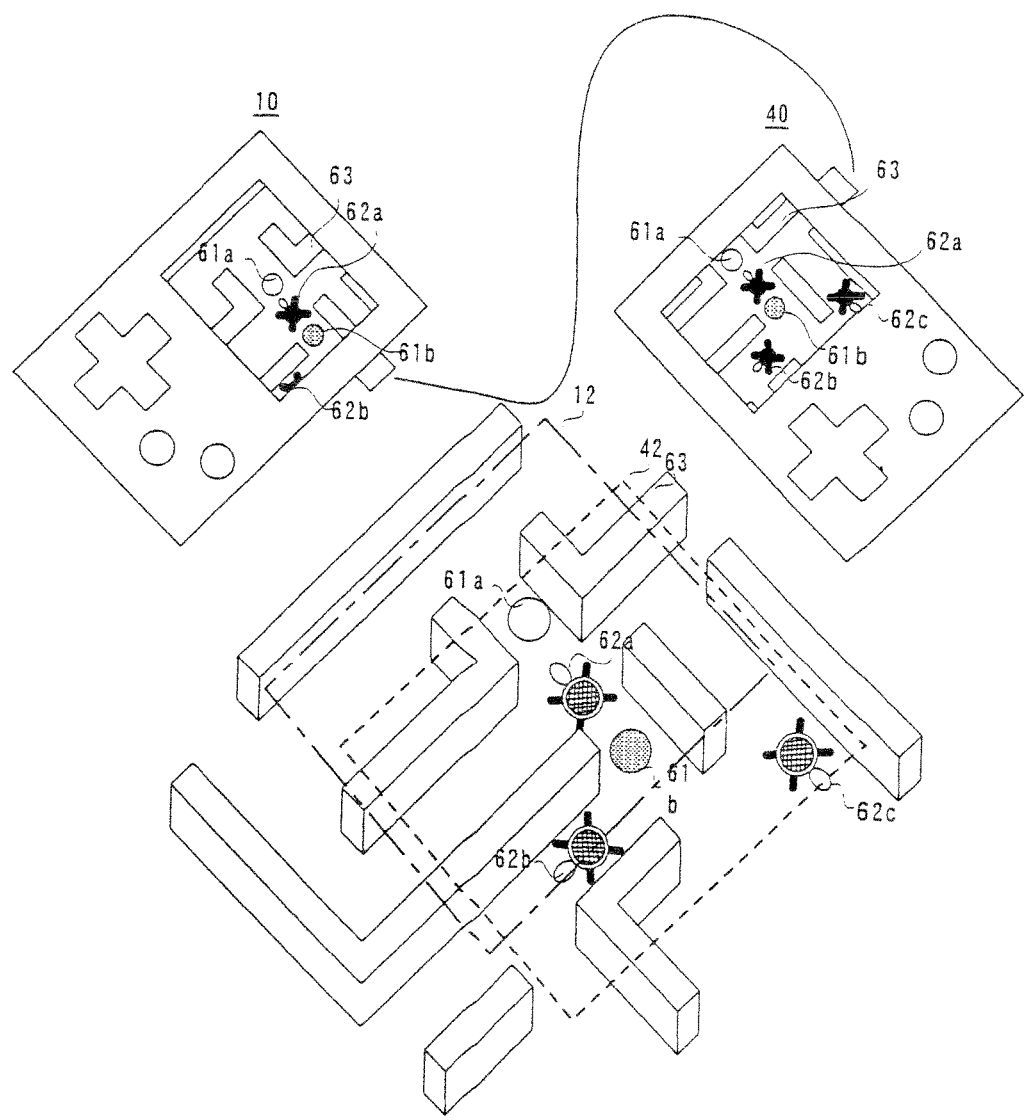
FIG. 60 is an example of a game scene of a fourth embodiment.

Next, a fourth present exemplary embodiment will be explained with reference to FIG. 60 to FIG. 66. FIG. 60 illustrates a concept view of a game space and example of a game scene of a plurality of portable game apparatuses. This game shares a game space through communication between the portable game apparatuses so that a plurality of players can enjoy a game while competing (or cooperating) in a game similar to the first embodiment. The game space has a maze plate that is common to the portable game apparatuses 10 and 40 so that the game images on the portable game apparatus 10 and portable game apparatus 40 are on the basis of the same game space data (note that the range of sight is different between the portable game apparatuses). On the LCD of the first portable game apparatus 10 a range 12 shown by the one-dot chain line is displayed. On the LCD of the second portable game apparatus 40, a range 42 shown by the dotted line is displayed. Similarly to the first embodiment, the tilt of the maze plate as a game space is simulated in accordance with a tilt of the portable game apparatus. However, in the present embodiment, simulation of a maze plate tilt is made by a value combining a tilt of the portable game apparatus 10 and a tilt of the portable game apparatus 40 (simulation of a maze plate tilt may be by a tilt of one portable game apparatus). A player on the portable game apparatus 10 would try to operate the tilt of the maze plate by tilting the portable game apparatus 10 in order to manipulate his or her own ball 61a. On the other hand, a player on the portable game apparatus 40 would try to operate the tilt of the maze plate by tilting the portable game apparatus 40 in order to manipulate his or her own ball 61b. Thus, they are difficult to tilt the maze plate in line with their intentions, providing enjoy for a more complicated game. Incidentally, in this embodiment, a communication cable 50 is used to communicate between the two portable game apparatuses. However, communication means such as wireless or portable phone may be utilized.

The program ROM of the fourth embodiment stores data almost similar to that of the program ROM (FIG. 16) of the first embodiment. However, the following are also stored in a game program memory area: a map confirming program hereinafter described with reference to FIG. 63 and FIG. 64 and a communication interrupt program hereinafter described with reference to FIG. 65 and FIG. 66, in addition to those of the first embodiment.

Among the programs stored in the game program memory area, the main program, the map confirming program and the communication interrupting program are different between the portable game apparatus 10 and the portable game apparatus 40. This difference is needed to perform communication processing using the portable game apparatus 10 as a master unit and the portable game apparatus 40 as a slave unit, the detail of which will be hereinafter described with reference to FIG. 61 to FIG. 66.

The work RAM of the fourth embodiment stores data almost similar to that of the work RAM 17 of the first embodiment. However, a composite data memory area is further included in addition to those of the first embodiment. The composite data memory area stores a composite value of an output value of the XY-axis acceleration sensor 31 and Z-axis contact switch 32 of the portable game apparatus 10 and an output value of the XY-axis acceleration sensor 31 and Z-axis contact switch 32 of the portable game apparatus 40.

The memory maps of the display RAM and backup RAM are similar to those of FIG. 18 and FIG. 19 of the first embodiment. Hence an explanation thereof is omitted.

A flow of a game program process will be explained below with reference to FIG. 61 to FIG. 66.

Figure 61:
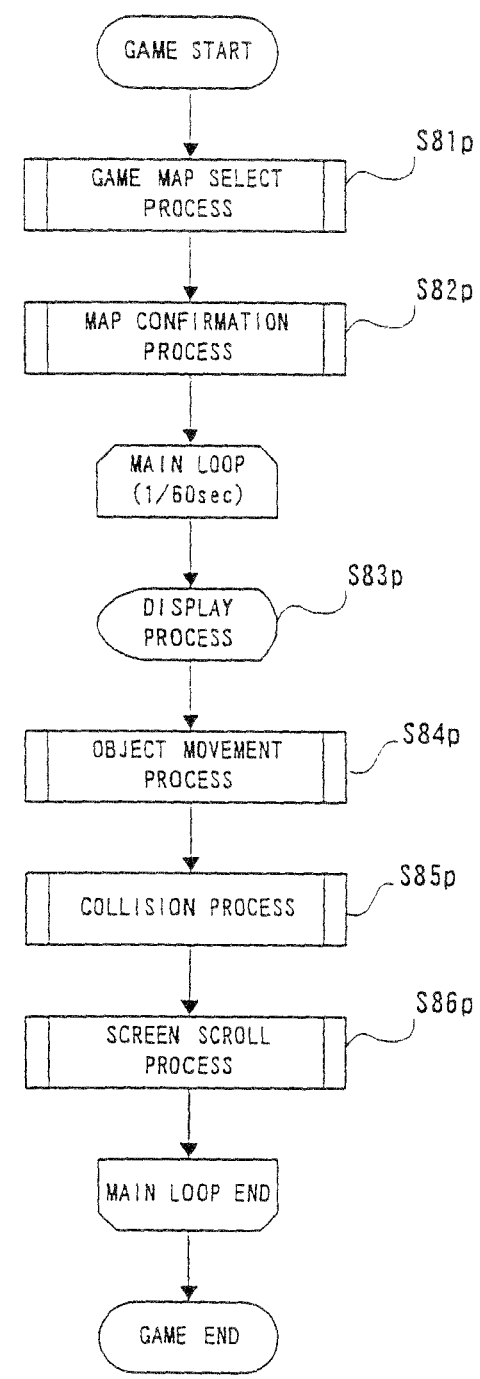
FIG. 61 is a main routine flowchart of a game apparatus 10 of a fourth embodiment.

FIG. 61 is a main routine flowchart to be executed in the portable game apparatus 10. Although in this embodiment the 0G set process, neutral-position set process and impact-input wave generation process are omitted for the sake of simplicity, these processes may be added similarly to the first embodiment.

First, in step S81p a game-map select process is performed similarly to FIG. 30 of the first embodiment. After the step S81p, in step S82p reference is made to FIG. 63 to perform a master-machine-map confirming process hereinafter described with reference to FIG. 63. After the step S82p, the process advances to step S83p.

Steps S83p to S85p are a main loop to be repeatedly processed until game-over or game-clear is reached. In step S83p, required data is written to the display RAM 25 based on the data of the work RAM 26 so that game scenes are displayed on the LCD 12 based on the data stored on the display RAM 25. In step S84p, an each-object moving process (wave moving process is omitted) is made similarly to that of FIG. 32 to FIG. 36 of the first embodiment, thus moving the player character and NPC. After the step S84p, in step S85p, a collision process is performed similarly to that of FIG. 37 of the first embodiment, thus colliding the player character with an NPC or the like. After the step S85p, in step S86p a screen scroll process is made similarly to that of FIG. 40 of the first embodiment.

Figure 62:
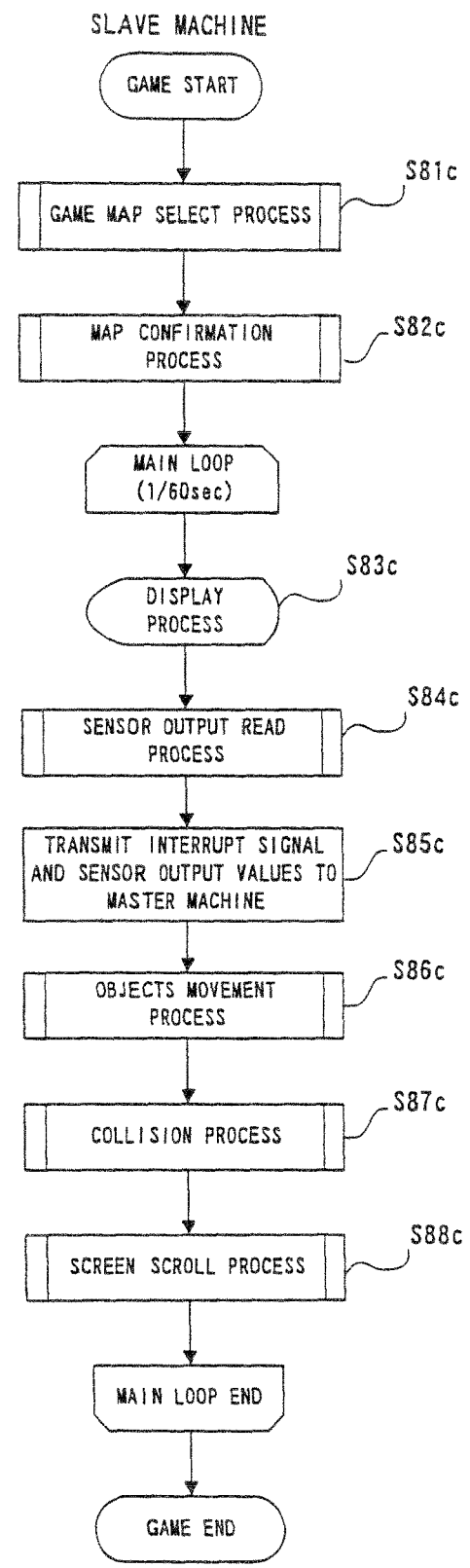
FIG. 62 is a main routine flowchart of a game apparatus 40 of the fourth embodiment.

FIG. 62 is a main routine flowchart to be executed in the portable game apparatus 40. Although in this embodiment the 0G set process, neutral-position set process and impact-input wave generation process are omitted in order for simplicity, these processes may be added similarly to the first embodiment.

First, in step S81c a game-map select process is made similarly to that of FIG. 30 of the first embodiment. After the step S81c, in step S82c a slave-machine map confirming process is performed that is hereinafter described with reference to FIG. 64. After the step S82c, the process advances to step S83c.

Steps S83c to S88c are a main loop to be repeated until a game-over or game-clear is reached. First, in step S83c required data is written to the display RAM 25 on the basis of the data in the work RAM 26 so that game scenes are displayed on the LCD 12 on the basis of the data stored on the display RAM 25. After the step S83c, in step S84c a sensor output read process is made similarly to that of FIG. 31 of the first embodiment. This process reads an output value of the XY-axis acceleration sensor 31 and Z-axis contact switch 32 through the sensor interface 33 (correction by 0G position data and neutral position data is omitted). After the step S84c, in step S85c an interrupt signal and the acceleration-sensor output value data (INx, INy, INz) that are read out in the former step S84c and stored to the work RAM 26 are transmitted to the portable game apparatus 10. The portable game apparatus 10 receives the interrupt signal and starts a master-machine communication interrupt process hereinafter described with reference to FIG. 65. After the step S85c, in step S86c an each-object moving process (wave moving process is omitted) is performed similarly to that of FIG. 32 to FIG. 36 of the first embodiment, thereby performing a moving process for the player character and NPC. After the step S86c, in step S87c a collision process is performed similarly to that of FIG. 37 of the first embodiment, thus colliding the player character with an NPC or the like. After the step S87c, in step S88c a screen scroll process is made similarly to that of FIG. 40 of the first embodiment.

Figure 63:
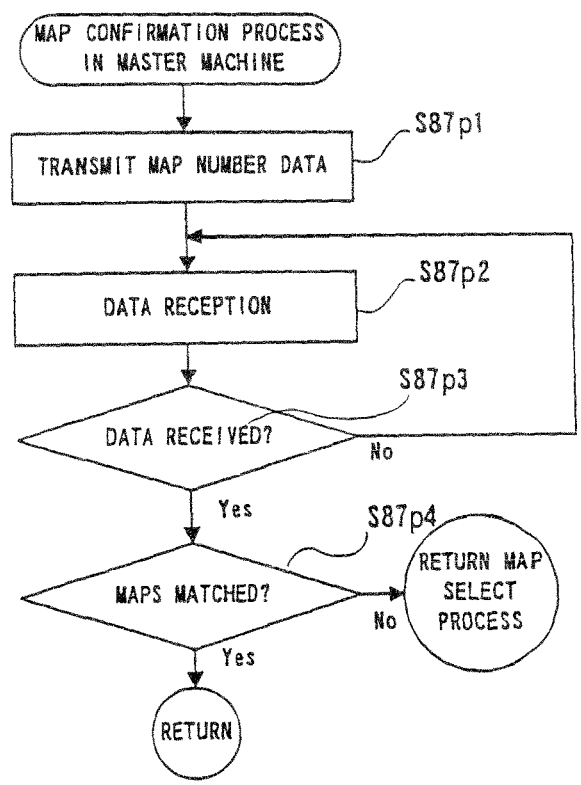
FIG. 63 is a mater-unit map confirming process flowchart of the fourth embodiment.

FIG. 63 is a master-machine map confirmation process flowchart to be executed in the portable game apparatus 10. First, in step S87p1 the map number data stored on ones own work RAM 26 is transmitted to the portable game apparatus 40. After the step S87p1, in step S87p2 data transmission and reception is made. Specifically, received is the map number data transmitted from the portable game apparatus 40 in a step S87c3 of a slave-machine map confirmation process hereinafter described with reference to FIG. 64. If it is determined that data is received in step S87p3, it is then determined in step S87p4 whether the own map number data agrees with the map number data of the portable game apparatus 40 received in the former step S87p2 or not. If agreement of the map number data is determined in step S87p4, the master-machine map confirmation process ends. If no agreement of the map number data is determined in the step S87p4, the process returns to the game map select process in step S8lp of the main routine of FIG. 61.

Figure 64:
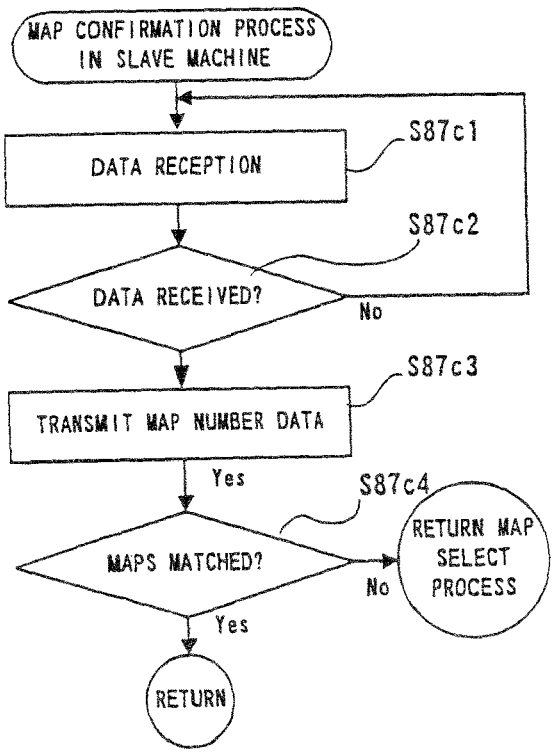
FIG. 64 is a slave-machine map confirming process flowchart of the fourth embodiment.

FIG. 64 is a slave-machine map confirmation process flowchart to be executed in a portable game apparatus 40. First, in step S87c1 data transmission and reception is made. Specifically, received is the map number data transmitted from the portable game apparatus 10 in step S87p1 of the master-machine map confirmation process of FIG. 63. If it is determined that data is received in step S87c2, in step S87c3 the map number data stored on ones own work RAM 26 is transmitted to the portable game apparatus 10. After the step S87c3, it is determined in step S87c4 whether the own map number data agrees with the map number data of the portable game apparatus received in the former step S87c1 or not. If it is determined that the map number data agree in step S87c4, the slave-machine map confirmation process ends. If it is determined that there is no agreement of the map number data in the step S87c4, the process returns to the game map select process in step S81c of the main routine of FIG. 62.

Figure 65:
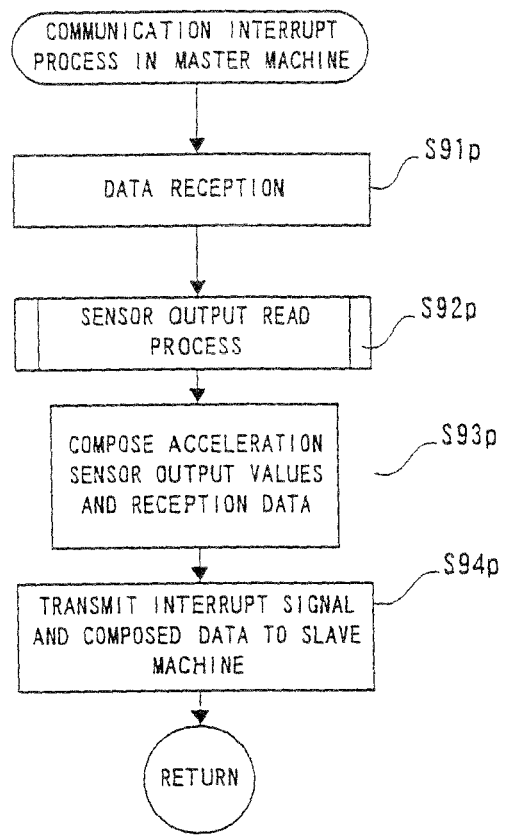
FIG. 65 is a master-machine communication interrupt process flowchart of the FIG. 4 embodiment.

FIG. 65 is a master-machine communication interrupt process flowchart to be executed in the portable game apparatus 10. This process is started by an interrupt signal transmitted in the step S85c of the main routine for the portable game apparatus 40 shown in FIG. 62. First, in step S91p data transmission and reception is made. Specifically, received is an acceleration-sensor output value of the portable game apparatus 40 transmitted in the step S85c of the main routine for the portable game apparatus 40 shown in FIG. 62. After the step S91p, in step S92p a sensor output read process is made similarly to that of FIG. 31 of the first embodiment, thereby reading an output value of the XY-axis acceleration sensor 31 and Z-axis contact switch 32 through the sensor interface 33 (correction by 0G position data and neutral position data is omitted). After step S92p, in step S93p composition is made of an acceleration-sensor output value of the portable game apparatus 40 received in the former step S91p and an acceleration-sensor output value of portable game apparatus 10 read out in the former step S92p. Here, composition may be made by a calculation process of mere addition, or by calculation of a composite value from two values through a complicate calculation formula, e.g. adding two values together with weighting. After the step S93p, in step S94p an interrupt signal and the composite data calculated in the former step S93p are transmitted to the portable game apparatus 40.

Figure 66:
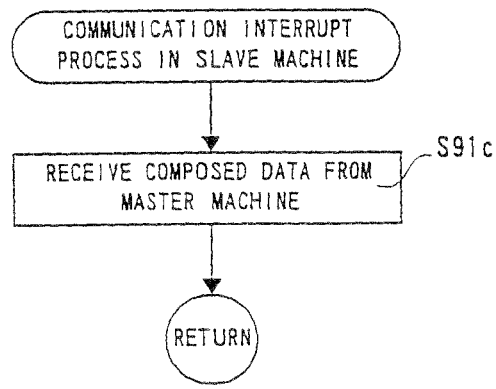
FIG. 66 is a slave-machine communication interrupt process flowchart of the FIG. 4 embodiment.

FIG. 66 is a slave-machine communication interrupt flowchart to be executed in the portable game apparatus 40. This process is started according to an interrupt signal transmitted in step S94p of the master-machine communication interrupt process of FIG. 65. In step S91c, the composite data is received from the portable game apparatus 10, and the process ends.

Figure 67:
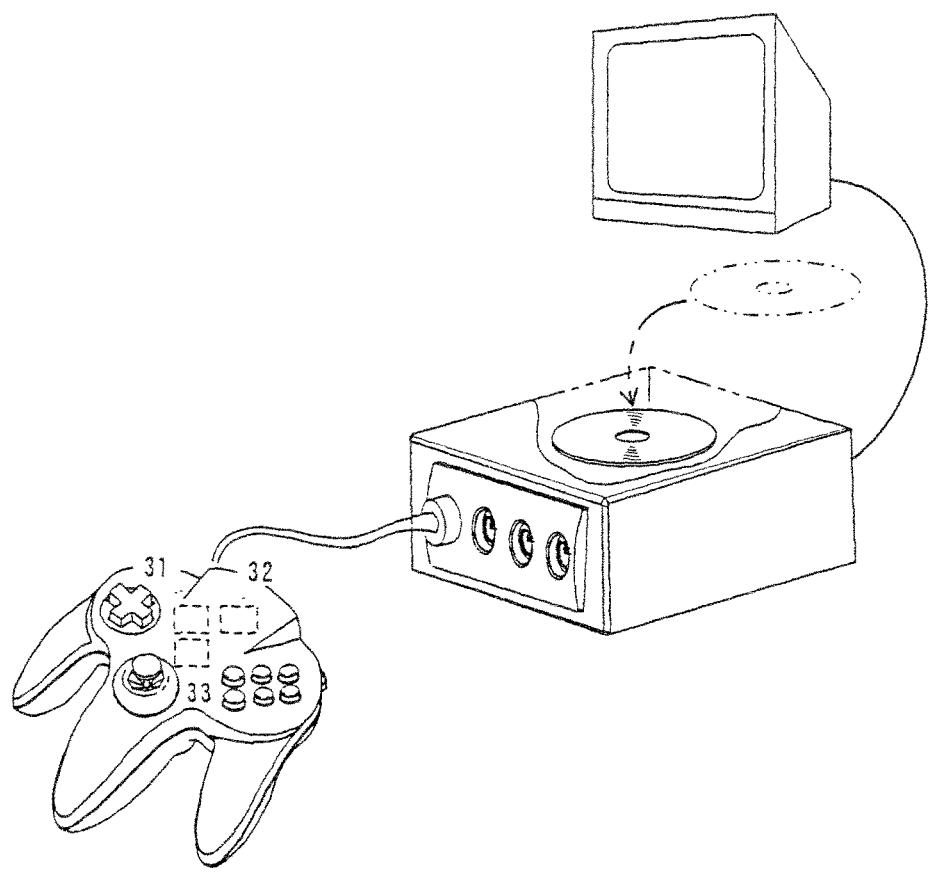
FIG. 67 is an example of a present embodiment which is applied to a controller of a home-use game apparatus.

Although in the above embodiment the portable game apparatus was provided with detecting means, the detecting means may be provided on a controller of a home-use game machine, personal computer, or business-purpose game machine as shown in FIG. 67. In this case, a player can control a game space displayed on a display device, such as television receiver, by tilting or applying a movement or impact to the controller. For example, as shown in FIG. 68 tilting the controller provides display of tilting a plate as a game space on the display device wherein simulation is provided to roll a ball on the plate. The simulation is such that tilting the controller to the right provides a tilt of the plate to the right to roll the ball to the right whereas tilting the controller to the left provides a tilt of the plate to the left to roll the ball to the left.

Although in the above embodiments the acceleration sensor was provided on the cartridge, the acceleration sensor may be provided on the side of the portable game apparatus main body. In the case of providing an acceleration sensor on the side of the portable game apparatus main body, there is no need to provide an acceleration sensor for each cartridge, reducing cost. Also, the information storage medium used for the portable game apparatus is not limited to a cartridge but may be an IC card, such as a PC card.

Although in the above first embodiment the neutral position data was stored on the work RAM 26 and set up each time of game play, it may be stored on the backup RAM 35 so that the same data can be utilized in next-round of game play.

Although in the above first embodiment the neutral position was determined by a player, neutral position data may be previously stored in a game program so that it can be utilized. Also, a plurality of neutral position data may be stored so that a player can select any of them.

In the first embodiment, the game characters employed only the player character (ball) and enemy character (tortoise). However, in addition to them, it is possible to appear NPC (non-player character), such as ally characters, assisting the player character or neutral characters. These NPCs, although self-controlled according to a game program (NPC not self-controlled may be provided), may be moved or deformed according to an operation (tilt, movement or impact input) by a player.

Although in the above first embodiment game-space control was based only on an output of the acceleration sensor, there may be provided a portion of a game space to be controlled according to an operation switch. For example, it is possible to contemplate such a game that in a pin ball game a flipper operates when pressing an operation switch while controlling a pin ball board as a game space by tilting or swinging the portable game apparatus.

Also, in a game so-called "fall game" wherein fall objects are piled up so that score is calculated according to a state of piling up, it is possible to contemplate such a game that an object is changed in direction by operation switches or moved at high speed due to impact input or deformed due to movement input in the Z-axis direction while controlling the game space by tilting or swinging the portable game apparatus.

Although in the above first embodiment the game characters were moved in accordance with a tilt of the portable game apparatus (i.e. tilt of the maze plate as a game space), they may be moved according to a movement or impact to the portable game apparatus. For example, it is possible to contemplate providing display and control such that, when the portable game apparatus is slid, simulation is given to move a maze plate wall similarly, moving a game character contacting the wall as if it were pressed by the wall.

Although in the above embodiment the player character (ball) itself was displayed moving, the player character may be displayed fixedly and the game space may be scrolled so that the player character is displayed moving relative to the game space.

Although in the above fourth embodiment the two players made the same control to tilt the maze plate, the two players may perform individual control. For example, it is possible to contemplate such a game that one player tilts the portable game apparatus to control and tilt a maze plate whereas the other player inputs movement in the Z-axis direction to the portable game apparatus to cause a game character to jump or applies an impact in the XY-axis direction to generate and control waves.

In the above fourth embodiment, the portable game apparatus 10 stored the master-machine program and the portable game apparatus 40 a slave-machine program, in respect of the main, map confirmation and communication interrupt programs. Instead, both master-machine program and slave-machine program may be stored on each of the portable game apparatus 10 and the portable game apparatus 40 so that setting can be made as to which one is used as a master or slave unit prior to a start of a game and the program be selected according to such setting.

Although the present exemplary embodiments have been described and illustrated in detail, it is clearly understood that the same is by way of illustration and example only and is not to be taken by way of limitation, the spirit and scope of the present invention being limited only by the terms of the appended claims.

The invention claimed is:

1. A game system comprising a first game machine and a second game machine, wherein
the first game machine comprises:
a first housing configured to be held in at least one hand of a user;
a first accelerometer disposed in the first housing and configured to generate first motion data based on output from the first accelerometer in response to movement of the first housing;
a first wireless communication interface configured to wirelessly transmit the first motion data to a second game machine via wireless communication; and
the second game machine comprises:
a second housing configured to be held in at least one hand of a user;
a display disposed on the second housing;
a second wireless communication interface configured to wirelessly receive the first motion data from the first game machine;
a second accelerometer disposed in the second housing and configured to generate second motion data based on output from the second accelerometer in response to movement of the second housing; and
a processor configured to execute a gaming process based on the received first motion data and the generated second motion data from the second accelerometer; wherein
the processor is configured to display game images on the display based on the executed gaming process, and wherein
the gaming process controls movement of display game objects.

2. The game system according to claim 1, wherein
the second game machine includes a slot defined therein for receiving a removable card having a memory.

3. The game system according to claim 2, wherein
the display is disposed on a front surface of the second housing and the slot is defined in a side surface of the second housing.

4. The game system according to claim 1, wherein
the second wireless communication interface comprises a radiotelephone circuit.

5. The game system according to claim 1, wherein
the second wireless communication interface is configured to wirelessly receive the first motion data via radio communication.

6. The game system according to claim 1, wherein
the second game machine further comprises at least one physical key disposed on the second housing and configured to initiate an output in response to operation of the key.

7. A first device comprising:
a first housing configured to be held in at least one hand of a user;
a display disposed on the first housing;
a first accelerometer disposed in the first housing and configured to generate first motion data based on output from the first accelerometer in response to movement of the first housing;
a wireless communication interface configured to wirelessly receive from a second device second motion data based on output from a second accelerometer disposed in a second housing included in the second device in response to movement associated with the second housing of the second device; and
a processor configured to execute a process based on the generated first motion data and the received second motion data; wherein
the processor is configured to display images on the display based on the executed process, and wherein
the executed process controls movement of display objects.

8. A computer-readable non-transitory storage medium having stored therein a program executed by a processor of a first device that includes a first housing configured to be held in at least one hand of a user and a display disposed on the first housing, the program causing the processor to at least:
control detecting of first motion data based on output from a first accelerometer disposed in the first housing in response to movement of the first housing;
control wirelessly receiving from a second device of second motion data based on output of a second accelerometer disposed in a second housing included in the second device in response to movement of the second housing;
execute a process based on the received second motion data and the detected first motion data; and
display images on the display based on the executed process, wherein the executed process controls movement of display objects.

* * * * *